(12) United States Patent
Lee

(10) Patent No.: US 12,306,525 B2
(45) Date of Patent: May 20, 2025

(54) CAMERA ACTUATOR

(71) Applicant: LG INNOTEK CO., LTD., Seoul (KR)

(72) Inventor: Sung Guk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 599 days.

(21) Appl. No.: 17/631,790

(22) PCT Filed: Jul. 28, 2020

(86) PCT No.: PCT/KR2020/009934
§ 371 (c)(1),
(2) Date: Jan. 31, 2022

(87) PCT Pub. No.: WO2021/020862
PCT Pub. Date: Feb. 4, 2021

(65) Prior Publication Data
US 2022/0269146 A1  Aug. 25, 2022

(30) Foreign Application Priority Data

Jul. 29, 2019 (KR) .................. 10-2019-0091859
Jul. 29, 2019 (KR) .................. 10-2019-0091928

(51) Int. Cl.
*G03B 5/00* (2021.01)
*G02B 27/64* (2006.01)
(Continued)

(52) U.S. Cl.
CPC ............. *G03B 5/00* (2013.01); *G02B 27/646* (2013.01); *G03B 17/17* (2013.01); *G03B 30/00* (2021.01);
(Continued)

(58) Field of Classification Search
None
See application file for complete search history.

(56) References Cited

U.S. PATENT DOCUMENTS 6,091,900 A * 7/2000 Kaneda ............... G02B 27/646
 348/208.11
7,804,645 B2  9/2010 Morita et al.
(Continued)

FOREIGN PATENT DOCUMENTS

| CN | 101666354 A | 3/2010 |
| CN | 102023364 A | 4/2011 |

(Continued)

OTHER PUBLICATIONS

Office Action dated Apr. 8, 2023 in Chinese Application No. 202080068427.9.
(Continued)

*Primary Examiner* — Derek S. Chapel
(74) *Attorney, Agent, or Firm* — Saliwanchik, Lloyd & Eisenschenk

(57) ABSTRACT

A camera actuator according to an embodiment includes: a housing; a prism unit disposed in the housing; a driving part tilting the prism unit; a second pivot plate disposed on a side wall of the housing; and a first pivot plate disposed between the second pivot plate and the prism unit, wherein the prism unit includes a pulling magnet, and the prism unit is tilted with respect to a rotation reference axis of the first pivot plate or the second pivot plate while being supported by the housing by attractive force between the pulling magnet and the second pivot plate.

19 Claims, 52 Drawing Sheets

(51) Int. Cl.
  *G03B 17/17* (2021.01)
  *G03B 30/00* (2021.01)
  *H04N 23/68* (2023.01)
(52) U.S. Cl.
  CPC ......... *H04N 23/685* (2023.01); *H04N 23/686* (2023.01); *G03B 2205/0007* (2013.01); *G03B 2205/0023* (2013.01); *G03B 2205/003* (2013.01)

(56) References Cited

U.S. PATENT DOCUMENTS

| | | |
|---|---|---|
| 8,116,018 B2 | 2/2012 | Park et al. |
| 8,311,404 B2 | 11/2012 | Nakayama |
| 9,258,486 B2 | 2/2016 | Hu et al. |
| 10,389,858 B2 | 8/2019 | Yu et al. |
| 10,416,472 B2 | 9/2019 | Jeong et al. |
| 10,416,473 B2 | 9/2019 | Lee et al. |
| 10,520,747 B2 | 12/2019 | Wang et al. |
| 10,534,194 B2 | 1/2020 | Lee et al. |
| 10,564,442 B2 | 2/2020 | Seol et al. |
| 10,775,639 B2 | 9/2020 | Takimoto et al. |
| 10,866,430 B2 | 12/2020 | Kim et al. |
| 11,119,332 B2 | 9/2021 | Lee et al. |
| 11,159,661 B2 | 10/2021 | Yoon et al. |
| 11,378,773 B2 | 7/2022 | Lee et al. |
| 2009/0002825 A1 | 1/2009 | Morita et al. |
| 2011/0063741 A1 | 3/2011 | Park et al. |
| 2011/0317987 A1 | 12/2011 | Nakayama |
| 2016/0341975 A1 | 11/2016 | Kim et al. |
| 2018/0109660 A1 | 4/2018 | Yoon et al. |
| 2018/0203203 A1 | 7/2018 | Lee |
| 2018/0234529 A1 | 8/2018 | Yu et al. |
| 2018/0239162 A1* | 8/2018 | Lee .................. H04N 23/57 |
| 2018/0259787 A1 | 9/2018 | Kim et al. |
| 2018/0259788 A1 | 9/2018 | Wang et al. |
| 2018/0356645 A1* | 12/2018 | Jeong ................ G02B 27/646 |
| 2018/0364450 A1 | 12/2018 | Lee et al. |
| 2018/0367714 A1* | 12/2018 | Im .................... H04N 23/687 |
| 2019/0004328 A1 | 1/2019 | Lee et al. |
| 2019/0033613 A1 | 1/2019 | Takimoto et al. |
| 2019/0041601 A1 | 2/2019 | Hou et al. |
| 2019/0121055 A1 | 4/2019 | Lee et al. |
| 2019/0129197 A1 | 5/2019 | Kim et al. |
| 2019/0361261 A1 | 11/2019 | Lee et al. |
| 2020/0137274 A1* | 4/2020 | Lee .................... G03B 17/17 |
| 2020/0348479 A1* | 11/2020 | Kwon ................ G02B 7/021 |
| 2020/0363626 A1* | 11/2020 | Seo .................... G03B 30/00 |
| 2022/0365312 A1 | 11/2022 | Lee et al. |

FOREIGN PATENT DOCUMENTS

| | | |
|---|---|---|
| CN | 102298221 A | 12/2011 |
| CN | 108427166 A | 8/2018 |
| CN | 208060910 U | 11/2018 |
| CN | 109073852 A | 12/2018 |
| CN | 109218576 A | 1/2019 |
| EP | 1 845 710 A1 | 10/2007 |
| JP | 2015-11353 A | 1/2015 |
| JP | 2017-198979 A | 11/2017 |
| KR | 10-0233050 B1 | 12/1999 |
| KR | 10-2017-0116749 A | 10/2017 |
| KR | 10-1806245 B1 | 12/2017 |
| KR | 10-2018-0094355 A | 8/2018 |
| KR | 10-2018-0095420 A | 8/2018 |
| KR | 10-2018-0096073 A | 8/2018 |
| KR | 10-1901705 B1 | 9/2018 |
| KR | 10-1942743 B1 | 1/2019 |
| KR | 10-2019-0013561 A | 2/2019 |
| TW | 201833616 A | 9/2018 |

OTHER PUBLICATIONS

Supplementary European Search Report dated Jul. 21, 2023 in European Application No. 20847022.9.
Office Action dated Apr. 30, 2024 in Japanese Application No. 2022-506298.
International Search Report dated Oct. 30, 2020 in International Application No. PCT/KR2020/009934.
Office Action dated Nov. 8, 2023 in Taiwanese Application No. 109125905.
Office Action dated Dec. 19, 2024 in Korean Application No. 10-2019-0091859.
Office Action dated Dec. 19, 2024 in Korean Application No. 10-2019-0091928.

* cited by examiner

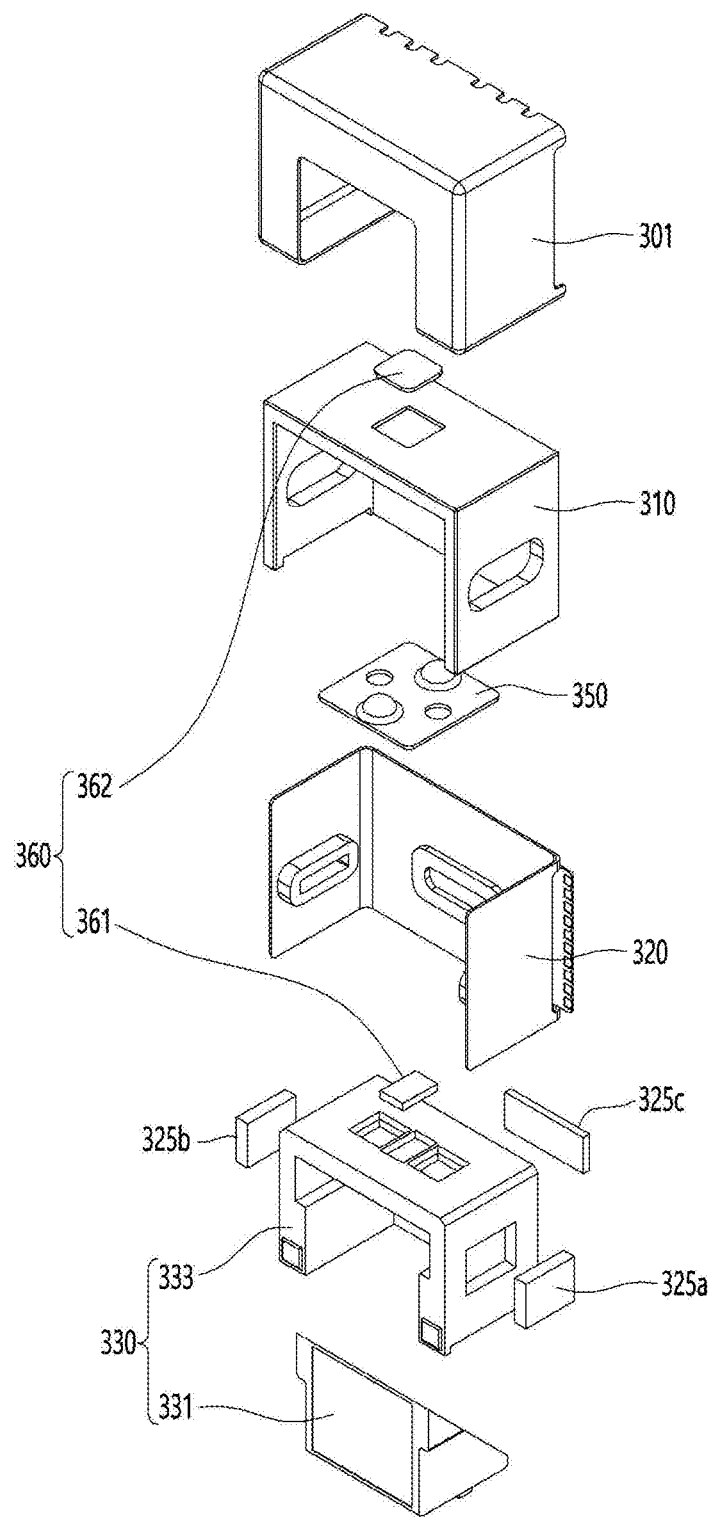

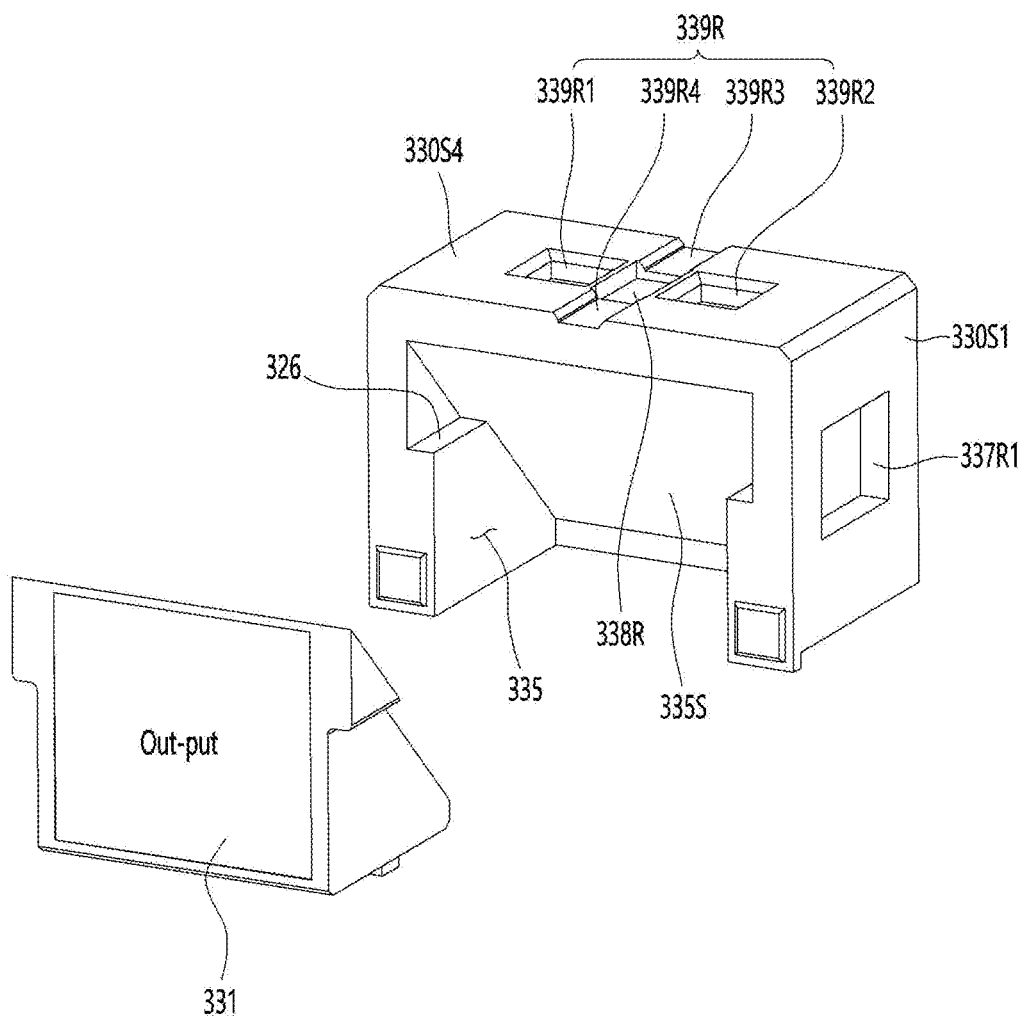

CAMERA ACTUATOR

CROSS-REFERENCE TO RELATED APPLICATIONS

This application is the U.S. national stage application of International Patent Application No. PCT/KR2020/009934, field Jul. 28, 2020, which claims the benefit under 35 U.S.C. § 119 of Korean Application Nos. 10-2019-0091859, filed Jul. 29, 2019; 10-2019-0091928, filed Jul. 29, 2019; the disclosures of each of which are incorporated herein by reference in their entirety.

TECHNICAL FIELD

An embodiment relates to a camera actuator.

BACKGROUND ART

A camera module performs a function of photographing a subject and storing it as an image or a moving image, and is mounted on a mobile terminal such as a mobile phone, a laptop a drone, a vehicle, and the like.

Meanwhile, an ultra-small camera module is built into a portable device such as a smartphone, a tablet PC, and a notebook, and such a camera module may perform an autofocus (AF function adjusting automatically a distance between an image sensor and a lens to adjust a focal length of the lens.

In addition, recently, a camera module may perform a zooming function of zooming up or zooming out photographing a subject by increasing or decreasing a magnification of a long-distance subject through a zoom lens.

Further, recently, a camera module adopts an image stabilization (IS technology to correct or inhibit image shake caused by camera movement due to an unstable fixing device or user movement.

Such an image stabilization (IS technology includes an optical image stabilizer (OIS technology and an image stabilization technology using an image sensor.

The OIS technology is a technology that corrects movement by changing a light path, and the image stabilization technology using the image sensor is a technology that corrects movement by mechanical and electronic methods, but the OIS technology is often used.

DISCLOSURE

Technical Problem

One of technical problems of embodiments is to provide an ultra-thin and ultra-small camera actuator and a camera module including the same.

In addition, one of the technical problems of the embodiments is to provide a camera actuator in which a moving plate that serves to tilt a prism unit in multiple axes is made of a magnetic material so that the moving plate functions as a shaft for tilting the prism unit, and also has a fixing function of fixing the prism unit to a housing, and a camera module including the same.

In addition, one of the technical problems of the embodiments is to provide a camera actuator that may secure a sufficient amount of light by eliminating lens size limitation of an optical system lens assembly when OIS is implemented.

In addition, one of the technical problems of the embodiments is that a size of a variable lens for OIS drive should be large in order to increase an amount of light received for clear image quality, but when the size of the variable lens becomes large, there is a technical contradiction that encounters limitation of a thickness of a camera module, and accordingly, an object of the present invention is to provide a camera actuator that may solve the technical contradiction, and a camera module including the same.

In addition, one of the technical problems of the embodiments is to provide a camera actuator capable of achieving the best optical characteristics and a camera module including the same by minimizing occurrence of a decenter or tilt phenomenon when the OIS is implemented.

In addition, one of the technical problems of the embodiments is to provide a camera actuator capable of inhibiting a magnetic field interference with an AF or Zoom magnet when the OIS is implemented, and a camera module including the same.

In addition, one of the technical problems of the embodiments is, when implementing AF or Zoom, to provide a camera actuator capable of inhibiting a magnetic field interference between magnets mounted on each lens assembly when a plurality of lens assemblies are driven by an electromagnetic force between a magnet and a coil, and a camera module including the same.

In addition, the embodiment is to provide a camera actuator capable of inhibiting detachment of a magnet and a yoke, and a camera module including the same.

In addition, one of the technical problems of the embodiments is to provide a camera actuator capable of implementing the OIS with low power consumption, and a camera module including the same.

In addition, one of technical problems of embodiments is to provide a camera actuator capable of inhibiting generation of friction torque when moving a lens by zooming in a camera module, and a camera module including the same.

In addition, one of the technical problems of the embodiments is to provide a camera actuator capable of inhibiting a lens decentering, a lens tilt, or occurrence of a phenomenon that a center axis of an image sensor does not coincide with a center of a lens during a lens shift through zooming in a camera module, and the camera module including the same.

In addition, one of technical problems of embodiments is to provide a camera actuator capable of simultaneously increasing sensitivity of a hall sensor while increasing thrust, and a camera module including the same.

The technical problems of the embodiments are not limited to those described in this item, and include those that can be grasped from the entire description of the invention.

Technical Solution

A camera actuator according to an embodiment includes: a housing; a prism unit disposed in the housing; a driving part tilting the prism unit; a moving plate disposed between the housing and the prism unit; a prism mover including an accommodating part; and a prism disposed in the accommodating part of the prism mover, wherein a pulling magnet generating attractive force together with the moving plate is disposed at the prism mover, and the prism mover is tilted with respect to a rotation reference axis of the moving plate while being supported by the housing by the attractive force between the moving plate and the pulling magnet.

In addition, the moving plate is composed of a magnetic material.

Further, the moving plate includes first and second moving plates, wherein the second moving plate is disposed fixedly in a recess of the housing, and is composed of the magnetic material in order to generate the attractive force with the pulling magnet, and the first moving plate is disposed between the prism mover and the second moving plate, and is supported by the housing by the attractive force.

In addition, a plurality of first moving protruding portions disposed in a first direction are disposed on one surface of the first moving plate facing the prism mover, and a plurality of second moving protruding portions disposed in a second direction perpendicular to the first direction are included on one surface of the second moving plate facing the first moving plate.

In addition, the prism unit is provided so as to enable rotational movement in the second direction with a virtual first line formed by the plurality of first moving protruding portions as a reference axis, and is provided so as to enable rotational movement in the first direction with a virtual second line formed by the plurality of second moving protruding portions as a reference axis.

In addition, a first recess in which the pulling magnet is disposed and a plurality of second recesses, which are spaced apart in the first direction around the first recess and in which the plurality of first moving protruding portions are disposed, are included on an outer surface of the prism mover facing one surface of the first moving plate.

In addition, a plurality of first moving recesses, which are disposed in the second direction and into which the plurality of second moving protruding portions are inserted, are included on the other surface of the first moving plate facing the one surface of the second moving plate.

In addition, a plurality of first auxiliary protruding portions disposed to be spaced apart in the second direction are included on the one surface of the first moving plate, and a plurality of second auxiliary protruding portions disposed to be spaced apart in the first direction are included on the one surface of the second moving plate.

In addition, in the prism unit, a rotation range in the second direction is limited by the plurality of first auxiliary protruding portions, and a rotation range in the first direction is limited by the plurality of second auxiliary protruding portions.

In addition, the plurality of first moving protruding portions and the plurality of first auxiliary protruding portions are disposed on the one surface of the first moving plate in a cross shape with reference to a first region, and the plurality of second moving protruding portions and the plurality of second auxiliary protruding portions are disposed on the one surface of the second moving plate in a cross shape with reference to a second region, wherein the first and second regions are overlapped with the pulling magnet in a third direction.

Meanwhile, a camera actuator according to an embodiment includes: a housing; a prism unit disposed in the housing; a driving part tilting the prism unit; a first pivot plate disposed on a side wall of the housing; and a second pivot plate disposed between the first pivot plate and the prism unit, wherein the prism unit includes a pulling magnet, and the prism unit is tilted with respect to a rotation reference axis of the first pivot plate or the second pivot plate while being supported by the housing by attractive force between the pulling magnet and the first pivot plate.

In addition, the first pivot plate is composed of a magnetic material generating attractive force together with the pulling magnet.

In addition, the second pivot plate is composed of a magnetic material or a non-magnetic material.

In addition, the first pivot plate includes a plurality of first pivot protruding portions, and the second pivot plate includes a plurality of second pivot protruding portions.

In addition, the plurality of first pivot protruding portions are disposed to be spaced apart in a first direction on one surface of the first pivot plate, and the plurality of second pivot protruding portions are disposed to be spaced apart in a second direction orthogonal to the first direction on one surface of the second pivot plate.

Further, the plurality of first pivot protruding portions protrude toward the prism mover on one surface of the first pivot plate, and the plurality of second pivot protruding portions protrude toward the prism mover on one surface of the second pivot plate.

In addition, the prism mover includes a first recess in which the pulling magnet is accommodated; and a plurality of second recesses in which the plurality of second pivot protruding portions are accommodated, wherein the first recess is disposed in a central region between the plurality of second recesses.

A camera actuator according to an embodiment includes: a housing; a prism unit disposed in the housing; a driving part tilting the prism unit; a moving plate disposed between the housing and the prism unit; and a support portion allowing the prism unit to be supported by the housing, wherein the moving plate includes a first protruding portion disposed on a first surface facing the prism unit in a first direction, and a second protruding portion disposed on a second surface facing the housing in a second direction perpendicular to the first direction.

In addition, the prism unit includes a prism mover including an accommodating part and a prism disposed in the accommodating part of the prism mover, and the moving plate is disposed between facing surfaces of the prism mover and the housing.

In addition, the first protruding portion includes first and second sub-first protruding portions that are disposed to be spaced apart in the first direction with respect to a center of the first surface of the moving plate, and the second protruding portion includes first and second sub-second protruding portions that are spaced apart in the second direction with respect to a center of the second surface of the moving plate.

In addition, the prism unit rotates in the second direction with a virtual first line formed by the first and second sub-first protruding portions as a reference axis, and rotates in the first direction with a virtual second line formed by the first and second sub-second protruding portions as the reference axis.

In addition, the first protruding portion includes first and second sub-first recesses disposed on the first surface and corresponding to the first and second sub-second protruding portions, and first and second sub-second recesses disposed on the second surface and corresponding to the first and second sub-first protruding portions.

In addition, a plurality of first recesses corresponding to the first and second sub-first protruding portions of the moving plate are disposed on an outer surface of the prism mover facing the housing, and a plurality of second recesses corresponding to the first and second sub-second protruding portions of the moving plate are disposed on an inner surface of the housing facing the outer surface of the prism mover.

In addition, the prism mover includes a third recess disposed at a position corresponding to between the plurality of first recesses and corresponding to the support portion, and the housing includes a fourth recess disposed at a position corresponding to between the plurality of second recesses and corresponding to the support portion.

Further, the prism mover includes a plurality of fifth recesses disposed outside the plurality of first recesses and corresponding to the support portion, and the housing includes a plurality of sixth recesses disposed outside the plurality of second recesses and corresponding to the support portion.

In addition, the support portion includes a first pulling member and a second pulling member disposed in the prism mover and the housing, respectively, one of the first pulling member and the second pulling member is a magnet, and the other one of the first pulling member and the second pulling member is a yoke, and the prism unit and the moving plate are supported by the housing by attractive force between the first and second pulling members.

Further, the first pulling member is disposed in the third recess, and the second pulling member is disposed in the fourth recess.

Furthermore, the support portion includes an elastic member disposed in the prism mover and the housing, and the prism mover and the moving plate are supported by the housing by elastic restoring force of the elastic member.

In addition, the elastic member includes first and second elastic members, one ends of the first and second elastic members are disposed in the plurality of fifth recesses, respectively, and the other ends of the first and second elastic members are disposed in the plurality of sixth recesses, respectively.

In addition, a virtual straight line connecting between the plurality of first recesses is parallel to a virtual straight line connecting the plurality of fifth recesses.

Further, a virtual straight line connecting the plurality of second recesses is orthogonal to a virtual straight line connecting the plurality of sixth recesses.

Advantageous Effects

According to an embodiment, there is a technical effect that it is possible to provide an ultra-thin and ultra-small camera actuator and a camera module including the same.

For example, according to the embodiment, a driving part is disposed so as to utilize a space below the prism unit and overlap each other, and thus there is a technical effect that it is possible to provide an ultra-thin and ultra-small camera actuator and a camera module including the same.

For example, according to the embodiment, there is a technical effect that occurrence of a decenter or tilt phenomenon may be minimized to achieve the best optical characteristics when the OIS is implemented by tilt-controlling the prism unit 330 to a first axis or a second axis by an electromagnetic force which is the driving force of the driving part in a state in which a ball bearing is disposed, and the ultra-thin and ultra-small camera actuator may be implemented.

In addition, according to the embodiment, there is a technical effect that it is possible to provide a camera actuator capable of securing a sufficient amount of light and a camera module including the same by eliminating lens size limitation of an optical system lens assembly when the OIS is implemented.

In addition, according to the embodiment, a second moving plate may be used to enable a prism unit to be tilted to a first axis and a second axis, in which a plurality of first moving protruding portions are disposed in a first axis direction with respect to a center thereof, and a plurality of second moving protruding portions are disposed in the second axis direction perpendicular to the first axis. Accordingly, according to the embodiment, a structure of the camera actuator may be simplified compared to a structure including a ball bearing by tilting the prism unit by using the moving plate including the first and second moving protruding portions.

Further, according to the embodiment, the prism unit may be tilted by using one moving plate. Accordingly, a structure for tilting the prism unit may be simplified by enabling the prism to be biaxially tilted by using one moving plate.

Furthermore, according to the embodiment, it is possible to enable the prism unit to be biaxially tilted by using the first moving plate and the second moving plate which are separated from each other. Accordingly, according to the embodiment, the moving plate providing a rotation shaft is divided and disposed for biaxially tilting of the prism unit, and thus the stability of rotational drive of the prism unit may be ensured. Specifically, the tilting of the prism unit to the first axis is performed by the first moving plate, and the tilting of the prism unit to the second axis is performed by the second moving plate, and thus the stability of the rotational drive of the prism unit may be ensured and the operation reliability may be improved.

In addition, according to the embodiment, the moving plate serving to tilt the prism unit in multiple axes is formed of a magnetic material, so that the moving plate may serve as a shaft for tilting the prism unit, and may also serve as a fixing role for fixing the prism unit to the housing, and accordingly, there is a technical effect that the number of parts and the unit price of the parts may be reduced.

Further, according to the embodiment, an elastic member is disposed between the housing and the prism unit, the prism unit may be tilt-controlled to the first axis or the second axis by a driving force of a driving part while being supported on the housing by the elastic member. In detail, the prism unit may be tilt-controlled to the first axis or the second axis by the elastic member arranged in the first direction and/or the second direction between the housing and the prism unit. That is, occurrence of a decenter or tilt phenomenon may be minimized to achieve the best optical characteristics when the OIS is implemented by tilt-controlling the prism unit to the first axis or the second axis by an electromagnetic force which is the driving force of the driving part.

In addition, according to the embodiment, there is a technical effect that it is possible to provide a camera actuator capable of achieving the best optical characteristics and a camera module including the same by minimizing occurrence of a decenter or tilt phenomenon when the OIS is implemented.

For example, according to the embodiment, the driving part 320 stably disposed on the housing 310 is provided, and the prism unit is tilt-controlled to the first axis or the second axis, and thus there is a technical effect that it is possible to achieve the best optical characteristics by minimizing occurrence of a decenter or tilt phenomenon when the OIS is implemented.

In addition, according to the embodiment, there is a technical effect that it is possible to provide a camera actuator capable of implementing the OIS with low power consumption and a camera module including the same.

For example, according to the embodiment, unlike the conventional method of moving a plurality of solid lenses, the OIS is implemented by including the driving part 320 and tilt-controlling the prism unit 330 to the first axis or the second axis, and thus there is a technical effect that it is possible to provide a camera actuator capable of implementing the OIS with low power consumption and a camera module including the same.

According to a camera actuator and a camera module including the same according to an embodiment, there is a technical effect that may solve a problem of generation of friction torque during zooming.

For example, according to the embodiment, a lens assembly is driven in a state in which the first guide part and the second guide part, which are precisely numerically controlled in the base, are coupled to each other, so that friction resistance is reduced by reducing friction torque, and thus there are technical effects such as improvement of driving force, reduction of power consumption, and improvement of control characteristics during zooming.

In the related art, when guide rails are disposed in the base itself, a gradient is generated along an injection direction, and thus there is difficulty in dimensional control, and there was a technical problem that friction torque increases and driving force decreases when injection is not performed normally.

On the other hand, according to the embodiment, the first guide part and the second guide part which are formed separately from the base are applied separately without disposing the guide rails on the base itself, and thus there is a special technical effect that generation of a gradient along the injection direction may be inhibited.

In addition, the camera actuator and the camera module including the same according to the embodiment have a technical effect capable of simultaneously increasing sensitivity of a hall sensor while increasing thrust.

In addition, according to the embodiment, there is a technical effect that it is possible to provide a camera actuator capable of inhibiting a magnetic field interference with an AF or Zoom magnet and a camera module including the same when the OIS is implemented.

In addition, according to the embodiment, there is a technical effect that it is possible to provide a camera actuator capable of inhibiting a magnetic field interference between magnets mounted on each lens assembly when a plurality of lens assemblies are driven by an electromagnetic force between a magnet and a coil when AF or Zoom is implemented, and a camera module including the same.

In addition, in the embodiment, there is a technical effect that may provide a camera actuator capable of inhibiting detachment of a magnet and a yoke, and a camera module including the same.

The technical effects of the embodiments are not limited to those described in this item, but include those that may be understood from the entire description of the invention.

DESCRIPTION OF DRAWINGS

FIG. 3B is an exploded perspective view of a second camera actuator in a first embodiment.

FIGS. 13A to 13C are views of a prism unit of the second camera actuator of the third embodiment.

DETAILED DESCRIPTION OF THE EMBODIMENTS

Figure 1:
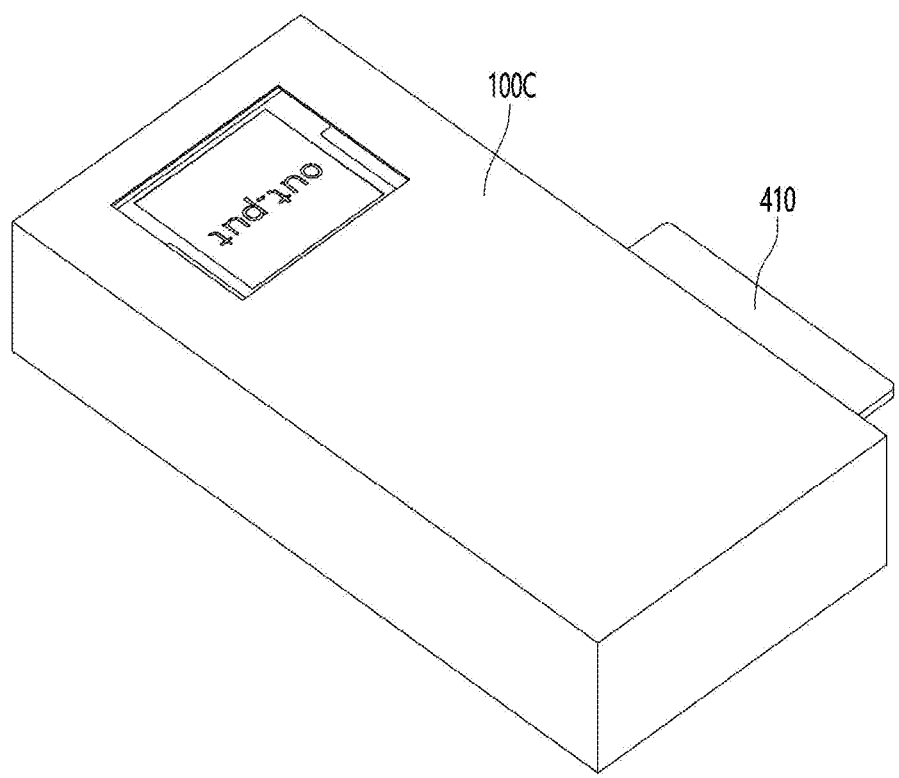
FIG. 1 is a perspective view of a camera module according to an embodiment.

Hereinafter, preferred embodiments of the present invention will be described in detail with reference to the accompanying drawings.

However, the technical spirit of the present invention is not limited to some embodiments described, but may be implemented in various different forms, and, as long as it is within the scope of the technical spirit of the present invention, one or more of the components may be selectively combined and substituted between the embodiments.

In addition, terms (including technical and scientific terms) used in the embodiments of the present invention may be interpreted as meanings that can be generally understood by those of ordinary skill in the art to which the present invention pertains unless explicitly defined and described, and the meanings of commonly used terms such as predefined terms may be interpreted in consideration of the contextual meaning of the related art. In addition, the terms used in the embodiments of the present invention are for describing the embodiments and are not intended to limit the present invention.

In this specification, the singular may also include the plural unless specifically stated in the phrase, and when it is described as "A and (and) at least one (or more than one) of B and C", it may include one or more of all combinations that can be combined with A, B, and C. In addition, in describing the components of the embodiment of the present invention, terms such as first, second, A, B, (a), (b), etc. may be used.

These terms are only used to distinguish the component from other components, and are not limited to the essence, order, or order of the component by the term. And, when it is described that a component is 'connected', 'coupled' or 'contacted' to another component, the component is not only directly connected, coupled or contacted to the other component, but also with the component it may also include a case of 'connected', 'coupled' or 'contacted' due to another element between the other elements.

In addition, when it is described as being formed or disposed on "above (on) or below (under)" of each component, the above (on) or below (under) is one as well as when two components are in direct contact with each other. Also includes a case in which another component as described above is formed or disposed between two components. In addition, when expressed as "above (up) or below (under)", it may include not only the upward direction but also the meaning of the downward direction based on one component.

In addition, prior to description of the embodiments of the present invention, a first direction may refer to an x-axis direction shown in the drawings, and a second direction is a direction different from the first direction. As an example, the second direction may refer to a y-axis direction shown in the drawing, which is a direction perpendicular to the first direction. Further, a horizontal direction may refer to the first and second directions, and a vertical direction may refer to a direction perpendicular to at least one of the first and second directions. For example, the horizontal direction may refer to the x-axis and y-axis directions of the drawing, and the vertical direction may be a direction perpendicular to the x-axis and y-axis directions of the drawing.

Figure 2A:
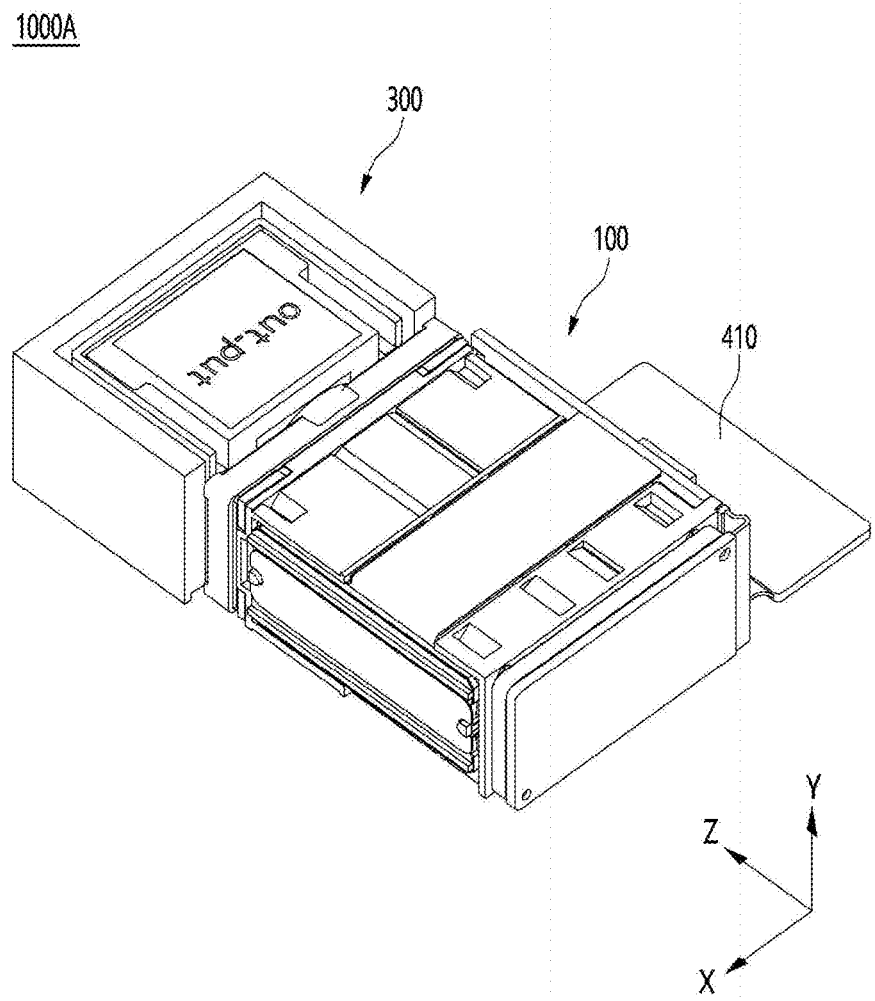
FIG. 2A is a perspective view in which a case is omitted in the camera module according to the embodiment shown in FIG. 1.
Figure 2B:
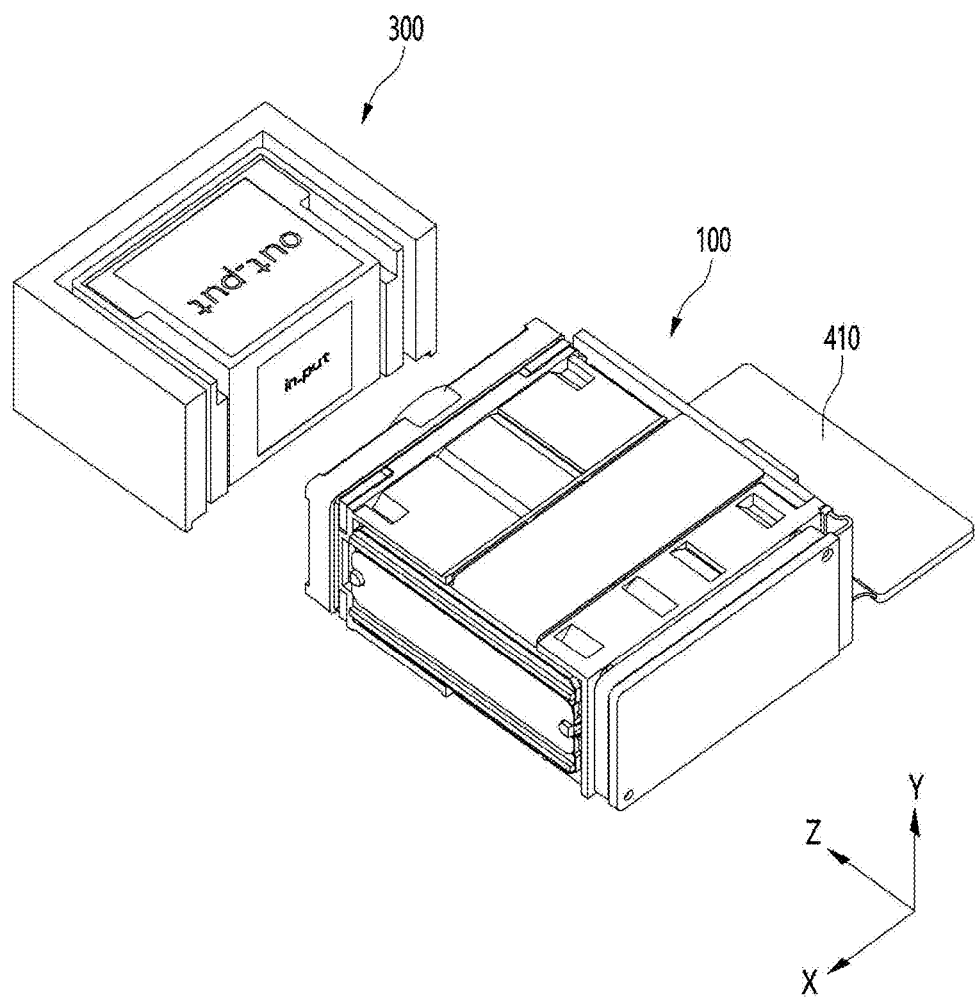
FIG. 2B is an exploded perspective view of the camera module according to the embodiment shown in FIG. 2A.

FIG. 1 is a perspective view of a camera module according to an embodiment, FIG. 2A is a perspective view in which a part of a configuration is omitted in the camera module of FIG. 1, and FIG. 2B is an exploded perspective view of the camera module of FIGS. 2A and 2B.

Referring to FIGS. 1 and 2B, a camera module 1000A according to an embodiment may include a plurality of camera actuators. For example, the camera module 1000A according to the embodiment may include a first camera actuator 100 and a second camera actuator 300. The embodiment may include a case 100c that protects the first camera actuator 100 and the second camera actuator 300.

The first camera actuator 100 may be electrically connected to a first circuit board 410. The first camera actuator 100 supports one or a plurality of lenses, and may move the lenses up and down according to a control signal of a predetermined control unit to perform an autofocusing or zoom function. In addition, the second camera actuator 300 may be electrically connected to a second circuit board (not shown). The second circuit board may be electrically connected to the first circuit board 410. The second camera actuator 300 may be an optical image stabilizer (OIS actuator. In this case, light incident from the outside may be incident on the second camera actuator 300. Further, the light incident on the second camera actuator 300 may be incident on the first camera actuator 100 due to a change in a light path, and the light passing through the first camera actuator 100 may be incident on an optical sensor (not shown).

Hereinafter, the OIS actuator which is the second camera actuator 300 will be described first, and the first camera actuator 100 will be described later.

Figure 3A:
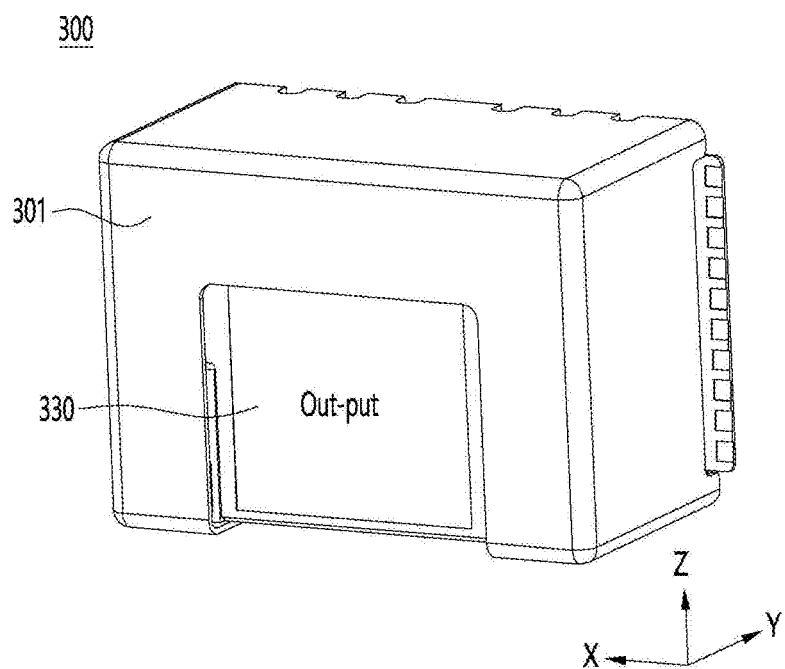
FIG. 3A is a perspective view of a second camera actuator of a camera module according to an embodiment.

FIG. 3A is a perspective view of a second camera actuator of a camera module according to an embodiment.

In addition, FIG. 3B is an exploded perspective view of a second camera actuator in a second embodiment.

Referring to FIGS. 3A and 3B, a second camera actuator 300 according to an embodiment may include a housing 310, a driving part 320 disposed on the housing 310, and a prism unit 330 disposed on the driving part 320.

In addition, the second camera actuator 300 may further include a cover member 301. The cover member 301 may include an accommodating space therein, and at least one side surface of the cover member 301 may be open. As an example, the cover member 301 may have a structure in which a plurality of side surfaces connected to each other are open. In detail, the cover member 301 may have a structure in which a front surface on which light is incident from the outside, a lower surface corresponding to the first camera actuator 100, and a rear surface opposite to the front surface are open, and may provide a moving path of light of the prism unit 330 which will be described later.

The cover member 301 may include a rigid material. As an example, the cover member 301 may include a material such as resin or metal, and may support the housing 310 disposed in the accommodating space. For example, the cover member 301 is disposed surrounding the housing 310, the driving part 320, the prism unit 330, etc., and may support the configurations.

In detail, the prism unit 330, which will be described later, may be moved in a first direction and/or a second direction by the driving part 320. At this time, the cover member 301 may fix the housing and the driving part 320 at a set position, and may provide a more accurate moving path of light. In addition, the cover member 301 may allow the prism unit 330 to be stably supported by a support portion 360 in the housing 310, and may inhibit the housing 310 from being departed to the outside of the second camera actuator 300. The cover member 301 may be omitted according to dispositional relationship of the housing 310, the driving part 320, and the prism unit 330.

FIGS. 4A-5B are perspective views of each configuration of a second camera actuator.

Referring to FIGS. 4A-5B, the second camera actuator 300 may include the housing 310, the driving part 320, the prism unit 330, a moving plate 350, and support portions 360 and 360A. In detail, the driving part 320 may include a circuit board 321 of the driving part, a plurality of coil parts 323, and a plurality of magnets 325, and the prism unit 330 may include a prism 331 and the prism mover 333. In addition, the support portion 360 in a first embodiment may include a first pulling member 361 and a second pulling member 362, and may allow the prism unit 330 to be supported while being pressed against the housing 310 by attractive force of the first pulling member 361 and the second pulling member 362. In addition, the support portion 360A in a second embodiment may include at least two elastic members 361A and 362A, and may allow the prism unit 330 to be supported while being pressed against the housing 310 by elastic force of the two elastic members 361A and 362A.

According to the embodiment, the driving part 320 is provided, which is disposed on the housing 310, and thus there is a technical effect that it is possible to provide an ultra-thin and ultra-small camera actuator and a camera module including the same.

In addition, according to the embodiment, the driving part 320 is disposed below the prism unit 330, and thus there is a technical effect that when the OIS is implemented, lens size limitation of an optical system lens assembly may be eliminated, and a sufficient amount of light may be secured.

In addition, according to the embodiment, the driving part 320 stably disposed on the housing 310 is provided to tilt-control the prism unit 330 to a first axis or a second axis, and thus there is a technical effect that occurrence of a decenter or tilt phenomenon may be minimized to achieve the best optical characteristics when the OIS is implemented.

Further, according to the embodiment, unlike the conventional method of moving a plurality of solid lenses, the OIS is implemented by including the driving part 320 and tilt-controlling the prism unit 330 to a first axis or a second axis, and thus there is a technical effect that the OIS may be implemented with low power consumption.

Hereinafter, each configuration of the second camera actuator 300 will be described in detail with reference to FIGS. 4A-5B.

Meanwhile, the second camera actuator 300 may be classified into the first embodiment and the second embodiment. Here, the first and second embodiments may be classified by the support portions 360 and 360A. That is, the support portion 360 in the first embodiment allows the prism unit 330 to be pressed against the housing 310 by using attractive force generated by the first pulling member 361 and the second pulling member 362. In addition, the support portion 360A in the second embodiment allows the prism unit 330 to be pressed against the housing 310 by using at least two elastic members 361A and 362A.

This will be described in more detail below.

<Driving Part>

Figure 4A:
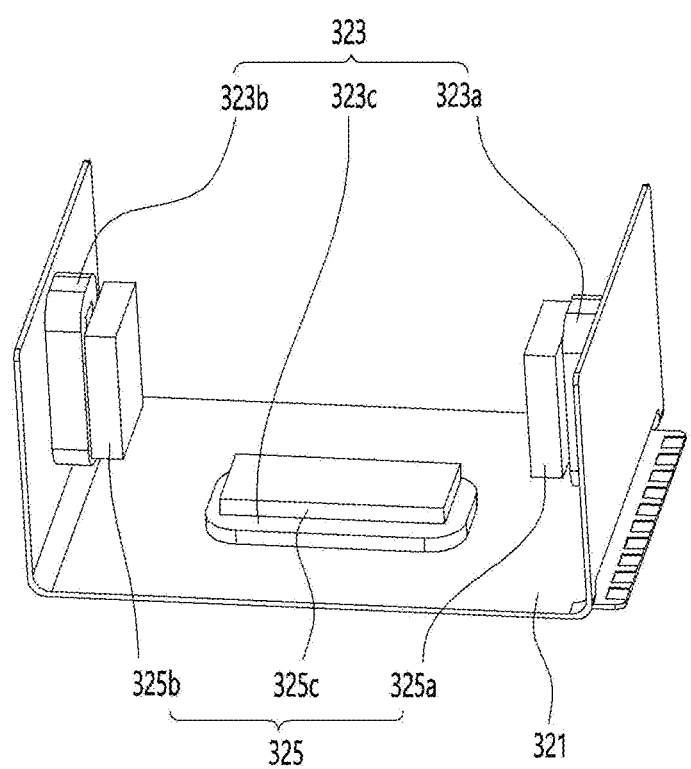
FIGS. 4A-5B are perspective views of each configuration of a second camera actuator.
Figure 4B:
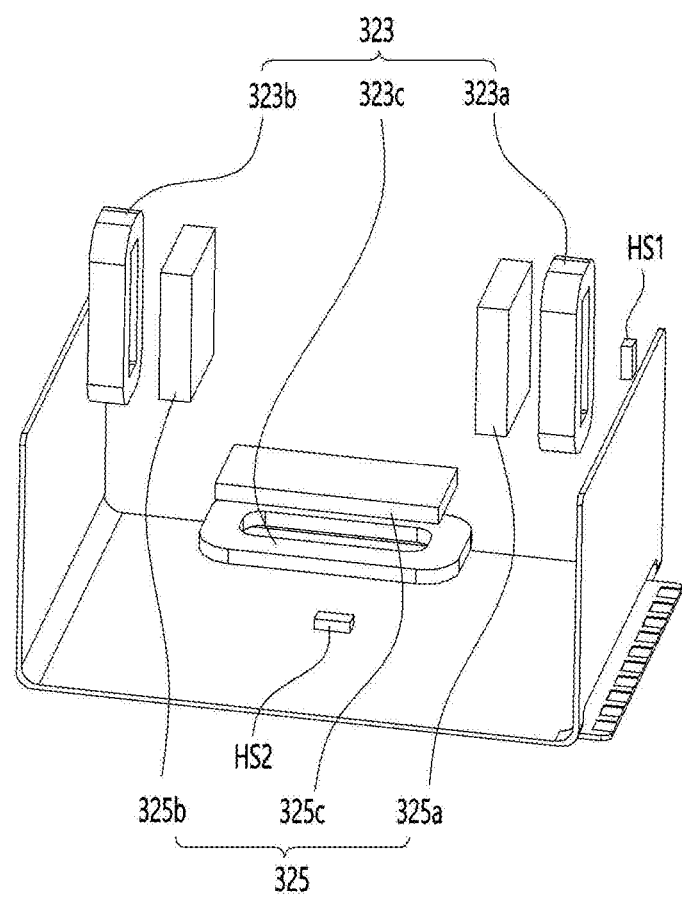

FIG. 4A is a perspective view of the driving part 320 of the second camera actuator 300, and FIG. 4B is an exploded perspective view of the driving part 320 of the second camera actuator 300.

Referring to FIGS. 4A and 4B, the driving part 320 may include the circuit board 321 of the driving part, a coil part 323, and a magnet 325.

The circuit board 321 of the driving part may be connected to a predetermined power supply unit (not shown) to apply power to the coil part 323. The circuit board 321 of the drive part may include a circuit board having a wiring pattern that may be electrically connected to a rigid printed circuit board (Rigid PCB), a flexible printed circuit board (Flexible PCB), a rigid and flexible printed circuit board (Rigid Flexible PCB), and the like.

The coil part 323 may be electrically connected to the circuit board 321 of the driving part. The coil part 323 may include one or a plurality of coil parts. For example, the coil part 323 may include a first coil part 323a, a second coil part 323b and a third coil part 323c.

The first to third coil parts 323a, 323b, and 323c may be spaced apart from each other. For example, the circuit board 321 of the driving part may have a' E shape, and the first coil part 323a and the second coil part 323b may be disposed on first and second surfaces of the circuit board 321 of the driving part facing each other, respectively. Further, the third coil part 323c may be disposed on a third surface connecting the first and second surfaces of the circuit board 321 of the driving part.

The magnet 325 may include one or a plurality of magnets. For example, the magnet 325 may include a first magnet 325a, a second magnet 325b, and a third magnet 325c disposed in a region corresponding to the coil part 323. In detail, the first magnet 325a may be disposed on a region corresponding to the first coil part 323a on the first surface. Further, the second magnet 325b may be disposed on a region corresponding to the second coil part 323b on the second surface. Further, the third magnet 325c may be disposed on a region corresponding to the third coil part 323c on the third surface.

The driving part 320 may further include hall sensors HS1 and HS2. As an example, the hall sensors HS1 and HS2 may include a first hall sensor HS1 disposed so as to be adjacent to one coil part selected from the first coil part 323a and the second coil part 323b, and a second hall sensor HS2 disposed so as to be adjacent to the third coil part 323c.

<Housing of the First Embodiment>

Figure 4C:
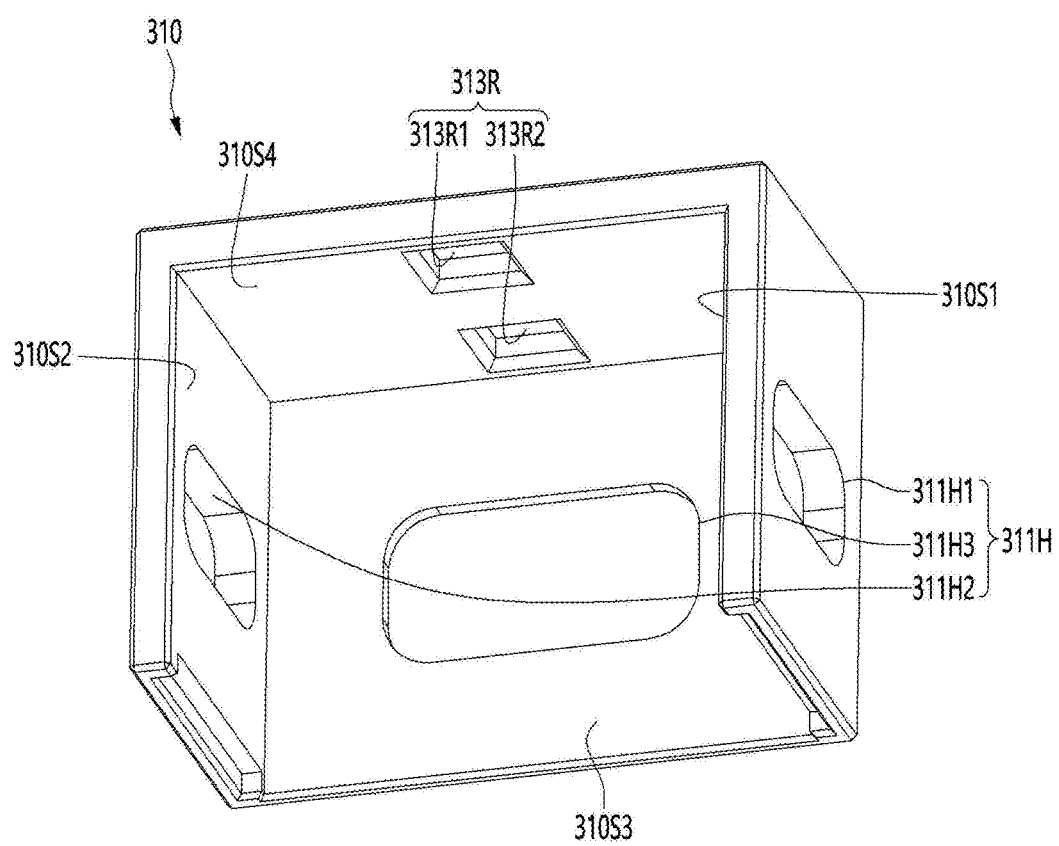
Figure 4D:
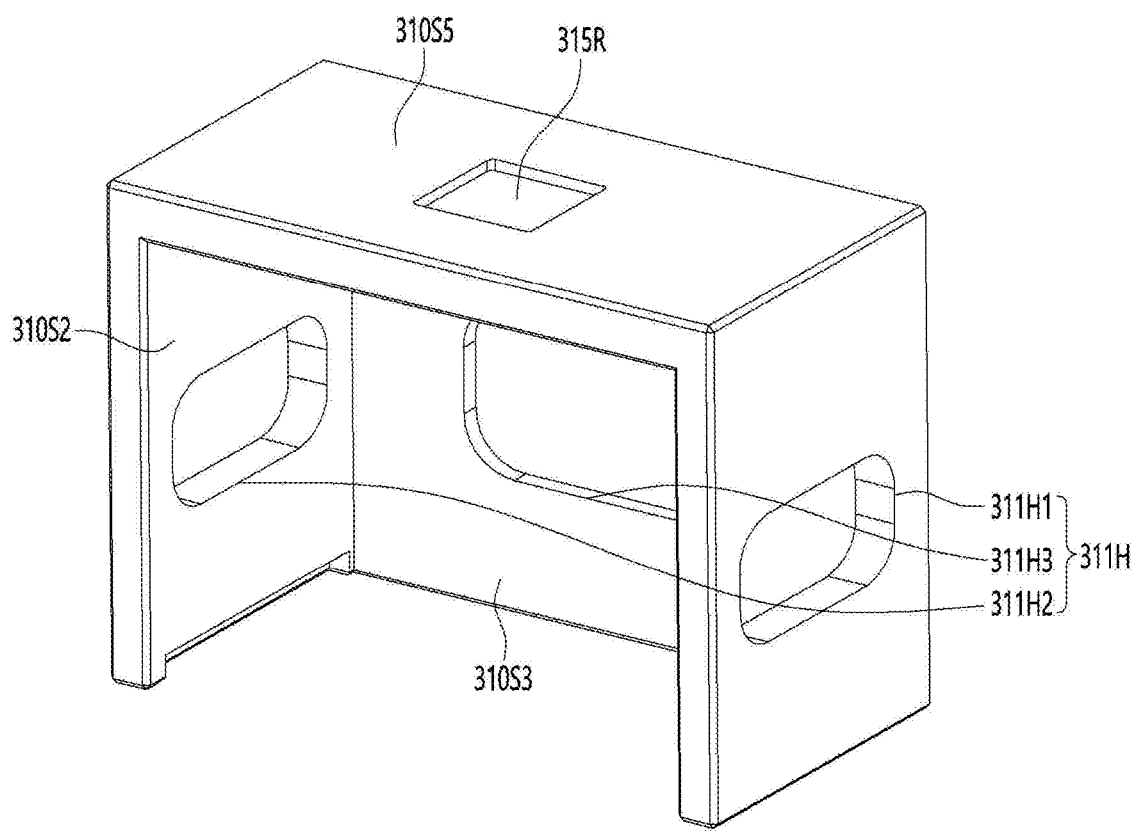

FIGS. 4C and 4D are perspective views of the housing 310 of the first embodiment of the second camera actuator 300.

Referring also to FIG. 4C and FIG. 4D, the housing 310 may include an accommodating space for accommodating the prism unit 330. The housing 310 may include a plurality of inner surfaces. For example, the housing 310 may include a first inner surface 310S1 corresponding to a first surface of the circuit board 321 of the driving part, a second inner surface 310S2 corresponding to a second surface of the circuit board 321 of the driving part, and a third inner surface 310S3 corresponding to a third surface of the circuit board 321 of the driving part.

Specifically, the housing 310 may include the first inner surface 310S1 corresponding to the first coil part 323a, the second inner surface 310S2 corresponding to the second coil part 323b, and the third inner surface 310S3 corresponding to the third coil part 323c.

In addition, the housing 310 may include a fourth inner surface 310S4 connected to the first inner surface 310S1 and the second inner surface 310S2, and connected to the third inner surface 310S3.

The housing 310 may include a plurality of housing holes 311H. The housing hole 311H may be a through-hole passing through an outer surface and an inner surface of the housing 310. The plurality of housing holes 311H may include first to third housing holes 311H1, 311H2, and 311H3. The first housing hole 311H1 may be a through-hole passing through the first inner surface 310S1 and an outer surface corresponding to the first inner surface 310S1. The second housing hole 311H2 may be a through-hole passing through the second inner surface 310S2 and an outer surface corresponding to the second inner surface 310S2. The third housing hole 311H3 may be a through-hole passing through the third inner surface 310S3 and an outer surface corresponding to the third inner surface 310S3.

The first housing hole 311H1 may be disposed in a region corresponding to the first coil part 323a. Further, the first housing hole 311H1 may have a size and shape corresponding to the first coil part 323a. Accordingly, the first coil part 323a may be disposed to be partially or wholly inserted into the first housing hole 311H1.

The second housing hole 311H2 may be disposed in a region corresponding to the second coil part 323b. Further, the second housing hole 311H2 may have a size and shape corresponding to the second coil part 323b. Accordingly, the second coil part 323b may be disposed to be partially or wholly inserted into the second housing hole 311H2.

The third housing hole 311H3 may be disposed in a region corresponding to the third coil part 323c. Further, the third housing hole 311H3 may have a size and shape corresponding to the third coil part 323c. Accordingly, the third coil part 323c may be disposed to be partially or wholly inserted into the third housing hole 311H3.

The housing 310 may include at least one recess. For example, a first recess 313R may be disposed on at least one inner surface of the housing 310. In detail, the first recess 313R may be disposed on the fourth inner surface 310S4 of the housing 310. The groove may have a concave shape on the fourth inner surface 310S4 in an outer surface direction (z-axis direction) of the housing 310.

The first recess 313R of the housing 310 may provide a space in which the moving plate 350 is disposed. Preferably, the recess 313R may provide a space in which a second moving protruding portion (described later) disposed on a second surface of the moving plate 350 is disposed.

The first recess 313R may be disposed to be spaced apart in a second direction (y-axis direction) with respect to a center of the inner surface. That is, the first recess 313R may include a first sub-first recess 313R1 disposed to be spaced apart in a +y-axis with respect to the center of the inner surface, and a second sub-first recess 313R2 disposed to be spaced apart in a −y-axis.

In addition, a second recess 315R may be disposed on the outer surface opposite to the inner surface in which the first recess 313R of the housing 310 is disposed. The second recess 315R may provide a space in which one configuration of the support portion 360 is disposed. For example, the second recess 315R may provide a space in which the second pulling member 362 is disposed.

At this time, the second recess 315R may be disposed at a position corresponding to a region between the first recesses 313R. That is, the second recesses 315R may be aligned in the z-axis direction from a central region between the first recesses 313R.

<Prism Unit of the First Embodiment>

Figure 4E:
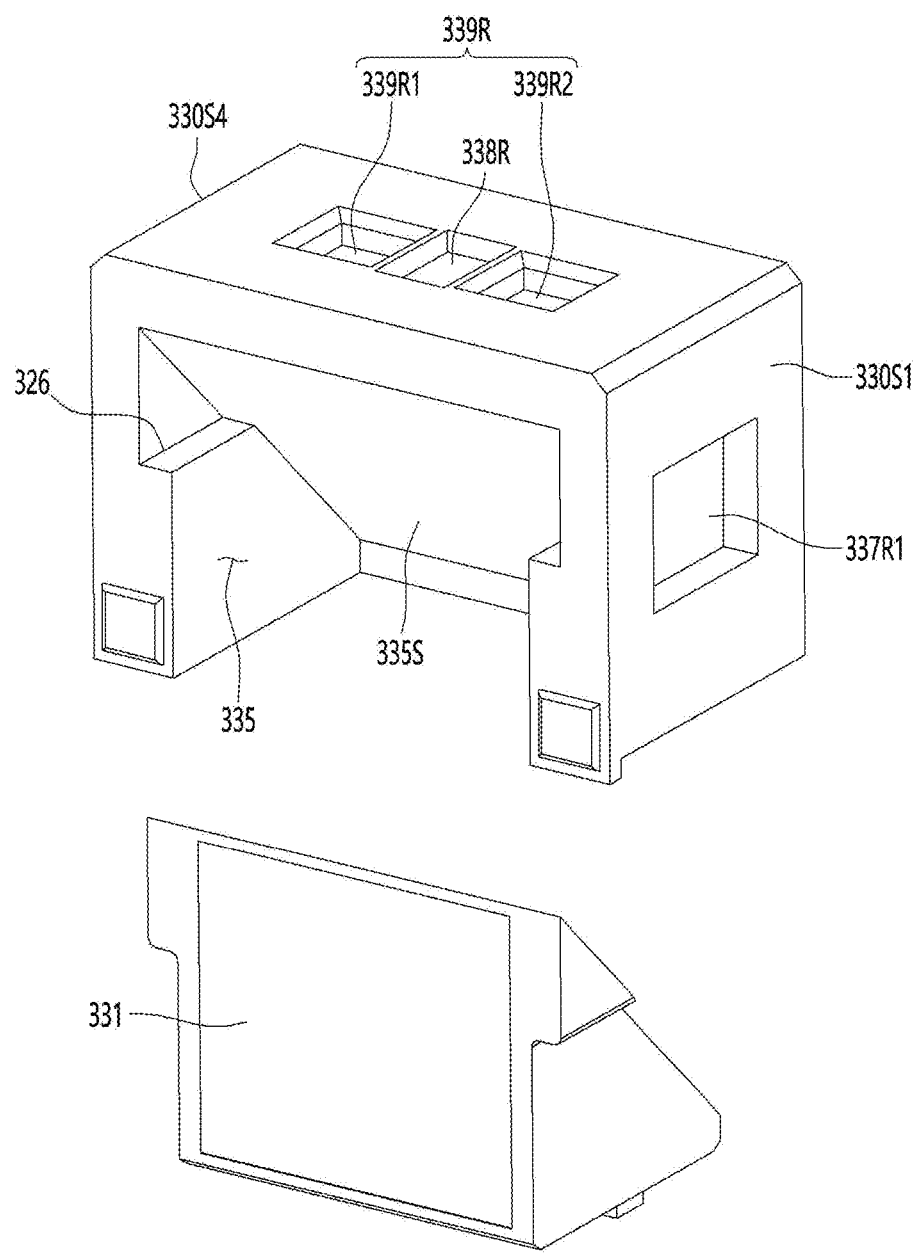
Figure 4F:
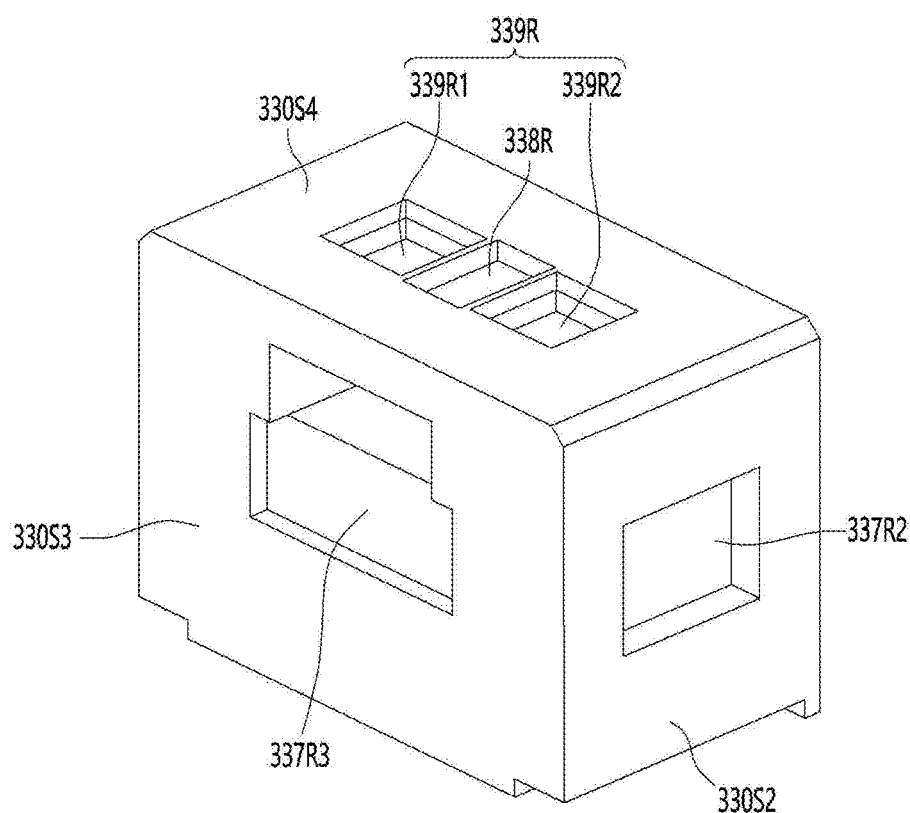
Figure 4G:
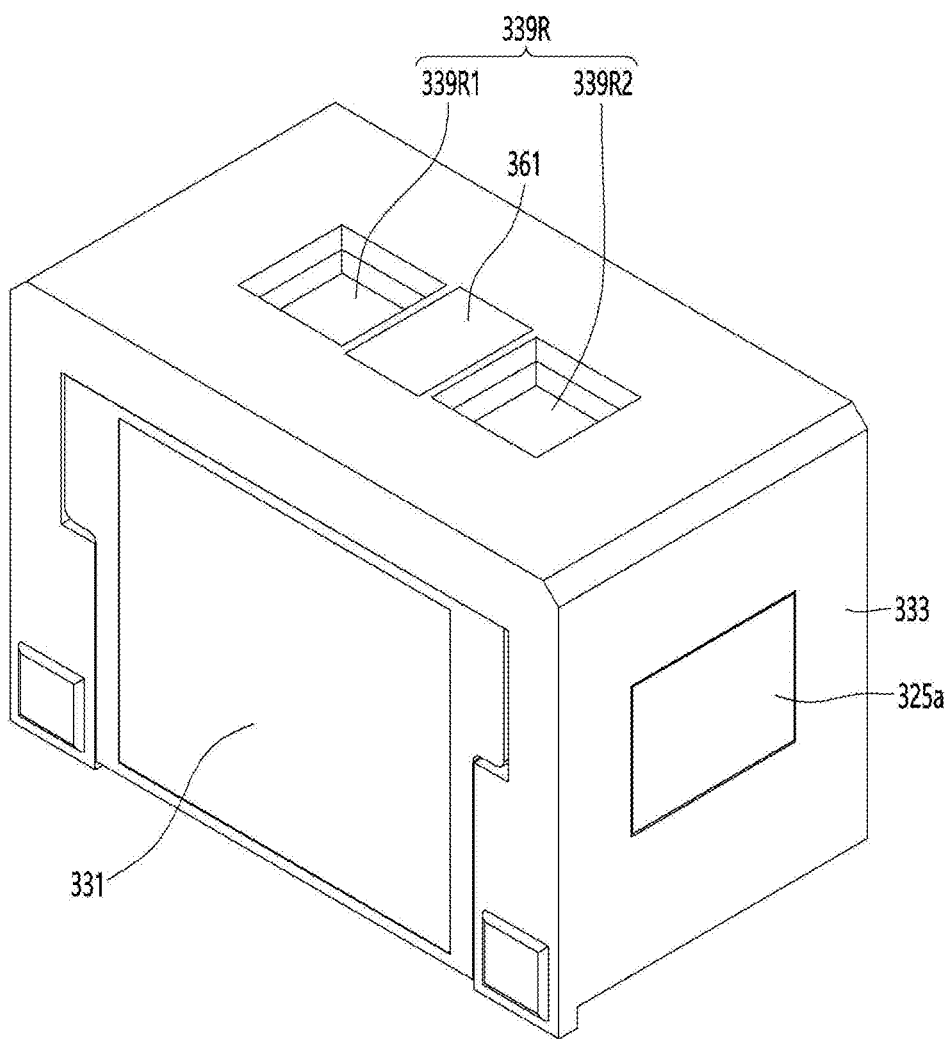

FIGS. 4E to 4G are views of the prism unit 330 of the first embodiment of the second camera actuator 300.

Referring also to FIGS. 4E to 4G, the prism unit 330 may be disposed in the housing 310. In detail, the prism unit 330 may be disposed in the accommodating space of the housing 310.

The prism unit 330 may include the prism 331 and the prism mover 333 disposed on the prism 331.

The prism 331 may be a right-angle prism. The prism 331 may reflect a direction of light incident from the outside. That is, the prism 331 may change a path of light incident on the second camera actuator 300 from the outside toward the first camera actuator 100.

The prism mover 333 may be disposed on the prism 331. The prism mover 333 may be disposed surrounding the prism 331. At least one side surface of the prism mover 333 may be open, and may include an accommodating space therein. In detail, the prism mover 333 may have a structure in which a plurality of outer surfaces connected to each other are open. As an example, the prism mover 333 may have a structure in which an outer surface corresponding to the prism 331 is open, and may include an accommodating space defined as a first space 335.

The prism mover 333 may include an inner surface 335S. The inner surface 335S may be an inner surface forming the first space 335. The first space 335 may have a shape corresponding to the prism 331. The inner surface 335S of the first space 335 may be in direct contact with the prism 331.

The prism mover 333 may include a step 326. The step 326 may be disposed in the first space 335. The step 326 may function to guide the prism 331 and/or as a seating portion. In detail, a protruding portion corresponding to the step 326 may be formed on the outside of the prism 331. The prism 331 may be disposed in the first space 335 with the protruding portion being guided by the step 326 of the prism mover 333. Accordingly, the prism mover 333 may effectively support the prism 331. In addition, the prism 331 may be seated at a set position, and may have improved alignment characteristics in the prism mover 333.

The prism unit 330 may include a plurality of outer surfaces. For example, the prism mover 333 of the prism unit 330 may include a plurality of outer surfaces. The prism mover 333 may include a first outer surface 330S1 corresponding to the first inner surface 310S1 of the housing 310, a second outer surface 330S2 corresponding to the second inner surface 310S2, a third outer surface 330S3 corresponding to the third inner surface 310S3, and a fourth outer surface 330S4 corresponding to the fourth inner surface 310S4.

The prism mover 333 may include a plurality of recesses.

Preferably, the prism mover 333 may include a fourth recess 338R and a fifth recess 339R. That is, the fourth recess 338R may be disposed in a region between the fifth recesses 339R.

The fourth recess 338R may be disposed in a central region of the fourth outer surface 330S4. In detail, the fourth recess 338R may be overlapped with the center of the fourth outer surface 330S4 in the z-axis direction. The fourth recess 338R may be disposed facing the recess 315R of the housing 310. Preferably, the third recess 338R may be disposed in a region overlapped with a center of the recess 315R of the housing 310 in the z-axis direction. The fourth recess 338R may provide a space in which one configuration of the support portion 360 is disposed. Preferably, the first pulling member 361 which is one configuration of the support portion 360 may be disposed in the fourth recess 338R. The first pulling member 361 may be a magnet, and may be a yoke alternatively. At this time, when the first pulling member 361 is the magnet, the second pulling member 362 may be a yoke. Further, when the first pulling member 361 is the yoke, the second pulling member 362 may be a magnet.

Accordingly, the fourth recess 338R may be disposed facing the second recess 315R disposed in the housing 310. That is, the third recess 338R may be overlapped with the second recess 315R of the housing 310 in the z-axis direction.

At this time, an adhesive member (not shown) may be applied to the fourth recess 338R. In addition, the first pulling member 361 may be disposed to be fixed in the fourth recess 338R by the adhesive member.

The fifth recess 339R may be disposed on the fourth outer surface 330S4 in plural. The fifth recess 339R may be provided in the same size as the fourth recess 338R, or may be provided in a different size from each other. The plurality of fifth recesses 339R may be disposed to be spaced apart from the fourth recesses 338R at a position adjacent to the fourth recesses 338R. Preferably, the fifth recess 339R may be disposed to be spaced apart from the fourth recess 338R. At this time, a depth of the fourth recess 338R may be different from that of the fifth recess 319R. Further, depths of the plurality of fifth recesses 319R may be the same.

The fifth recess 319R may be disposed to be spaced apart in the first direction around the fourth recess 338R.

For example, the plurality of fifth recesses 339R may include a first sub-fifth recess 339R1 and a second sub-fifth recess 339R2 that are spaced apart from the fourth recess 338R in a first direction (x-axis direction).

The fifth recess 319R may provide a space into which a first moving protruding portion of the moving plate 350 disposed on one surface of the moving plate 350 is inserted. At this time, the fourth recess 319R may be disposed at a position different from the first recess 313R of the housing in the z-axis direction.

The prism mover 333 may further include the plurality of recesses. The recess may be a groove having a concave shape on the outer surface of the prism mover 333 toward the first space 335. The plurality of recesses may include a first recess 337R1, a second recess 337R2, and a third recess 337R3. For example, the first recess 337R1 may be disposed on the first outer surface 330S1. The first recess 337R1 may be disposed in a region corresponding to the first housing hole 311H1. In addition, the second recess 337R2 may be disposed on the second outer surface 330S2. The second recess 337R2 may be disposed in a region corresponding to the second housing hole 311H2. In addition, the third recess 337R3 may be disposed on the third outer surface 330S3.

The third recess 337R3 may be disposed in a region corresponding to the third housing hole 311H3. That is, the first housing hole 311H1 may correspond to the first coil part 323a, and the second housing hole 311H2 may correspond to the second coil part 323b. In addition, the third housing hole 311H3 may correspond to the third coil part 323c.

The magnet 325 may be disposed in the first to third recesses 337R1, 337R2, and 337R3. For example, the first magnet 325a may be disposed in the first recess 337R1, the second magnet 325b is disposed in the second recess 337R2, and the third magnet 325c may be disposed in the third recess 337R3. In addition, these may be spaced apart from each other.

As described above, the prism mover 333 may include the fourth recess 338R in which the first pulling member 361 is disposed on the outer surface and the plurality of fifth recesses 339R disposed to be spaced apart from the fourth recess 338R in the x-axis direction.

<Moving Plate>

Figure 5A:
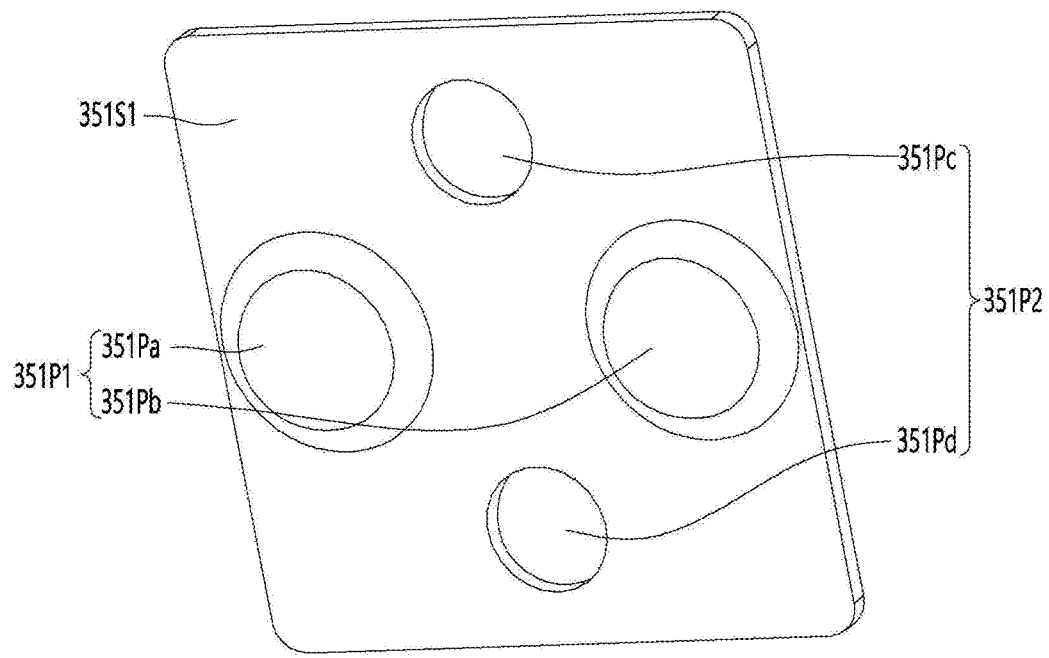
Figure 5B:
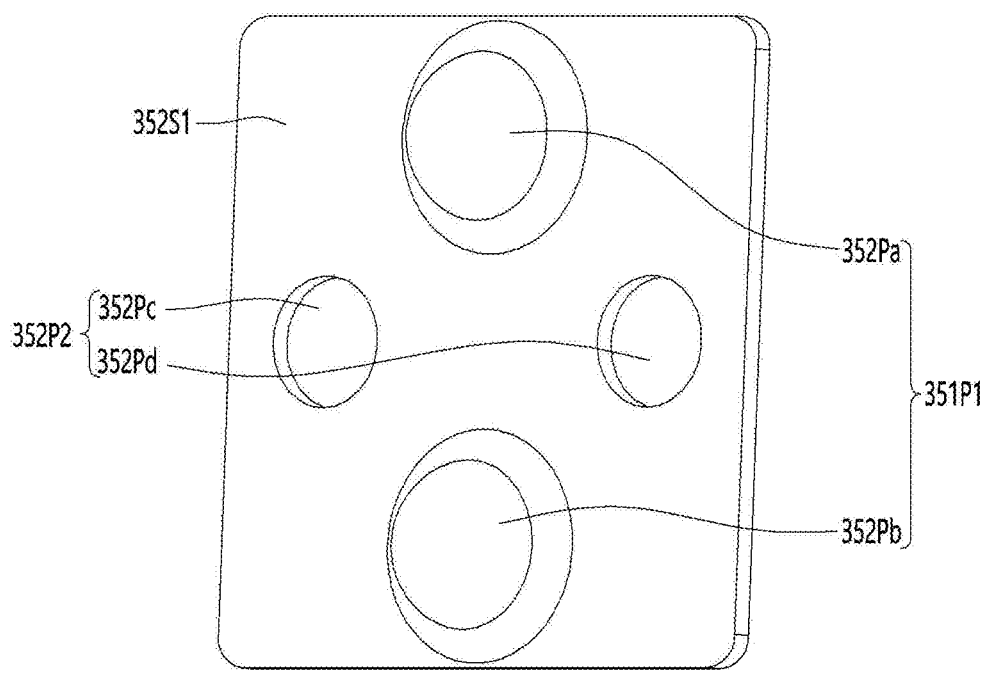

FIG. 5A is a front perspective view of the moving plate constituting the second camera actuator, and FIG. 5B is a rear perspective view of the moving plate constituting the second camera actuator.

Referring to FIGS. 5A and 5B, the moving plate 350 may include a first surface 351S1 and a second surface 352S1.

A plurality of moving protruding portions providing a rotation shaft for rotating or tilting the prism unit 330 in a second direction (e.g., a vertical direction or a y-axis direction) may be provided on one surface of the moving plate 350. A plurality of moving protruding portions providing a rotation shaft for rotating or tilting the prism unit 330 in a first direction (e.g., a left-right direction or an x-axis direction) may be provided on the other surface of the moving plate 350. Meanwhile, ends of the moving protruding portions disposed respectively on the first surface 351S1 and the second surface 352S1 of the moving plate 350, are illustrated as having round semicircular shapes in the drawings, but the embodiment is not limited thereto. That is, the ends of the moving protruding portions disposed respectively on the first surface 351S1 and the second surface 352S1 of the moving plate 350 may have not only a round surface but also a pointed triangular pyramid shape.

As described above, in the embodiment, rotation of the prism unit 330 in the first direction is performed by the plurality of moving protruding portions disposed on the other surface of the moving plate 350, and rotation of the prism unit 330 in the second direction is performed by the plurality of moving protruding portions disposed on the one surface of the moving plate 350.

At this time, the moving plate 350 may be disposed between the housing 310 and the prism unit 330.

The moving plate 350 may be disposed between the housing 310 and the prism unit 330, and may be pressed by the support portion 360 to be pressed and supported against the housing 310 together with the prism unit 330.

Here, the moving plate 350 includes the plurality of moving protruding portions on both sides.

At this time, the moving plate 350 may provide the rotation shaft in a moving direction of the prism unit 330 moved by an external driving force, for example, the coil part 323 and the magnet 325.

The moving plate 350 may include the first surface 351S1.

The first surface 351S1 may be a surface facing the fourth outer surface 330S4 of the prism unit 330.

A first moving protruding portion 351P1 and a first recess 351P2 may be disposed on the first surface 351S1 of the moving plate 350. The first moving protruding portion 351P1 functions as the rotation shaft rotating the prism unit 330 in the second direction. The first recess 351P2 may be a concave groove formed on the first surface 351S1 according to a second moving protruding portion 352P1 formed on the second surface 352S1 of the moving plate 350.

That is, the moving plate 350 may be a flat plate-shaped member, and the first and second moving protruding portions 351P1 and 352P1 are formed on both sides thereof, respectively. In addition, the first and second recesses 351P2 and 352P2 corresponding thereto may be formed on the opposite surface of the moving plate 350 according to formation of the first and second moving protruding portions 351P1 and 352P1.

The first moving protruding portion 351P1 may be disposed to be spaced apart in the first direction (x-axis direction) with respect to a central region of the first surface 351S1 of the moving plate 350. Here, the central region of the first surface 351S1 may be a region facing the first pulling member 361 disposed fixedly in the prism unit 330. Preferably, the central region of the first surface 351S1 may be a region overlapped with the first pulling member 361 disposed fixedly in the prism unit 330 in the z-axis direction.

In addition, the first moving protruding portions 351P1 may be disposed to be spaced apart in an x-axis direction of the central region. That is, the first moving protruding portion 351P1 may include a first sub-first moving protruding portion 351Pa disposed to be spaced apart in a −x-axis direction with respect to the central region and a second sub-first moving protruding portion 351Pb disposed to be spaced apart in a +x-axis direction with respect to the central region.

The first sub-first moving protruding portion 351Pa may correspond to the first sub-fifth recess 339R1. That is, at least a part of the first sub-first moving protruding portion 351Pa may be disposed in the first sub-fifth recess 339R1. That is, at least the part of the first sub-first moving protruding portion 351Pa may be inserted into the first sub-fifth recess 339R1. At this time, a height of the first sub-first moving protruding portion 351Pa may be greater than a depth of the first sub-fifth recess 319R1. Accordingly, only the part of the first sub-first moving protruding portion 351Pa may be inserted into the first sub-fifth recess 339R1. Accordingly, the first surface 351S1 of the moving plate 350 may be spaced apart from the fourth outer surface 330S4 of the prism mover 333 by a predetermined distance in a state in which at least the part of the first sub-first moving protruding portion 351Pa is inserted into the first sub-fifth recess 319R1.

The second sub-first moving protruding portion 351Pb may correspond to the second sub-fifth recess 339R2. That is, at least a part of the second sub-first moving protruding portion 351Pb may be disposed in the second sub-fifth recess 339R2. That is, at least a part of the second sub-first moving protruding portion 351Pb may be inserted into the second sub-fifth recess 339R2. At this time, a height of the second sub-first moving protruding portion 351Pb may be greater than that of the second sub-fifth recess 339R2. Accordingly, only the part of the second sub-first moving protruding portion 351Pb may be inserted into the second sub-fifth recess 339R2. Accordingly, the first surface 351S1 of the moving plate 350 may be spaced apart from the fourth outer surface 330S4 of the prism mover 333 by a predetermined distance in a state in which at least the part of the second sub-first moving protruding portion 351Pb is inserted into the second sub-fifth recess 339R2.

In addition, the first sub-first moving protruding portion 351Pa and the second sub-first moving protruding portion 351Pb may be arranged in the x-axis direction with respect to a center of the moving plate 350, and accordingly, may provide the rotation shaft for rotation of the prism unit 330 in the second direction. That is, the prism unit 330 may be provided so as to enable rotational movement in the second direction (vertical direction) with a virtual first line formed by the first sub-first moving protruding portion 351Pa and the second sub-first moving protruding portion 351Pb as a reference axis.

The first recesses 351P2 may be disposed to be spaced apart in the second direction (y-axis direction) with respect to the central region of the first surface 351S1 of the moving plate 350. Here, the central region of the first surface 351S1 may be a region facing the first pulling member 361 disposed fixedly in the prism unit 330. Preferably, the central region of the first surface 351S1 may be a region overlapped with the first pulling member 361 disposed fixedly in the prism unit 330 in the z-axis direction.

In addition, the first recess 351P2 may be disposed to be spaced apart in a y-axis direction of the central region. That is, the first recess 351P2 may include a first sub-first recess 351Pc disposed to be spaced apart in a +y-axis direction with respect to the central region and a second sub-first recess 351Pd disposed to be spaced apart in a −y-axis direction with respect to the central region.

The first sub-first recess 351Pc and the second sub-first recess 351Pd may correspond to the second moving protruding portion 351P1 formed at the second surface 352S1 of the moving plate 350.

In addition, the moving plate 350 may include the second surface 352S1.

The second surface 352S1 may be a surface facing the fourth inner surface 310S4 of the housing 310.

The second moving protruding portion 352P1 and the second recess 352P2 may be disposed at the second surface 352S1 of the moving plate 350. The second moving protruding portion 352P1 functions as the rotation shaft rotating the prism unit 330 in the first direction.

The second moving protruding portion 352P1 may be disposed to be spaced apart in the second direction (y-axis direction) with respect to a central region of the second surface 352S1 of the moving plate 350. Here, the central region of the second surface 352S1 may be a region facing the first pulling member 361 disposed fixedly in the prism unit 330 or the second pulling member 362 disposed fixedly in the housing 310. Preferably, the central area of the second surface 352S1 may be a region overlapped with the first pulling member 361 disposed fixedly in the prism unit 330 in the z-axis direction.

In addition, the second moving protruding portion 352P1 may be disposed to be spaced apart in the x-axis direction of the center region. That is, the second moving protruding portion 352P1 may include the first sub-second moving protruding portion 352Pa disposed to be spaced apart in a +y-axis direction with respect to the central region and a second sub-second moving protruding portion 352Pb disposed to be spaced apart in a −y-axis direction with respect to the central region.

The first sub-second moving protruding portion 352Pa and the second sub-second moving protruding portion 352Pb may correspond to the first sub-first recess 313R1 and the second sub-first recess 313R2 of the housing 310.

That is, the first sub-second moving protruding portion 352Pa and the second sub-second moving protruding portion 352Pb may be inserted into the first sub-first recess 313R1 and the second sub-first recess 313R2.

In addition, the first sub-second moving protruding portion 352Pa and the second sub-second moving protruding portion 352Pb may be arranged in the y-axis direction with respect to a center of the moving plate 350, and accordingly, may provide the rotation shaft for rotation of the prism unit 330 in the first direction. That is, the prism unit 330 may be provided so as to enable rotational movement in the first direction (left-right direction) with a virtual second line formed by the first sub-second moving protruding portion 352Pa and the second sub-second moving protruding portion 352Pb as a reference axis.

The second recesses 352P2 may be disposed to be spaced apart in the first direction (x-axis direction) with respect to the central region of the second surface 352S1 of the moving plate 350. Here, the central region of the second surface 352S1 may be a region facing the first pulling member 361 disposed fixedly in the prism unit 330. Preferably, the central region of the second surface 352S1 may be a region overlapped with the first pulling member 361 disposed fixedly in the prism unit 330 in the z-axis direction.

In addition, the second recess 352P2 may be disposed to be spaced apart in an x-axis direction of the central region. That is, the second recess 352P2 may include a first sub-second recess 352Pc disposed to be spaced apart in a −x-axis direction with respect to the central region and a second sub-second recess 352Pd disposed to be spaced apart in a +x-axis direction with respect to the central region.

Figure 6A:
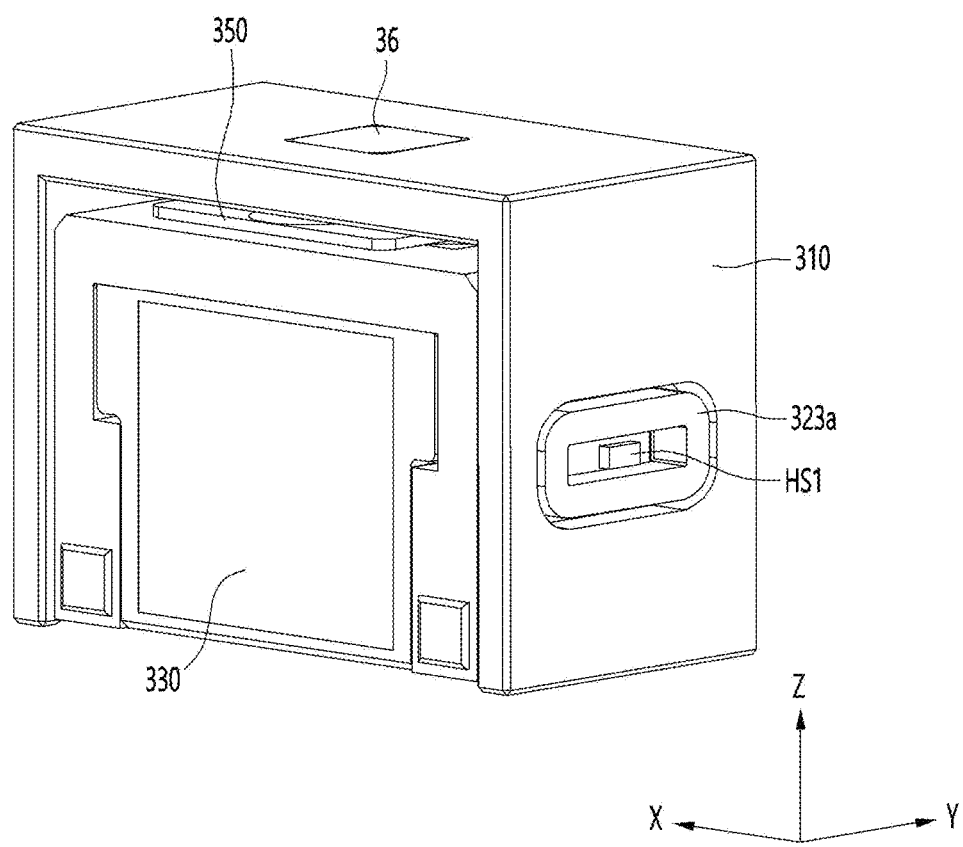
FIGS. 6A and 6B are views showing a coupling relationship between a housing, a prism unit, a support portion 360, and a moving plate in a second camera actuator.
Figure 6B:
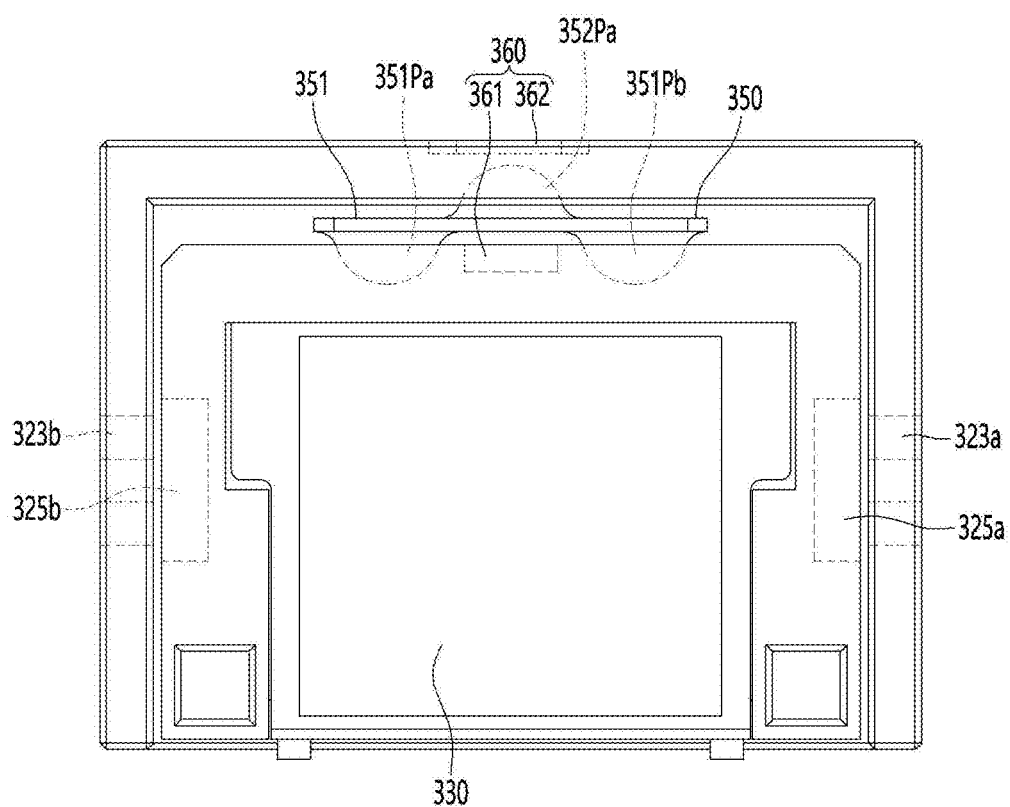

FIGS. 6A and 6B are views showing a coupling relationship between a housing, a prism unit, a support portion 360, and a moving plate in a second camera actuator.

Referring to FIGS. 6A and 6B, a second camera actuator according to an embodiment may include a moving plate 350. In addition, a support portion 360 generating attractive force to each other may be disposed on a surface facing each other between a housing 310 and a prism unit 330. That is, a first pulling member 361 may be disposed on one surface of the prism unit 330 (more specifically, a prism mover). A second pulling member 362 may be disposed on one surface of the housing 310 facing one surface of the prism unit 330. At this time, the first pulling member 361 may be a magnet, and may be a yoke alternatively. At this time, when the first pulling member 361 is the magnet, the second pulling member 362 may be a yoke. Further, when the first pulling member 361 is the yoke, the second pulling member 362 may be a magnet.

Meanwhile, the first pulling member 361 may be the magnet, and the second pulling member 362 may be the yoke. At this time, a horizontal width of the yoke may be greater than that of the magnet. Accordingly, the first pulling member 361 and the second pulling member 362 may allow the prism unit 330 to have a restoring force to an initial position (a central position before being tilted vertically and horizontally).

The prism unit 330 may be pressed against the housing 310 in a state in which the moving plate 350 is inserted between the prism unit 330 and the housing 310 by the support portion 360. Therefore, the prism unit 330 and the moving plate 350 may be supported by the housing 310.

Centers of the first pulling member 361, the moving plate 350, and the second pulling member 362 may be overlapped with each other in the z-axis direction.

At this time, the first moving protruding portion 351P1 of the moving plate 350 may be inserted into the fifth recess 339R of the prism unit 330.

A first sub-first moving protruding portion 351Pa may be inserted into the first sub-fifth recess 339R1, and the second sub-first moving protruding portion 351Pb may be inserted into the second sub-fifth recess 339R2.

In addition, the first sub-second moving protruding portion 352Pa and the second sub-second moving protruding portion 352Pb may be inserted into the first sub-first recess 313R1 and the second sub-first recess 313R2 of the housing 310.

In addition, the first sub-second moving protruding portion 352Pa and the second sub-second moving protruding portion 352Pb may be arranged in the y-axis direction with respect to the center of the moving plate 350, and accordingly, may provide a rotation shaft for rotation of the prism unit 330 in the first direction. That is, the prism unit 330 may be provided so as to enable rotational movement in the first direction (left-right direction) with a virtual second line formed by the first sub-second moving protruding portion 352Pa and the second sub-second moving protruding portion 352Pb as a reference axis.

Accordingly, the first moving protruding portions disposed on one surface of the moving plate 350 serve as a rotation shaft for rotating the prism unit 330 in the second direction corresponding to the y-axis, and the second moving protruding portions disposed on the other surface of the moving plate 350 serve as a rotation shaft for rotating the prism unit 330 in the first direction corresponding to the x-axis.

In addition, in the embodiment, there is a technical effect that occurrence of a decenter or tilt phenomenon may be minimized to achieve the best optical characteristics when the OIS is implemented by controlling a tilt of the prism unit 330 with respect to a first axis or a second axis by electromagnetic force between first to third magnets 325a, 325b, and 325c and first to third coil parts 323a, 323b, and 323c disposed on the prism mover 333.

For example, in the embodiment, there is a technical effect that occurrence of a decenter or tilt phenomenon may be minimized to achieve the best optical characteristics when the OIS is implemented and an ultra-thin and ultra-small camera actuator may be implemented by controlling the tilt of the prism unit 330 with respect to the first axis or the second axis by driving force of the driving part 320, in a state in which the moving plate 350 is disposed between the housing 310 and the prism unit 330.

Meanwhile, the second pulling member 362 may be disposed fixedly in the housing 310 as described above. At this time, the embodiment is not limited thereto, and when the second pulling member 362 is a region overlapped with the first pulling member 361 in the z-axis direction, an arrangement position may be changed.

Figure 7A:
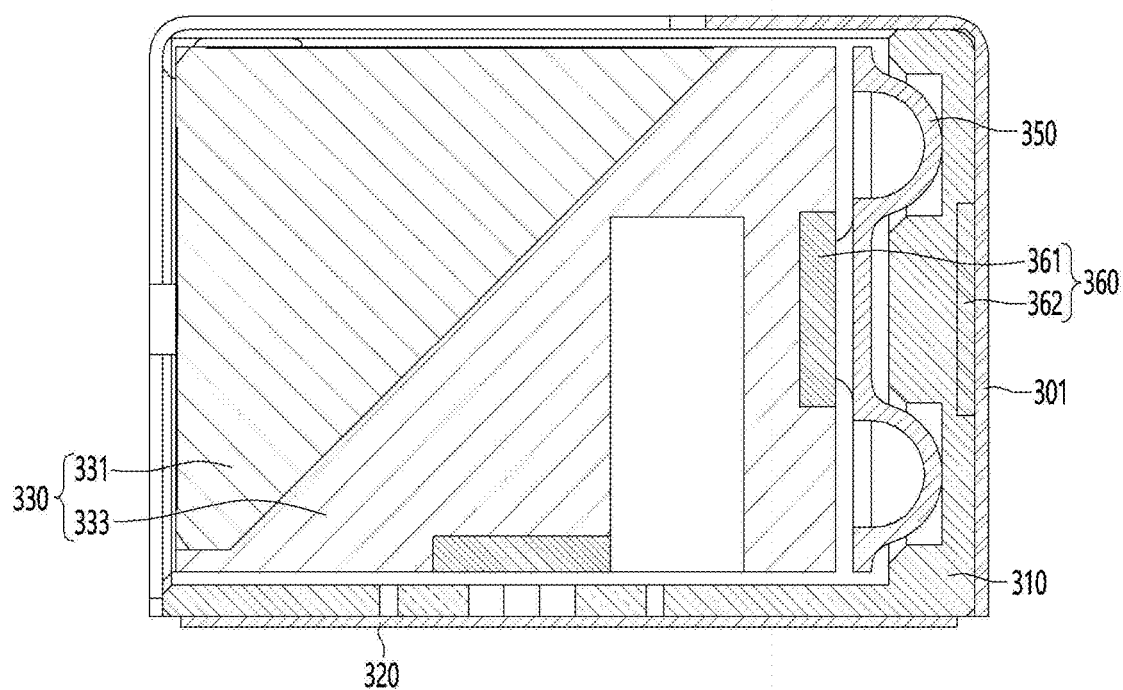
FIGS. 7A and 7B are views showing a modification example of an arrangement position of a second pulling member according to an embodiment.
Figure 7B:
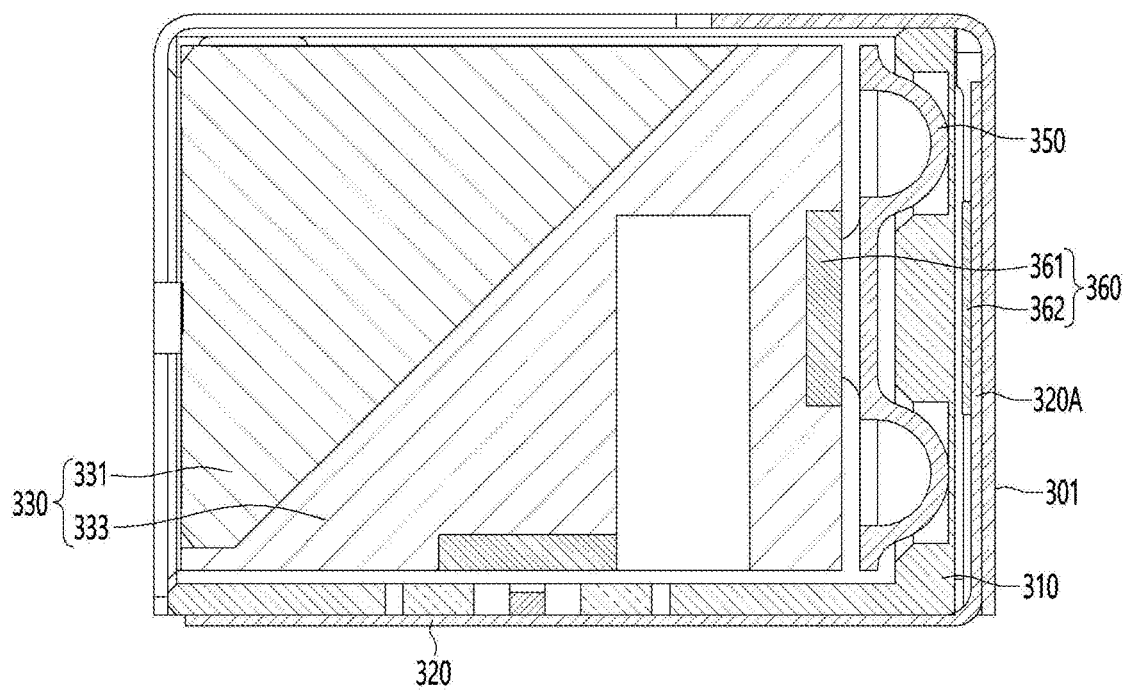

FIG. 7A and FIG. 7B are views showing a modification example of an arrangement position of a second pulling member according to an embodiment.

In FIGS. 3A-6B, the second pulling member 362 was disposed in the housing 310. Preferably, the second pulling member 362 is disposed fixedly in the second recess 315R of the housing 310.

Alternatively, referring to FIG. 7A, the second pulling member 362 may be disposed on the cover member 301.

That is, the second pulling member 362 may be attached to the cover member 301.

In other words, the second pulling member 362 may be disposed fixedly on an inner surface of the cover member 301 overlapped with the first pulling member 361 in the z-axis direction.

In addition, referring to FIG. 7B, the second pulling member 362 may be disposed on the circuit board 321 of the driving part, other than the housing 310 and the cover member 301.

For a while, referring to FIG. 4B, the circuit board 321 of the driving part had a 'ㄷ' shape. At this time, the circuit board 321 of the driving part may have a shape of which a front surface, a rear surface, and an upper surface are open.

Alternatively, the circuit board 321 of the driving part may further include a region corresponding to the rear surface, in other words, a substrate region disposed between the housing 310 and the cover member 301.

In addition, the region may be disposed between the housing 310 and the cover member 301.

In addition, the second pulling member 362 may be attached to the substrate region.

In conclusion, the second pulling member 362 may be disposed in various positions according to the embodiment. As an example, the second pulling member 362 may be disposed on the inner surface of the housing 310 facing the prism unit. In addition, the second pulling member 362 may be disposed on the outer surface of the housing 310 alternatively. Further, the second pulling member 362 may be exposed through an opening of the housing 310, and may be disposed on the inner surface of the cover member 301. Furthermore, the second pulling member 362 may be disposed on the circuit board 321 of the driving part surrounding the outer surface of the housing 310.

Figure 8:
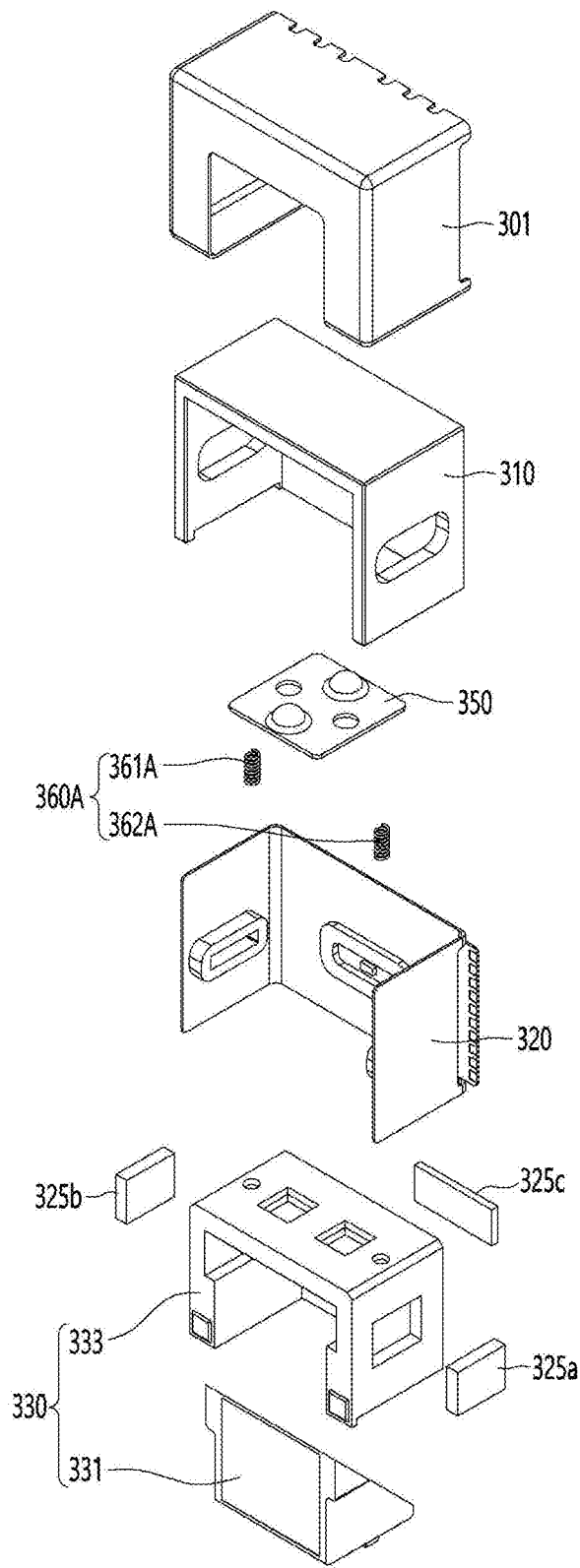
FIG. 8 is an exploded perspective view of a second camera actuator according to a second embodiment.

FIG. 8 is an exploded perspective view of a second camera actuator according to a second embodiment.

Referring to FIG. 8, the second camera actuator according to the second embodiment may include a housing 310, a driving part 320 disposed on the housing 310, and a prism unit 330 disposed on the driving part 320.

In addition, the second camera actuator 300 may further include a cover member 301.

In addition, the second camera actuator 300 may further include a support portion 360A.

At this time, the support portion 360A in the second embodiment may include at least two elastic members 361A and 362A, and may allow the prism unit 330 to be supported while being pressed against the housing 310 by elastic force of the two elastic members 361A and 362A.

That is, the support portion 360 in the first embodiment may allow the prism unit 330 to be supported while being pressed against the housing 310 by attractive force generated by the first pulling member 361 and the second pulling member 362.

Alternatively, the support portion 360A in the second embodiment allows the prism unit 330 to be pressed against the housing 310 by at least two elastic members 361A and 362A.

To this end, the housing 310 and the prism mover 333 in the first embodiment included a recess for inserting and seating the first pulling member 361 and the second pulling member 362. Alternatively, the housing 310 and the prism mover 333 in the second embodiment may include a recess into which the elastic members 361A and 362A are inserted and fixed.

That is, the first embodiment and the second embodiment may be classified by a pressure method in which the prism unit 330 is pressed against the housing 310.

<Housing of the Second Embodiment>

Figure 9A:
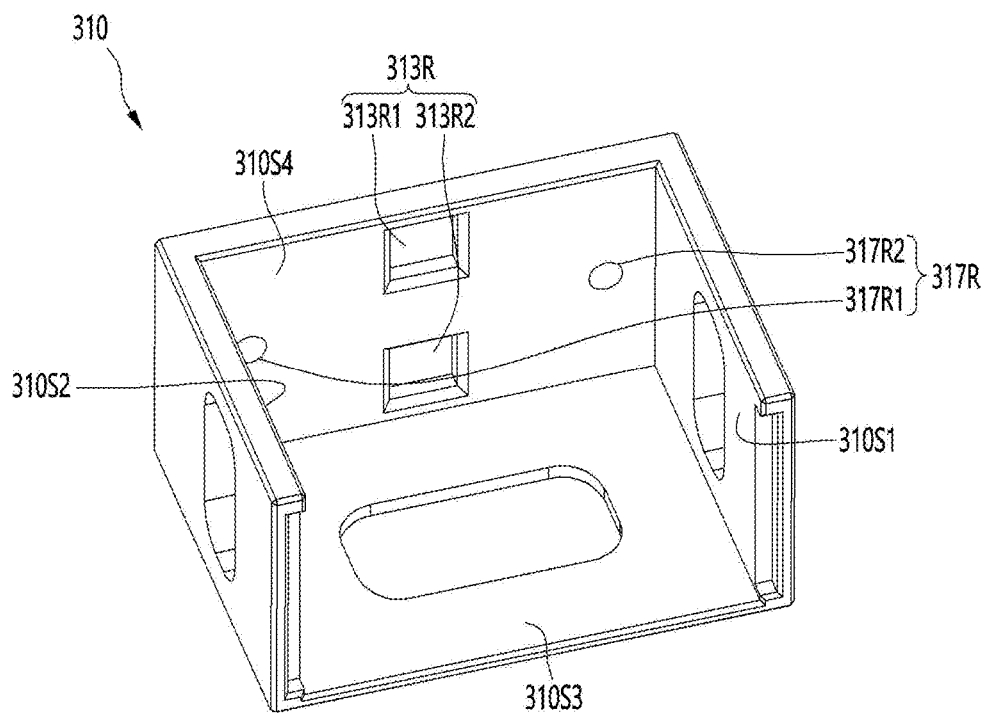
FIG. 9A is a perspective view of a housing of the second embodiment of the second camera actuator.
Figure 9B:
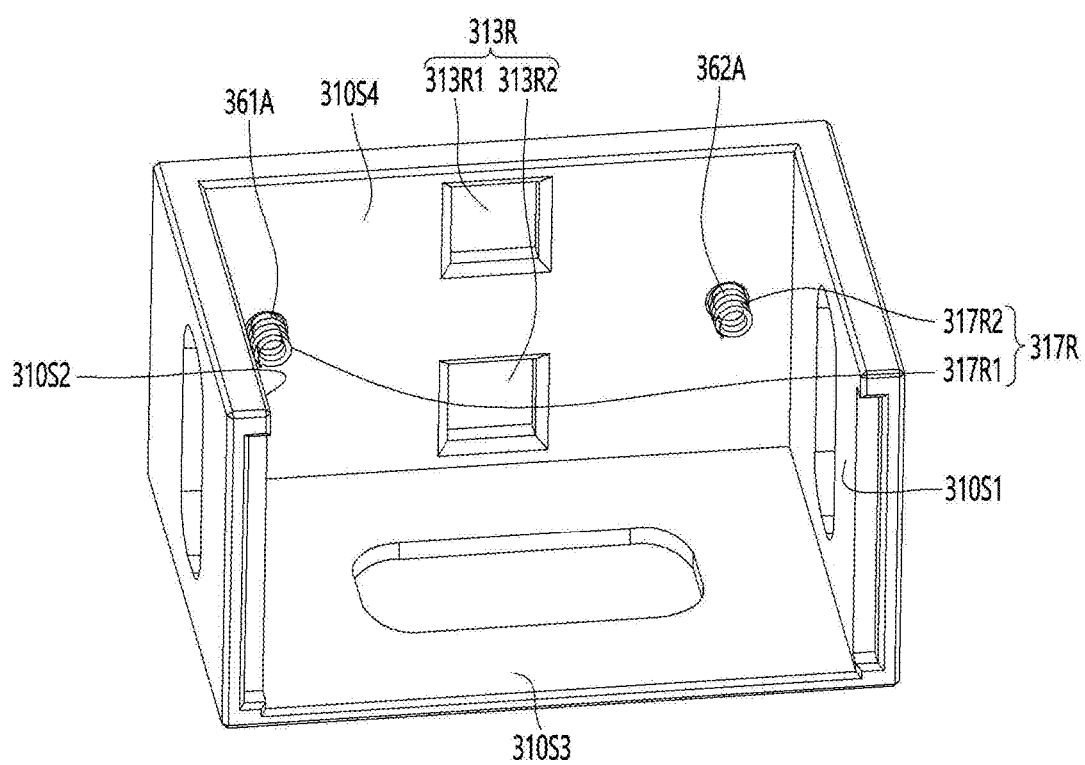
FIG. 9B is a coupling view in which an elastic member of a support portion is coupled to the housing of FIG. 9A.

FIG. 9A is a perspective view of the housing 310 of the second embodiment of the second camera actuator 300, and FIG. 9B is a coupling view in which an elastic member of a support portion is coupled to the housing of FIG. 9A.

Referring also to FIG. 9A and FIG. 9B, the housing 310 may include an accommodating space for accommodating the prism unit 330. The housing 310 may include a plurality of inner surfaces. For example, the housing 310 may include a first inner surface 310S1 corresponding to a first surface of the circuit board 321 of the driving part, a second inner surface 310S2 corresponding to a second surface of the circuit board 321 of the driving part, and a third inner surface 310S3 corresponding to a third surface of the circuit board 321 of the driving part.

Specifically, the housing 310 may include the first inner surface 310S1 corresponding to the first coil part 323a, the second inner surface 310S2 corresponding to the second coil part 323b, and the third inner surface 310S3 corresponding to the third coil part 323c.

The housing 310 may include at least one recess. For example, a first recess 313R may be disposed on at least one inner surface of the housing 310. In detail, the first recess 313R may be disposed on the fourth inner surface 310S4 of the housing 310. The groove may have a concave shape on the fourth inner surface 310S4 in an outer surface direction (z-axis direction) of the housing 310.

The first recess 313R of the housing 310 may provide a space in which the moving plate 350 is disposed. Preferably, the recess 313R may provide a space in which a second moving protruding portion (described later) disposed on a second surface of the moving plate 350 is disposed.

The first recesses 313R may be disposed to be spaced apart in a second direction (y-axis direction) with respect to the center of the inner surface. That is, the first recess 313R may include a first sub-first recess 313R1 disposed to be spaced apart in a +y-axis with respect to the center of the inner surface, and a second sub-first recess 313R2 disposed to be spaced apart in a −y-axis.

In addition, the housing 310 may further include a second recess 317R.

The second recess 317R may provide a space in which a support portion 360A is disposed. The second recess 317R may include a plurality of sub-second recesses disposed to be spaced apart in a first direction around a central region of the fourth inner surface 310S4 of the housing 310. Preferably, the second recess 317R may be disposed outside rather than a region between the first recesses 313R.

Accordingly, a virtual straight line connecting the first recess 313R of the housing 310 may be orthogonal to a virtual straight line connecting the second recess 317R.

That is, the second recess 317R may include a first sub-second recess 317R1 spaced apart in a −x-axis with respect to the central region and a second sub-second recess 317R2 spaced apart in a +x-axis with respect to the central region. The first sub-second recess 317R1 may be disposed so as to be adjacent to the second inner surface 310S2 of the housing 310. Further, the second sub-second recess 317R2 may be disposed so as to be adjacent to the third inner surface 310S3 of the housing 310.

Meanwhile, the support portion 360A may include a first elastic member 361A and a second elastic member 362A.

In addition, the first elastic member 361A and the second elastic member 362A of the support portion 360A may be coupled to the housing 310.

For example, one end portion of the first elastic member 361A may be disposed fixedly in the first sub-second recess 317R1. In addition, one end portion of the second elastic member 362A may be disposed fixedly in the second sub-second recess 317R2.

<Prism Unit of the Second Embodiment>

Figure 9C:
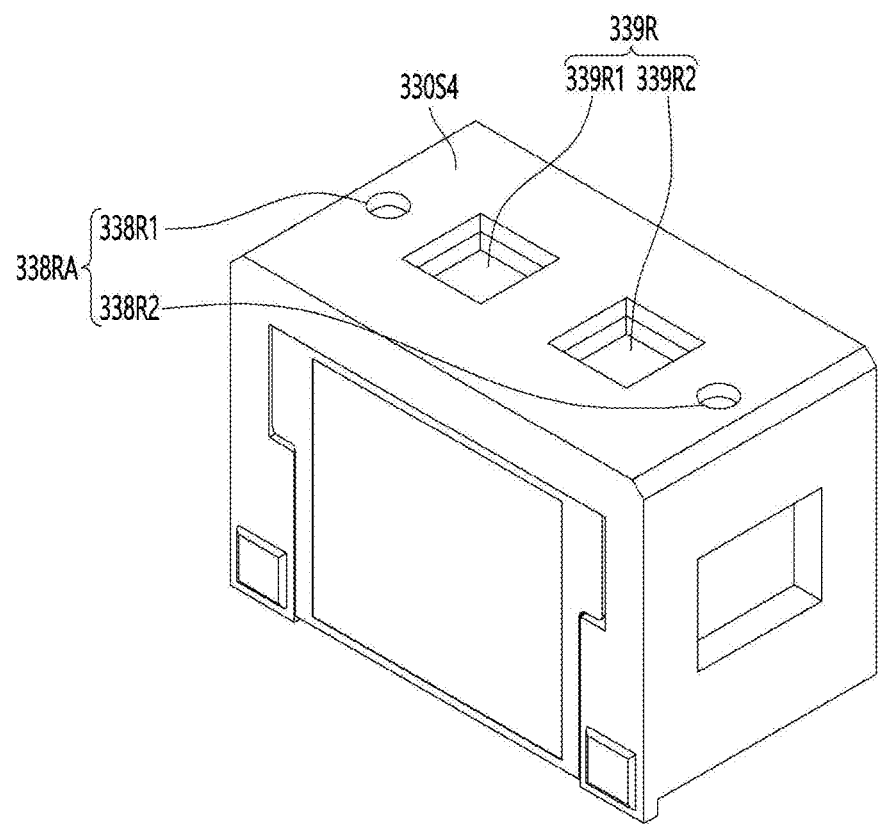
FIG. 9C is a perspective view of a prism unit of the second embodiment of the second camera actuator.
Figure 9D:
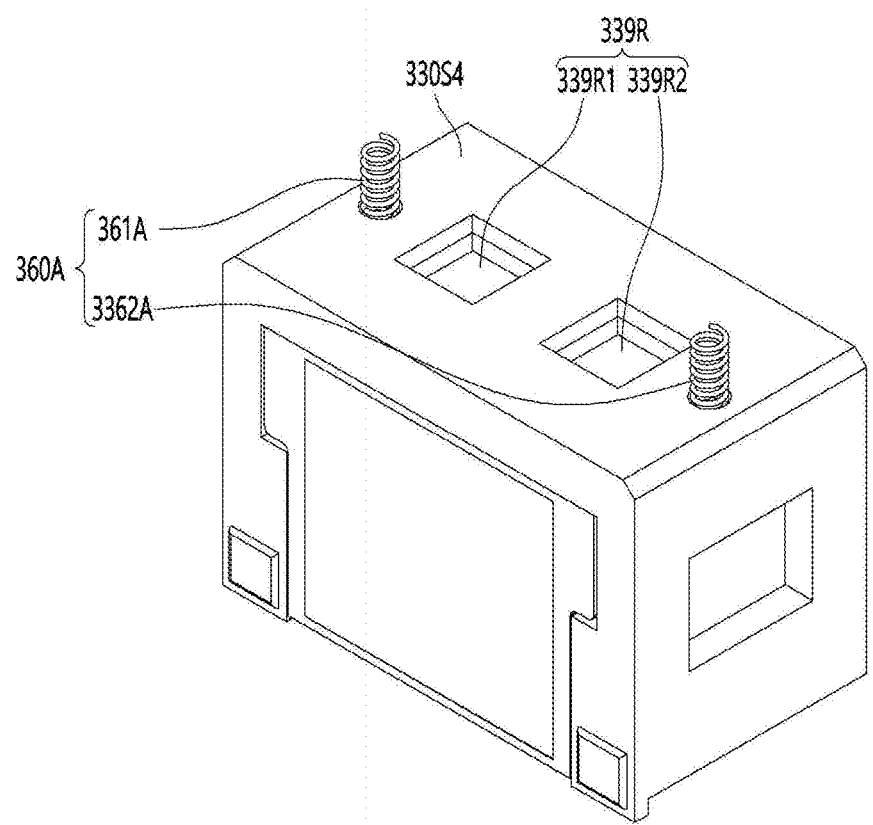
FIG. 9D is a coupling view in which the elastic member of the support portion is coupled to the prism unit of FIG. 9B.
Figure 9E:
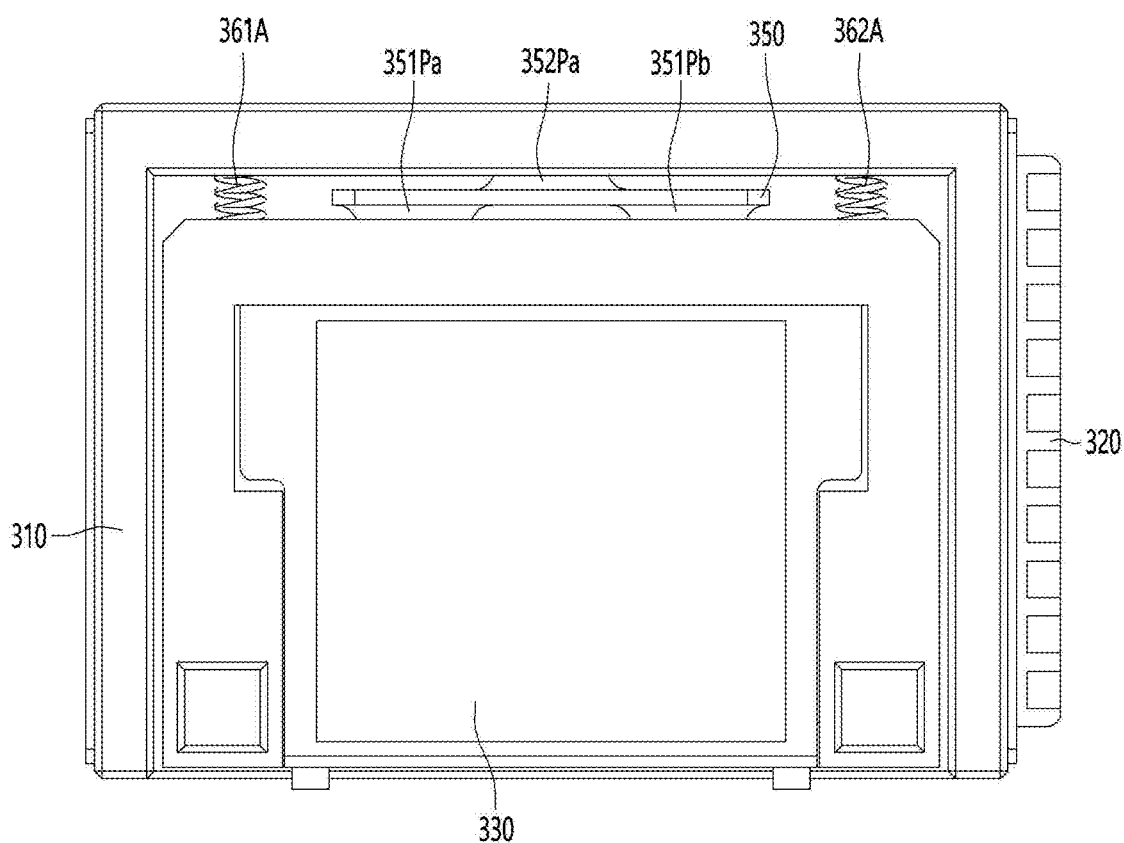
FIG. 9E is a coupling view of a support portion, a prism unit, and a housing.

FIG. 9C is a perspective view of the prism unit 330 of the second embodiment of the second camera actuator 300, and FIG. 9D is a coupling view in which the elastic member of the support portion is coupled to the prism unit 330 of FIG. 9B, and FIG. 9E is a coupling view of the support portion, the prism unit, and the housing.

Referring also to FIGS. 9C to 9E, the prism unit 330 may be disposed in the housing 310. In detail, the prism unit 330 may be disposed in the accommodating space of the housing 310.

The prism unit 330 may include the prism 331 and the prism mover 333 disposed on the prism 331.

The prism unit 330 may include a plurality of outer surfaces. For example, the prism mover 333 of the prism unit 330 may include the plurality of outer surfaces. The prism mover 333 may have a first outer surface 330S1 corresponding to the first inner surface 310S1, a second outer surface 330S2 corresponding to the second inner surface 310S2 of the housing 310, a third outer surface 330S3 corresponding to the third inner surface 310S3, and a fourth outer surface 330S4 corresponding to the fourth inner surface 310S4.

The prism mover 333 may include a plurality of recesses.

Preferably, the prism mover 333 may include the fourth recess 338RA and the fifth recess 339R. At this time, a virtual straight line connecting the fourth recess 338RA may be parallel to a virtual straight line connecting the fifth recess 339R. In addition, the fourth recess 338RA may be disposed outside rather than a region between the fifth recesses 339R.

The fifth recess 339R may be disposed on the fourth outer surface 330S4a in plural. The fifth recess 319R may be disposed to be spaced apart in the first direction around the central region of the fourth outer surface 330S4.

For example, the plurality of fifth recesses 339R may include a first sub-fifth recess 339R1 and a second sub-fifth recess 339R2 that are spaced apart in the first direction (x-axis direction) with respect to the central region of the fourth outer surface 330S4.

The fifth recess 319R may provide a space into which a first moving protruding portion of the moving plate 350 disposed on one surface of the moving plate 350 is inserted. At this time, the fourth recess 319R may be disposed at a position different from the first recess 313R of the housing in the z-axis direction.

In addition, the fourth recess 338RA may be disposed on a virtual first line connecting the first sub-fifth recess 339R1 and the second sub-fifth recess 339R2. The fourth recess 338RA may provide a space in which the first elastic member 361A and the second elastic member 362A are disposed. That is, the fourth recess 338RA may include a first sub-fourth recess 338R1 disposed so as to be adjacent to the first sub-fifth recess 339R1, and a second sub-fourth recess 338R2 disposed so as to be adjacent to the second sub-fifth recess 339R2.

The first sub-fourth recess 338R1 of the prism mover 333 may correspond to the first sub-second recess 317R1 of the housing 310. That is, the first sub-fourth recess 338R1 may be disposed facing the first sub-second recess 317R1 of the housing 310 in the z-axis direction.

Further, the second sub-fourth recess 338R2 of the prism mover 333 may correspond to the second sub-second recess 317R2 of the housing 310. That is, the second sub-fourth recess 338R2 may be disposed facing the second sub-second recess 317R2 of the housing 310 in the z-axis direction.

At this time, the other end of the first elastic member 361A of which one end is inserted into the first sub-second recess 317R1 of the housing 310 may be disposed fixedly in the first sub-fourth recess 338R1 of the prism mover 333.

Further, the other end of the second elastic member 362A of which one end is inserted into the second sub-second recess 317R2 of the housing 310 may be disposed fixedly in the second sub-fourth recess 338R2 of the prism mover 333.

That is, one end and the other end of the first elastic member 361A and the second elastic member 362A may be coupled to the prism mover 333 and the housing 310, respectively.

In other words, the prism unit 330 may be pressed and supported against the housing 310 by the elastic force of the first elastic member 361A and the second elastic member 362A. At this time, the moving plate 350 may be disposed between the prism unit 330 and the housing 310. The moving plate 350 may be disposed between the prism unit 330 and the housing 310 by a method as follow.

First, the first elastic member 361A and the second elastic member 362A are respectively coupled to the housing 310 and the prism unit 330, respectively.

After pulling the prism unit 330 in the z-axis direction opposite to the housing 310, the moving plate 350 may be fitted into the space between the prism unit 330 and the housing 310. In addition, after the moving plate 350 is fitted, the moving plate 350 may be supported by the housing 310 in a state in which the moving protruding portion is fitted in between the housing 310 and the recesses of the prism unit 330 by the elastic restoring force of the first elastic member 361A and the second elastic member 362A.

Figure 10A:
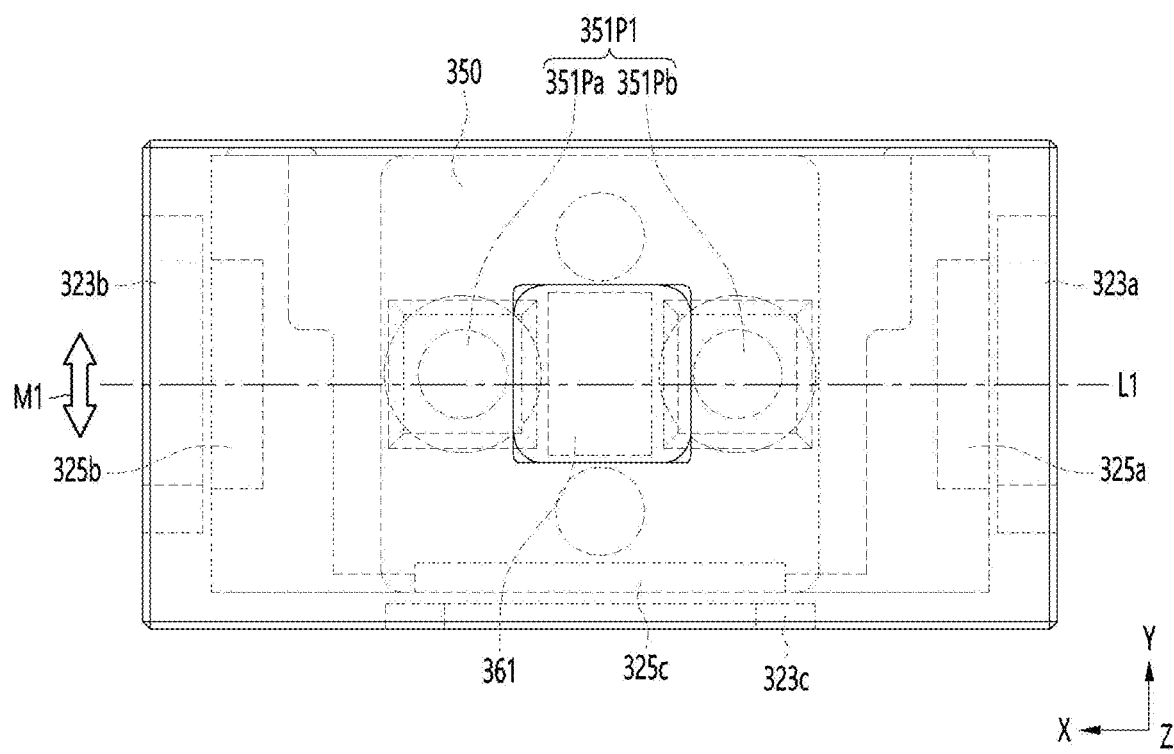
FIGS. 10A and 10B are illustrative views showing an operation of the second camera actuator according to the first and second embodiment.
Figure 10B:
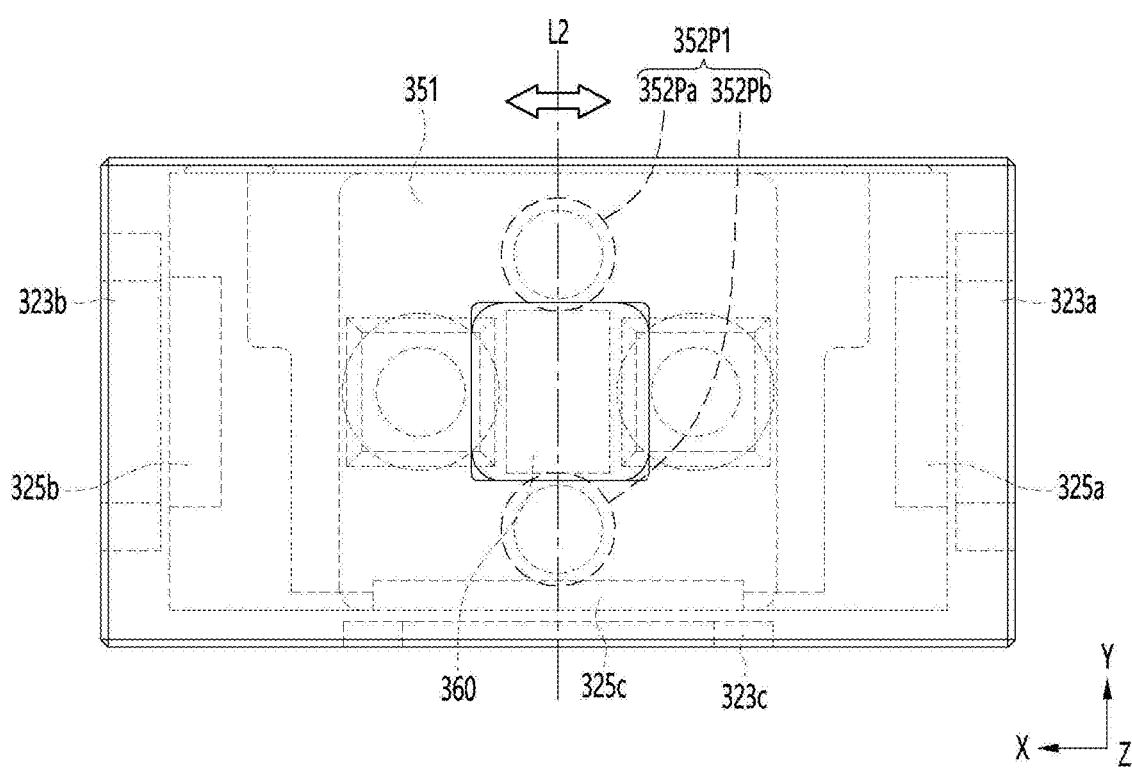

FIG. 10A and FIG. 10B are illustrative views showing an operation of a second camera actuator of an embodiment.

Referring to FIGS. 10A and 10B, a prism unit 330 according to the embodiment may be tilt-controlled to a first axis or a second axis by a driving force of the driving part 320.

First, referring to FIG. 10A, the prism unit 330 may be provided so as to enable rotational movement in a second direction with a virtual first line L1 formed by a first moving protruding portion 351P1 of the moving plate 350 as a reference axis. In detail, the driving part 320 may rotate the prism unit 330 in a vertical direction.

For example, a repulsive force may be generated between a third-first coil part adjacent to the moving plate 350 of the third coil part 323c and a third-first magnet adjacent to the moving plate 350 of the third magnet 325c. In addition, attractive force may be generated between a third-second coil part far from the moving plate 350 of the third coil part 323c and a third-second magnet far from the moving plate 350 of the third magnet 325c.

Accordingly, the prism unit 330 may be tilted downward with the first line L1 as the reference axis. That is, the prism unit 330 may be tilted by a predetermined angle in the vertical direction with respect to the first line L1. Accordingly, it possible to control a moving path of light incident on the prism unit 330.

In addition, referring to FIG. 10B, the prism unit 330 may be provided so as to enable rotational movement in a first direction with a virtual second line L2 formed by a second moving protruding portion 352P1 of the moving plate 350 as a reference axis. In detail, the driving part 320 may rotate the prism unit 330 in a left-right direction.

For example, a repulsive force may be generated between a first-first coil part adjacent to the moving plate 350 of the first coil part 323a and a first-first magnet adjacent to the moving plate 350 of the first magnet 325a. In addition, attractive force may be generated between a first-second coil part far from the moving plate 350 of the first coil part 323a and a first-second magnet far from the moving plate 350 of the first magnet 325a. In addition, attractive force may be generated between a second-first coil part adjacent to the moving plate 350 of the second coil part 323b and a second-first magnet adjacent to the moving plate 350 of the second coil part 325b. Further, a repulsive force may be generated between a second-second coil part far from the moving plate 350 of the second coil part 323b and a second-second magnet far from the moving plate 350 of the second magnet 325b.

Accordingly, the prism unit 330 may be tilted in the left-right direction with the second line L2 as the reference axis. That is, the prism unit 330 may be tilted by a predetermined angle in the left-right direction with respect to the second line L2. Accordingly, it possible to control a moving path of light incident on the prism unit 330.

Figure 11:
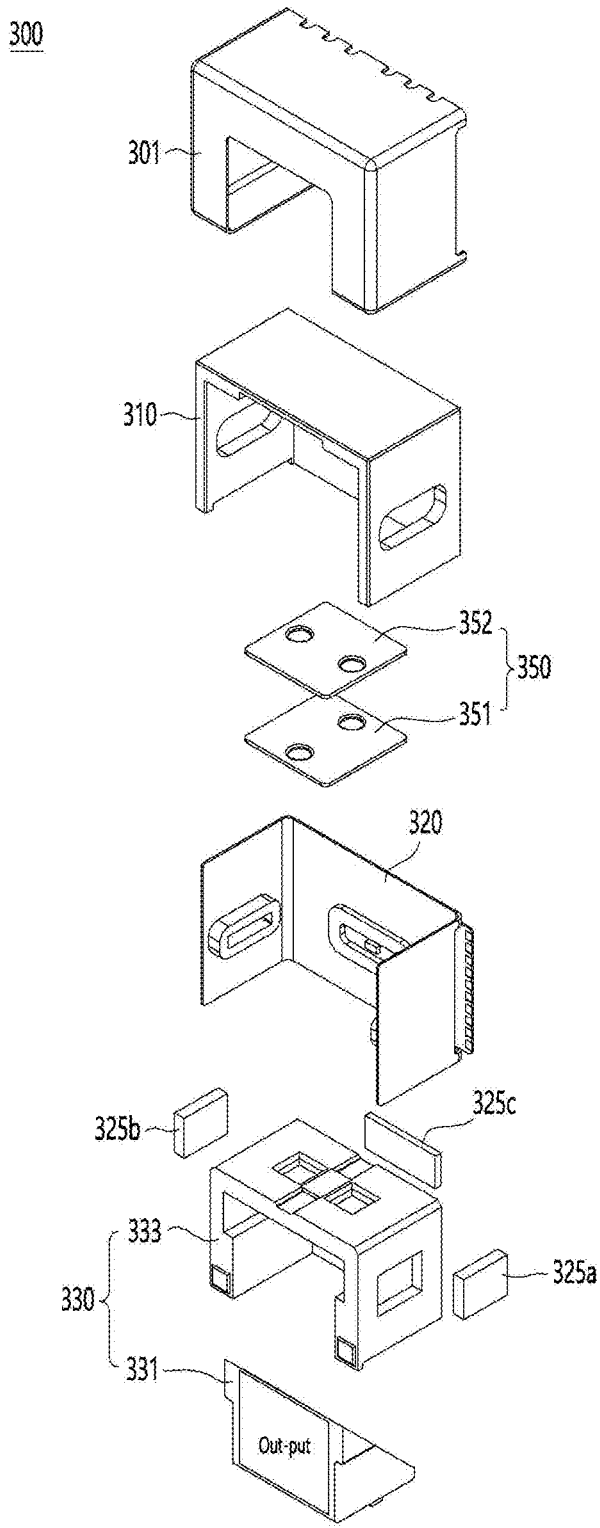
FIG. 11 is an exploded perspective view of a second camera actuator according to a third embodiment.

FIG. 11 is an exploded perspective view of a second camera actuator according to a third embodiment.

Referring to FIG. 11, in the second camera actuator according to the third embodiment, a moving plate is configured in plural as compared with the first embodiment. At this time, a moving protruding portion providing different rotation shafts may be formed on the plurality of moving plates. That is, in the first embodiment, all the moving protruding portions for the first shaft and the second shaft are formed on one moving plate, but in the third embodiment, a first moving plate in which the moving protruding portion for the first shaft is formed and a second moving plate in which the moving protruding portion for the second shaft is formed may be included, respectively. In addition, the support portion included the plurality of pulling members in the first embodiment, and included the plurality of elastic members in the second embodiment. Alternatively, in the third embodiment, any one of the plurality of moving plates may be used as the support portion. This will be described in detail.

A second camera actuator 300 according to the third embodiment may include a housing 310, a driving part 320 disposed on the housing 310, and a prism unit 330 disposed on the driving part 320. Meanwhile, in the following, only parts that differ from the first and second embodiments in descriptions of the second camera actuator of the third embodiment will be described.

In addition, in the drawings showing each configuration of the third embodiment, substantially, the same parts as those of the first and second embodiments are designated by the same reference numerals.

The second camera actuator 300 may include the housing 310, the driving part 320, the prism unit 330, a moving plate 350, and a pulling magnet 360.

Meanwhile, since the driving part 320 of the third embodiment has substantially the same structure as the driving part of the first embodiment, detailed description thereof will be omitted.

<Housing of the Third Embodiment>

Figure 12A:
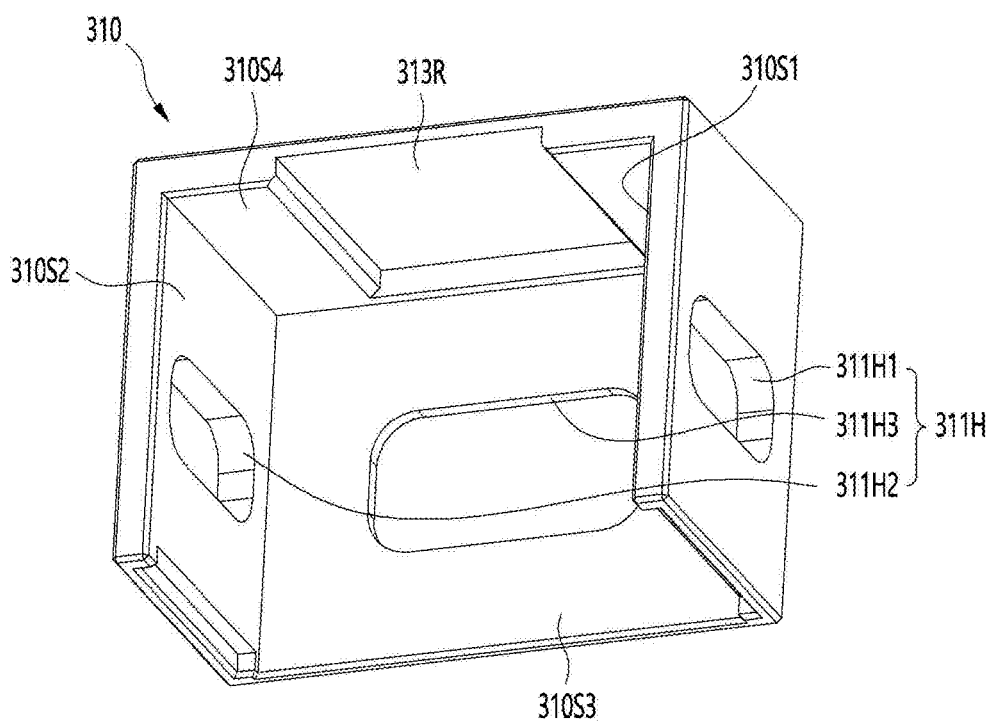
FIG. 12A is a perspective view of the housing of the second camera actuator of the third embodiment.
Figure 12B:
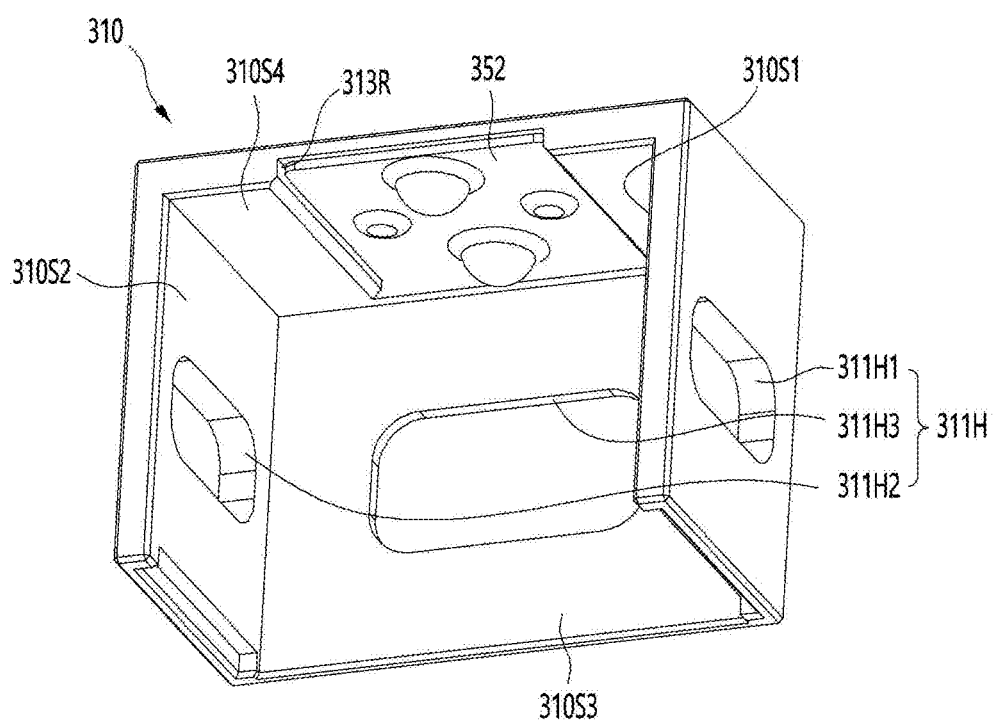
FIG. 12B is a perspective view in which a second moving plate is coupled to the housing of FIG. 12A.

FIG. 12A is a perspective view of the housing of the second camera actuator of the third embodiment, and FIG. 12B is a perspective view in which a second moving plate is coupled to the housing of FIG. 12A.

Referring to FIGS. 12A and 12B, the housing 310 may include at least one recess 313R. For example, the recess 313R may be disposed on at least one inner surface of the housing 310. In detail, the recess 313R may be disposed on a fourth inner surface 310S4 of the housing 310. The groove may have a concave shape on the fourth inner surface 310S4 in an outer surface direction (z-axis direction) of the housing 310.

The recess 313R of the housing 310 may provide a space in which the moving plate 350 is seated. Preferably, the recess 313R may provide a space in the moving plate 350 in which a second moving plate 352 is disposed. To this end, an adhesive member (not shown) may be disposed in the recess 313R. The second moving plate 352 may be disposed fixedly in the recess 313R of the housing 310 by the adhesive member. Further, in the embodiment, the second moving plate 352 disposed in the recess 313R may be used as a support portion that presses and supports the prism unit against the housing.

<Prism Unit of the Third Embodiment>

Figure 13B:
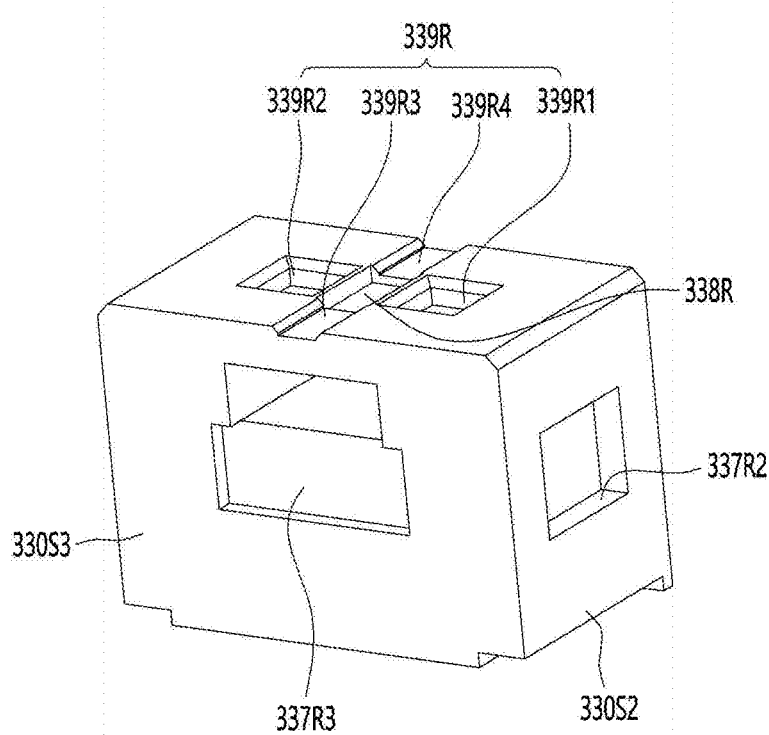
Figure 13C:
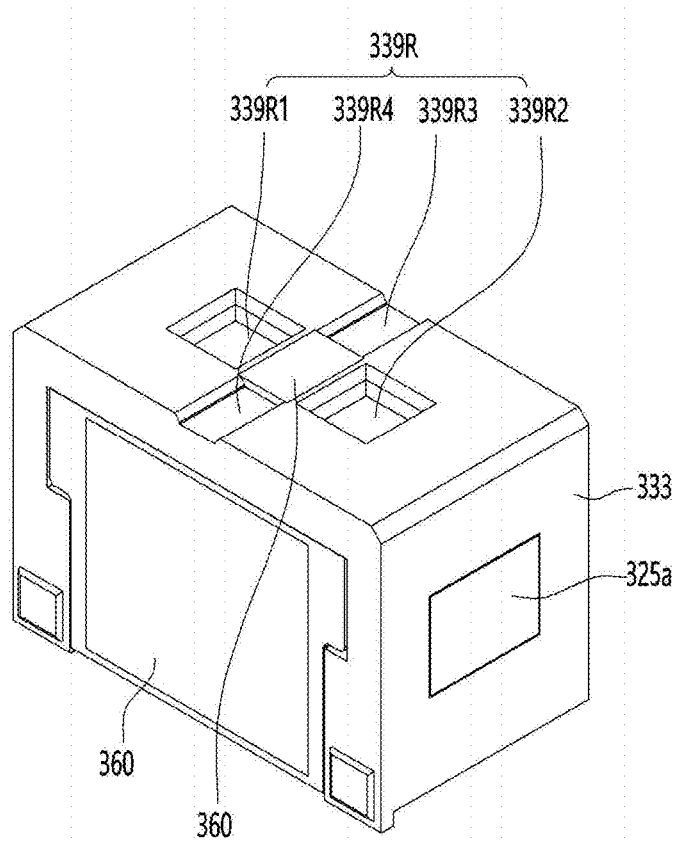

FIGS. 13A to 13C are views of the prism unit of the second camera actuator of the third embodiment.

Referring also to FIGS. 13A to 13C, recesses 338R and 339R of the prism mover 333 may be configured in plural. The recesses 338R and 339R may include a third recess 338R and a fourth recess 339R.

The third recess 338R may be disposed in a central region of a fourth outer surface 330S4. In detail, the third recess 338R may be overlapped with a center of the fourth outer surface 330S4 in the z-axis direction. The third recess 338R may be disposed facing the recess 313R of the housing 310. Preferably, the third recess 338R may be disposed in a region overlapped with the center of the recess 313R of the housing 310 in the z-axis direction. The third recess 338R may provide a space in which the pulling magnet 360 is disposed. Preferably, the pulling magnet 360 may be inserted into the third recess 338R. At this time, an adhesive member (not shown) may be applied to the third recess 338R. Further, the pulling magnet 360 may be disposed fixedly in the third recess 338R by the adhesive member.

The fourth recess 339R may be disposed on the fourth outer surface 330S4 in plural. The fourth recess 339R may be provided in the same size as the third recess 338R, or may be provided in a different size from each other. The plurality of fourth recesses 339R may be disposed to be adjacent to the third recesses 338R, and may be selectively disposed to be spaced apart from the fourth recess 339R. That is, a part of the fourth recess 339R may be disposed to be spaced apart from the third recess 338R. A remaining part of the fourth recess 339R may be disposed to be connected to the third recess 338R. At this time, a depth of the third recess 338R may be different from that of the fourth recess 339R. Further, the depth of each of the plurality of fourth recesses 339R may be different from each other.

The fourth recess 339R may be disposed around the third recess 338R. That is, the fourth recess 339R may be disposed surrounding around the recess 338R.

For example, the plurality of fourth recesses 339R may include a first sub-fourth recess 339R1 and a second sub-fourth recess 339R2 that are spaced apart from the third recess 338R in the first direction (x-axis direction). In addition, the plurality of fourth recesses 339R may include a third sub-fourth recess 339R3 and a fourth sub-fourth recess 339R4 that are spaced apart from or connected to the third recess 338R in the second direction (y-axis direction).

The fourth recess 339R may provide a space into which a first moving plate 351 of the moving plate 350 is inserted. Preferably, a plurality of protruding portions of the first moving plate 351 (described later) may be inserted into the fourth recess 339R.

That is, the fourth recess 339R may be formed so as to correspond to positions of the plurality of protruding portions disposed on the first moving plate 351 to provide a space in which the plurality of protruding portions of the first moving plate 351 are disposed.

At this time, the depth of the fourth recesses 339R may be different from each other. Preferably, the first sub-fourth recess 339R1 and the second sub-fourth recess 339R2 may have the same depth. That is, the depth of the first sub-fourth recess 339R1 and the second sub-fourth recess 339R2 may have a depth corresponding to a height of a plurality of first protruding portions (described later) of the first moving plate 351.

The third sub-fourth recess 339R3 and the fourth sub-fourth recess 339R4 may have the same depth. Preferably, the depth of the third sub-fourth recess 339R3 and the fourth sub-fourth recess 339R4 may have a depth corresponding to a height of a plurality of second protruding portions (described later) of the first moving plate 351.

Meanwhile, the depth of each of the first sub-fourth recess 339R1 and the second sub-fourth recess 339R2 into which the first protruding portion is inserted may be different from the depth of each of the third sub-fourth recess 339R3 and the fourth sub-fourth recess 339R4 into which the second protruding portion is inserted. At this time, the height of the first protruding portion of the first moving plate 351 may be greater than the height of the second protruding portion. Accordingly, the depth of each of the first sub-fourth recess 339R1 and the second sub-fourth recess 339R2 may be greater than the depth of each of the third sub-fourth recess 339R3 and the fourth sub-fourth recess 339R4.

<Moving Plate of the Third Embodiment>

Figure 14A:
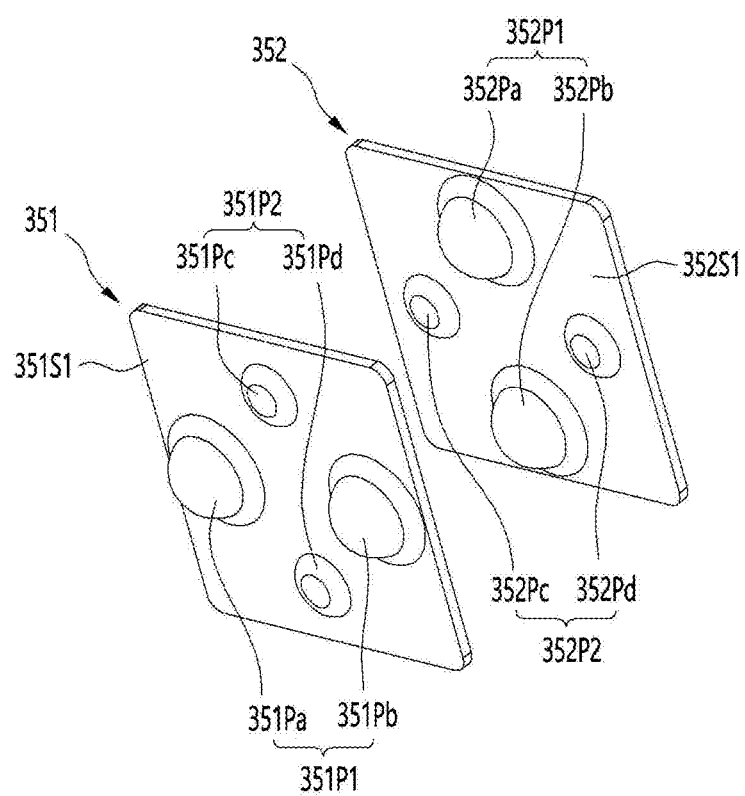
FIG. 14A is a front perspective view of the moving plate constituting the second camera actuator of the third embodiment.
Figure 14B:
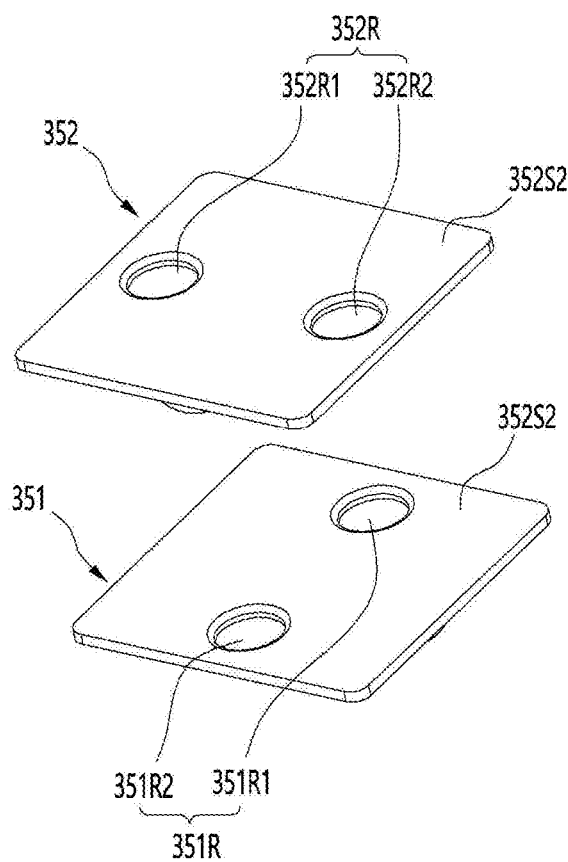
FIG. 14B is a rear perspective view of the moving plate constituting the second camera actuator of the third embodiment.

FIG. 14A is a front perspective view of the moving plate constituting the second camera actuator, and FIG. 14B is a rear perspective view of the moving plate constituting the second camera actuator.

Referring to FIGS. 14A and 14B, the moving plate 350 may include a first moving plate 351 and a second moving plate 352. That is, the moving plate of the second camera actuator in the first and second embodiments is configured in singular, but it may be configured in plural in the third embodiment.

The first moving plate 351 may provide a rotation shaft for rotating or tilting the prism unit 330 in a second direction (e.g., a vertical direction or a y-axis direction). The second moving plate 352 may provide a rotation shaft for rotating or tilting the prism unit 330 in a first direction (e.g., a left-right direction or an x-axis direction).

Meanwhile, prior to description of the moving plate, the moving plate may also be referred to as a pivot plate for pivoting the prism unit. Accordingly, hereinafter, the first moving plate 351 may also be referred to as a second pivot plate, and the second moving plate 352 may also be referred to as a second pivot plate. In the following description, the moving protruding portions respectively disposed on the first moving plate 351 and the second moving plate 352 may also be referred to as a pivot protruding portion. Hereinafter, it will be described as a moving plate and a moving protruding portion.

As described above, in the third embodiment, the rotation of the prism unit 330 in the first direction is performed by the second moving plate 352, and the rotation in the second direction is performed by the first moving plate 351. That is, in the camera actuator, the rotation shaft for rotation of the prism unit 330 in the first direction and the rotation shaft for rotation of the prism unit 330 in the second direction are handled by different plates. Accordingly, in the embodiment, when the prism unit 330 rotates in two axes, the rotation shaft is configured by different moving plates, and thus it is possible to rotate more stably, and to improve rotation accuracy, thereby ensuring the stability of rotational drive.

At this time, the moving plate 350 may be disposed between the housing 310 and the prism unit 330.

The first moving plate 351 and the second moving plate 352 constituting the moving plate 350 may have the same shape and size. That is, the first moving plate 351 and the second moving plate 352 may be the same. Accordingly, in the embodiment, the two moving plates 350 may be manufactured in the same manner with one equipment, thereby ensuring the ease of manufacturing.

However, the first moving plate 351 and the second moving plate 352 constituting the moving plate 350 may be disposed in different directions between the housing 310 and the prism unit 330.

That is, one moving plate of the first moving plate 351 and the second moving plate 352 may be disposed to be rotated by 90 degrees with respect to the other moving plate.

The first moving plate 351 and the second moving plate 352 may be coupled to each other.

That is, the second moving plate 352 is coupled to the housing 310. The prism unit 330 is disposed on the second moving plate 352 so that the first moving plate 351 may be coupled to the second moving plate 352. Here, the meaning of being coupled does not mean that the first moving plate 351 is fixedly coupled to the second moving plate 352, but means that the first moving plate 351 simply contacts the second moving plate 352.

At this time, the first moving plate 351 may include a plurality of protruding portions and a plurality of grooves, and the second moving plate 352 may also include a plurality of protruding portions and a plurality of grooves. At this time, the plurality of protruding portions of the second moving plate 352 may be inserted into the plurality of grooves of the first moving plate 351. This will be descried in more detail.

The first moving plate 351 and the second moving plate 352 may provide a rotation shaft for a moving direction of the prism unit 330, which is moved by an external driving force, for example, the coil part 323 and the magnet 325.

The first moving plate 351 may include a first-first surface 351S1.

The first-second surface 351S2 may be a surface facing the fourth outer surface 330S4 of the prism unit 330.

A first moving protruding portion 351P1 and a first auxiliary protruding portion 351P2 may be disposed on the first-first surface 351S1 of the first moving plate 351. The first moving protruding portion 351P1 functions as a rotation shaft for rotating the prism unit 330 in a second direction. The first auxiliary protruding portion 351P2 may function as a stopper for limiting a rotation range of the prism unit 330 in the second direction.

The first moving protruding portion 351P1 may be disposed to be spaced apart in the first direction (x-axis direction) with respect to a central region of the first-first surface 351S1 of the first moving plate 351. Here, the central region of the first-first surface 351S1 may be a region facing the pulling magnet 360 disposed fixedly in the prism unit 330. Preferably, the central region of the first-first surface 351S1 may be a region overlapped with the pulling magnet 360 disposed fixedly in the prism unit 330 in the z-axis direction.

In addition, the first moving protruding portion 351P1 is disposed to be spaced apart in the x-axis direction of the central region. That is, the first moving protruding portion 351P1 may include the first sub-first moving protruding portion 351Pa disposed to be spaced apart in the −x-axis direction with respect to the central region and the second sub-first moving protruding portion 351Pb disposed to be spaced apart in the +x-axis direction with respect to the central region.

The first sub-first moving protruding portion 351Pa may correspond to the first sub-fourth recess 339R1. That is, at least a part of the first sub-first moving protruding portion 351Pa may be disposed in the first sub-fourth recess 339R1. That is, at least a part of the first sub-first moving protruding portion 351Pa may be inserted into the first sub-fourth recess 339R1. At this time, a height of the first sub-first moving protruding portion 351Pa may be greater than a depth of the first sub-fourth recess 339R1. Accordingly, only a part of the first sub-first moving protruding portion 351Pa may be inserted into the first sub-fourth recess 339R1. Accordingly, the first-first surface 351S1 of the first moving plate 351 may be spaced apart from the fourth outer surface 330S4 of the prism mover 333 by a predetermined distance in a state in which at least a part of the first sub-first moving protruding portion 351Pa is inserted into the first sub-fourth recess 339R1.

The second sub-first moving protruding portion 351Pb may correspond to the second sub-fourth recess 339R2. That is, at least a part of the second sub-first moving protruding portion 351Pb may be disposed in the second sub-fourth recess 339R2. That is, at least a part of the second sub-first moving protruding portion 351Pb may be inserted into the second sub-fourth recess 339R2. At this time, a height of the second sub-first moving protruding portion 351Pb may be greater than a depth of the second sub-fourth recess 339R2. Accordingly, only a part of the second sub-first moving protruding portion 351Pb may be inserted into the second sub-fourth recess 339R2. Accordingly, the first-first surface 351S1 of the first moving plate 351 may be spaced apart from the fourth outer surface 330S4 of the prism mover 333 by a predetermined distance in a state in which at least a part of the second sub-first moving protruding portion 351Pb is inserted into the second sub-fourth recess 339R2.

In addition, the first sub-first moving protruding portion 351Pa and the second sub-first moving protruding portion 351Pb are arranged in the x-axis direction with respect to a center of the first moving plate 351, and accordingly, they may provide a rotation shaft for rotating the prism unit 330 in the second direction. That is, the prism unit 330 may be provided so as to enable rotational movement in the second direction (vertical direction) with a virtual first line formed by the first sub-first moving protruding portion 351Pa and the second sub-first moving protruding portion 351Pb as a reference axis.

The first auxiliary protruding portion 351P2 may be disposed to be spaced apart in the second direction (y-axis direction) with respect to the central region of the first-first surface 351S1 of the first moving plate 351. Here, the central region of the first-first surface 351S1 may be a region facing the pulling magnet 360 disposed fixedly in the prism unit 330. Preferably, the central region of the first-first surface 351S1 may be a region overlapped with the pulling magnet 360 disposed fixedly in the prism unit 330 in the z-axis direction.

In addition, the first auxiliary protruding portion 351P2 may be disposed to be spaced apart in the y-axis direction of the central region. That is, the first auxiliary protruding portion 351P2 may include the first sub-first auxiliary protruding portion 351Pc disposed to be spaced apart in the +y-axis direction with respect to the central region and the second sub-first auxiliary protruding portion 351Pd disposed to be spaced apart in the −y-axis direction with respect to the central region.

The first sub-first auxiliary protruding portion 351Pc may correspond to the third sub-fourth recess 339R3. That is, at least a part of the first sub-first auxiliary protruding portion 351Pc may be disposed in the third sub-fourth recess 339R3. That is, at least a part of the first sub-first auxiliary protruding portion 351Pc may be inserted into the third sub-fourth recess 339R3.

At this time, a height of the first sub-first auxiliary protruding portion 351Pc may be smaller than a depth of the third sub-fourth recess 339R3. Accordingly, the first sub-first auxiliary protruding portion 351Pc may be entirely inserted into the third sub-fourth recess 339R3. At this time, a difference between the height of the first sub-first auxiliary protruding portion 351Pc and the depth of the third sub-fourth recess 339R3 may correspond to a movement range of the prism unit. That is, the prism unit 330 may move upward via the first moving plate 351 by the difference between the height of the first sub-first auxiliary protruding portion 351Pc and the depth of the third sub-fourth recess 339R3. In addition, when departing from the movement range, the first sub-first auxiliary protruding portion 351Pc may contact a bottom surface of the third sub-fourth recess 339R3 to limit the movement of the prism unit 330.

The second sub-first auxiliary protruding portion 351Pd may correspond to the fourth sub-fourth recess 339R4. That is, at least a part of the second sub-first auxiliary protruding portion 351Pd may be disposed in the fourth sub-fourth recess 339R4. That is, at least a part of the second sub-first auxiliary protruding portion 351Pd may be inserted into the fourth sub-fourth recess 339R4.

At this time, a height of the second sub-first auxiliary protruding portion 351Pd may be smaller than a depth of the fourth sub-fourth recess 339R4. Accordingly, the second sub-first auxiliary protruding portion 351Pd may be entirely inserted into the third sub-fourth recess 339R4. At this time, a difference between the height of the second sub-first auxiliary protruding portion 351Pd and the depth of the fourth sub-fourth recess 339R4 may correspond to the movement range of the prism unit. That is, the prism unit 330 may move downward via the first moving plate 351 by the difference between the height of the second sub-first auxiliary protruding portion 351Pd and the depth of the fourth sub-fourth recess 339R4. In addition, when departing from the movement range, the second sub-first auxiliary protruding portion 351Pd may contact a bottom surface of the fourth sub-fourth recess 339R4 to limit the movement of the prism unit 330.

The second moving plate 352 may have the same structure as the first moving plate 351. However, the second moving plate 352 may be disposed in the recess 313R of the housing 310 in a different direction from the first moving plate 351. That is, the first moving plate 351 was disposed between the housing 310 and the prism unit 330 such that the first moving protruding portion 351P1 having a high height among the two protruding portions is arranged in the x-axis direction. At this time, the second moving plate 352 may include a second moving protruding portion 352P1 corresponding to the first moving protruding portion 351P1 of the first moving plate 351. However, the second moving protruding portion 352P1 may be disposed in a vertical direction with respect to the disposition direction of the first moving protruding portion 351P1. That is, the second moving protruding portion 352P1 may be disposed in the y-axis direction with respect to a center of the second moving plate 352.

The second moving plate 352 may include a second-first surface 352S1.

The second-first surface 352S1 may be a surface facing a first-second surface 351S2 which is an opposite surface of the first-first surface 351S1 of the first moving plate 351.

The second moving protruding portion 352P1 and a second auxiliary protruding portion 352P2 may be disposed on the second-first surface 352S1 of the second moving plate 352. The second moving protruding portion 352P1 functions as a rotation shaft for rotating the prism unit 330 in a first direction. The second auxiliary protruding portion 352P2 may function as a stopper for limiting a rotation range of the prism unit 330 in the first direction.

The second moving protruding portion 352P1 may be disposed to be spaced apart in the second direction (y-axis direction) with respect to a central region of the second-first surface 352S1 of the second moving plate 352. Here, the central region of the second-first surface 352S1 may be a region facing the pulling magnet 360 disposed fixedly in the prism unit 330. Preferably, the central region of the second-first surface 352S1 may be a region overlapped with the pulling magnet 360 disposed fixedly in the prism unit 330 in the z-axis direction.

In addition, the second moving protruding portion 352P1 is disposed to be spaced apart in the x-axis direction of the central region. That is, the second moving protruding portion 352P1 may include a first sub-second moving protruding portion 352Pa disposed to be spaced apart in the +y-axis direction with respect to the central region and a second sub-second moving protruding portion 352Pb disposed to be spaced apart in the −y-axis direction with respect to the central region.

The first sub-second moving protruding portion 352Pa and the second sub-second moving protruding portion 352Pb may correspond to a first moving recesses 351R disposed on the first-second surface 351S2 of the first moving plate 351 to be described later. That is, the first sub-second moving protruding portion 352Pa and the second sub-second moving protruding portion 352Pb may be coupled to be fitted to the first moving recess 351R disposed on the first-second surface 351S2 of the first moving plate 351 to be described later. It will be described in more detail below.

In addition, the first sub-second moving protruding portion 352Pa and the second sub-second moving protruding portion 352Pb may be arranged in the y-axis direction with respect to the center of the second moving plate 352, and accordingly, they may provide a rotation shaft for rotating the prism unit 330 in the first direction. That is, the prism unit 330 may be provided so as to enable rotational movement in the first direction (left and right direction) with a virtual second line formed by the first sub-second moving protruding portion 352Pa and the second sub-second moving protruding portion 352Pb as a reference axis.

The second auxiliary protruding portion 352P2 may be disposed to be spaced apart in the first direction (x-axis direction) with respect to the central region of the second-first surface 352S1 of the second moving plate 352. Here, the central region of the second-first surface 352S1 may be a region facing the pulling magnet 360 disposed fixedly in the prism unit 330. Preferably, the central region of the second-first surface 352S1 may be a region overlapped with the pulling magnet 360 disposed fixedly in the prism unit 330 in the z-axis direction.

In addition, the second auxiliary protruding portions 352P2 may be disposed to be spaced apart in the x-axis direction of the central region. That is, the second auxiliary protruding portion 352P2 may include a first sub-second auxiliary protruding portion 352Pc disposed to be spaced apart in the −x-axis direction with respect to the central region and a second sub-second auxiliary protruding portion 352Pd disposed to be spaced apart in the +x-axis direction with respect to the central region.

In a state in which the first sub-second moving protruding portion 352Pa and the second sub-second moving protruding portion 352Pb are coupled to be fitted to the first moving recess 351R of the first moving plate 351, the first sub-second auxiliary protruding portion 352Pc and the second sub-second auxiliary protruding portion 352Pd may be spaced apart from the first-second surface 351S2 of the first moving plate 351 by a predetermined distance. Further, the separation distance may correspond to the movement range of the prism unit.

That is, the prism unit 330 may move the second moving plate 352 in a left direction by a distance between the first sub-second auxiliary protruding portion 352Pc and the first-second surface 351S2. In addition, when departing from the movement range, the first sub-second auxiliary protruding portion 352Pc may contact the first-second surface 351S2 of the first moving plate 351 at the bottom surface to limit the movement of the prism unit 330.

In addition, the prism unit 330 may move the second moving plate 352 in a right direction by a separation distance between the second sub-second auxiliary protruding portion 352Pd and the first-second surface 351S2. In addition, when departing from the movement range, the second sub-second auxiliary protruding portion 352Pd may contact the first-second surface 351S2 of the first moving plate 351 at the bottom surface to limit the movement of the prism unit 330.

Meanwhile, the first moving plate 351 may include the first-second surface 351S2. The first-second surface 351S2 may be a surface facing the second-first surface 352S1 of the second moving plate 352.

In addition, the first moving recess 351R may be disposed on the first-second surface 351S2 of the first moving plate 351.

The first moving recess 351R may be arranged in the y-axis direction with respect to a center of the first-second surface 351S2 of the first moving plate 351, and accordingly, it may provide a coupling space for being coupled with the second moving plate 352. That is, the first moving recess 351R may correspond to the second moving protruding portion 352P1 of the second moving plate 352. That is, the first moving recess 351R may include a first sub-first moving recess 351R1 corresponding to the first sub-second auxiliary protruding portion 352Pc of the second moving protruding portion 352P1, and a second sub-first moving recess 351R2 corresponding to the second sub-second auxiliary protruding portion 352Pd of the second moving plate 352.

Accordingly, at least a part of the first sub-second auxiliary protruding portion 352Pc of the second moving protruding portion 352P1 may be inserted into the first sub-first moving recess 351R1, and at least a part of the second sub-second auxiliary protruding portion 352Pd of the second moving plate 352 may be inserted into the second sub-first moving recess 351R2.

Meanwhile, the second moving plate 352 may include a second-second surface 352S2. The second-second surface 352S2 may be a surface facing the fourth inner surface 310S4 on which the recess 313R of the housing 310 is formed.

In addition, a second moving recess 352R may be disposed on the second-second surface 352S2 of the second moving plate 352. Meanwhile, the second moving recess 352R in the second moving plate 352 may be omitted.

However, in order to manufacture the first moving plate 351 and the second moving plate 352 in the same process, the second moving recess 352R may be disposed in the second moving plate 352 in the same manner as the first moving plate 351.

The second moving recess 352R may be arranged in the x-axis direction with respect to a center of the second-second surface 352S2 of the second moving plate 352.

For example, the second moving recess 352R may include a first sub-second moving recess 352R1 disposed in the −x-axis direction with respect to the center of the second-second surface 352S2 of the second moving plate 352 and a second sub-second moving recess 352R2 disposed in the +x-axis direction with respect to the center of the second-second surface 352S2 of the second moving plate 352.

At this time, the second moving plate 352 may be disposed fixedly in the recess 313R of the housing 310. At this time, an adhesive member for fixing the second moving plate 352 may be disposed in the recess 313R. At this time, the second moving recess 352R may improve the bonding force between the second moving plate 352 and the housing 310. That is, in a process of fixing the second moving plate 352 to the housing 310 using the adhesive member, the adhesive member may penetrate into the second moving recess 352R of the second moving plate 352, thereby increasing a contact area with the adhesive member, and improving the adhesion according thereto.

Meanwhile, in the embodiment, the first moving plate 351 and the second moving plate 352 may be formed of the same material as each other, or alternatively may be formed of different materials. At this time, the second moving plate 352 may be formed of a magnetic material.

That is, the second moving plate 352 may be fixed to the housing 310. In addition, the pulling magnet 360 may be disposed fixedly in the prism unit 330. In addition, in a state in which the protruding portion the first moving plate 351 is inserted into the recess of the prism unit 330 and the protruding portion of the second moving plate 352 is inserted into the recess, the first moving plate 351 may be interposed between the second moving plate 352 and the pulling magnet 360.

At this time, the second moving plate 352 may be formed of a magnetic material. Accordingly, the pulling magnet 360 and the second moving plate 352 may generate attractive force to each other. That is, the attractive force may act between the pulling magnet 360 and the second moving plate 352. Therefore, the prism unit 330 may be pressed toward the housing 310 by the attractive force. That is, the prism unit 330 may be supported by the housing 310 by the attractive force. In addition, the first moving plate 351 may also be supported by the housing 310 by being pressed together with the prism unit 330 as the prism unit 330 is pressed.

Here, the first moving plate 351 and the second moving plate 352 may be formed by a press method. Therefore, the first moving plate 351 and the second moving plate 352 may be formed of different materials. That is, unlike the second moving plate 352, the first moving plate 351 may be formed of a non-magnetic material. For example, the first moving plate 351 may be formed of an injection material or a ceramic material. However, in order to simplify the manufacturing process, the first moving plate 351 may be formed of a magnetic material together with the second moving plate 352. In addition, when the first moving plate 351 is formed of the magnetic material, the bonding force between the first moving plate 351, the second moving plate 352, and the pulling magnet 360 may be further improved.

Meanwhile, the plurality of first moving protruding portions and the plurality of first auxiliary protruding portions may be disposed in a cross shape with respect to a first region on the first-first surface 351S1 of the first moving plate 351, and the plurality of second moving protruding portions and the plurality of second auxiliary protruding portions may be disposed in a cross shape with respect to a second region on the second-first surface 352S1 of the second moving plate 352. At this time, the first and second regions may be overlapped with the pulling magnet in a third direction. In other words, the plurality of first moving protruding portions and the plurality of first auxiliary protruding portions may be disposed in a cross shape around a region overlapped with the pulling magnet 360 in the z-axis direction on the first-first surface 351S1 of the first moving plate 351. In addition, the plurality of second moving protruding portions and the plurality of second auxiliary protruding portions may be disposed in a cross shape around a region overlapped with the pulling magnet 360 in the z-axis direction on the second-first surface 352S1 of the second moving plate 352.

Figure 15:
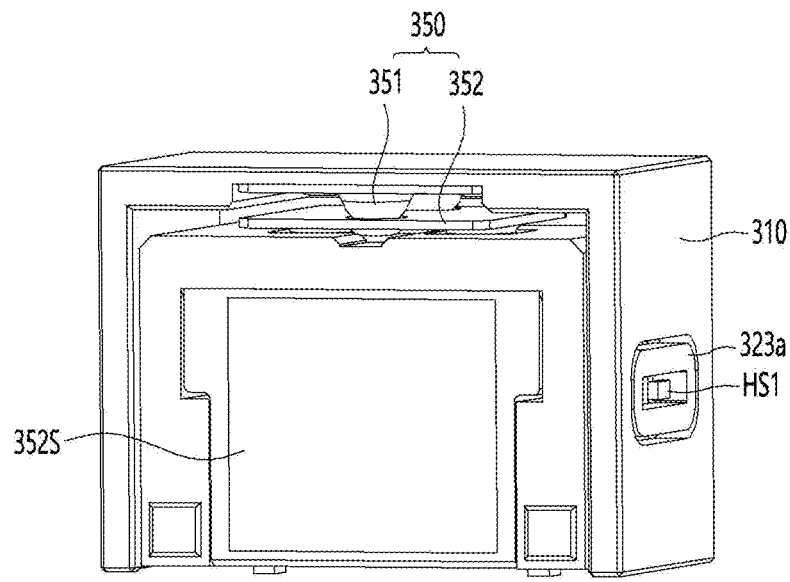
FIGS. 15 and 16 are views showing a coupling relationship between the housing, the prism unit, and a moving protruding portion in the second camera actuator of the third embodiment.
Figure 16:
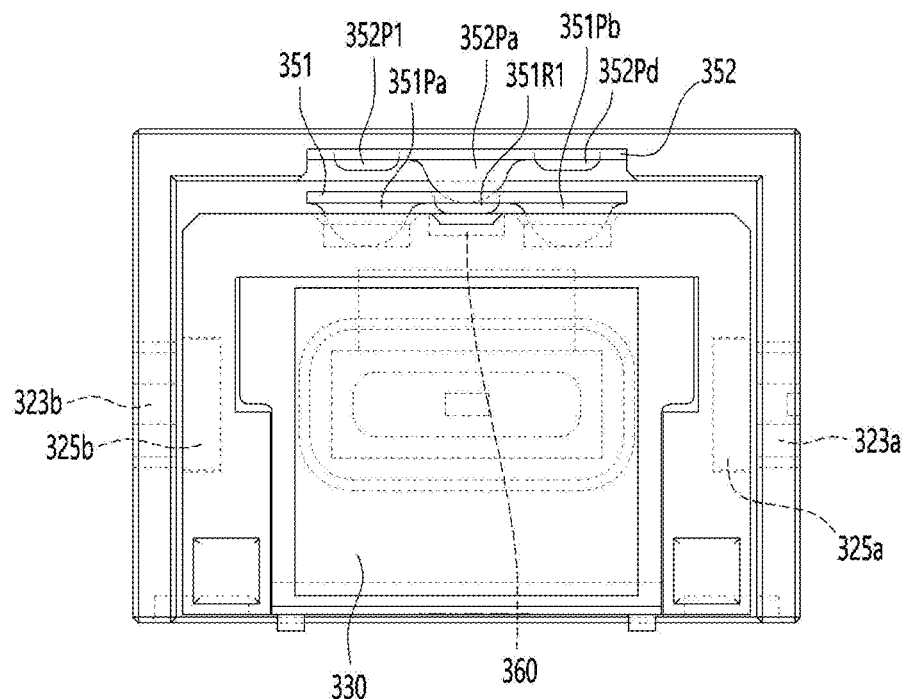

FIGS. 15 and 16 are views showing a coupling relationship between the housing, the prism unit, and a moving protruding portion in the second camera actuator of the third embodiment.

FIGS. 15 and 16, a moving plate 350 according to an embodiment may include a first moving plate 351 and a second moving plate 352. In addition, the second moving plate 352 may provide a rotation shaft for rotating the prism unit 330 in a first direction while generating attractive force for fixing the prism unit 330 to the housing 310.

Centers of the pulling magnet 360, the first moving plate 351, and the second moving plate 352 may be overlapped with each other in the z-axis direction.

In addition, the first moving plate 351 may be disposed between the housing 310 in which the second moving plate 352 is disposed and the prism unit 330 in which the pulling magnet 360 is disposed.

At this time, a first moving protruding portion 351P1 and a first auxiliary protruding portion 351P2 of the first moving plate 351 may be inserted into the fourth recess 339R of the prism unit 330.

A first sub-first moving protruding portion 351Pa may be inserted into the first sub-fourth recess 339R1, and a second sub-first moving protruding portion 351Pb may be inserted into the second sub-fourth recess 339R2.

In addition, a first sub-first auxiliary protruding portion 351Pc may be inserted into the third-sub fourth recess 339R3, and a second sub-first auxiliary protruding portion 351Pd may include the fourth sub-fourth recess 339R4.

In addition, a second moving protruding portion 352P1 of the second moving plate 352 may be inserted into a first moving recess 351R of the first moving plate 351.

Accordingly, the first moving plate 351 may be pressed together with the prism unit 330 by attractive force acting between the second moving plate 352 and the pulling magnet 360 to be supported by the housing 310.

Accordingly, the first moving plate 351 may serve as a rotation shaft for rotating the prism unit 330 in the second direction corresponding to the y-axis direction, and the second moving plate 352 may serve as a rotation shaft for rotating the prism unit 330 in the first direction corresponding to the x-axis.

Figure 17A:
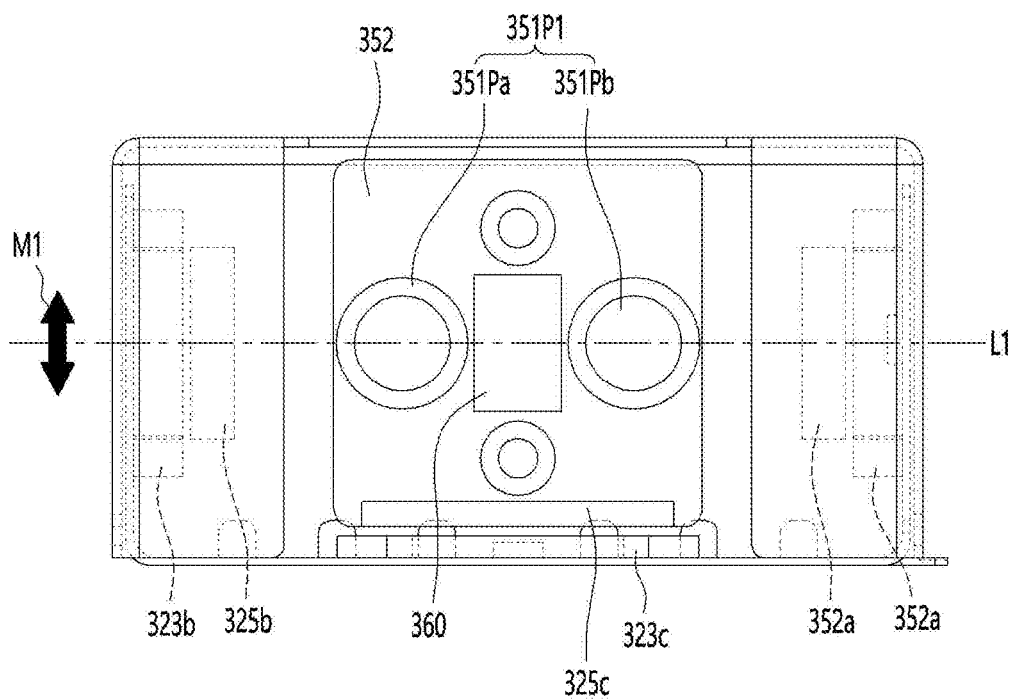
FIGS. 17A and 17B are illustrative views showing an operation of the second camera actuator according to the third embodiment.
Figure 17B:
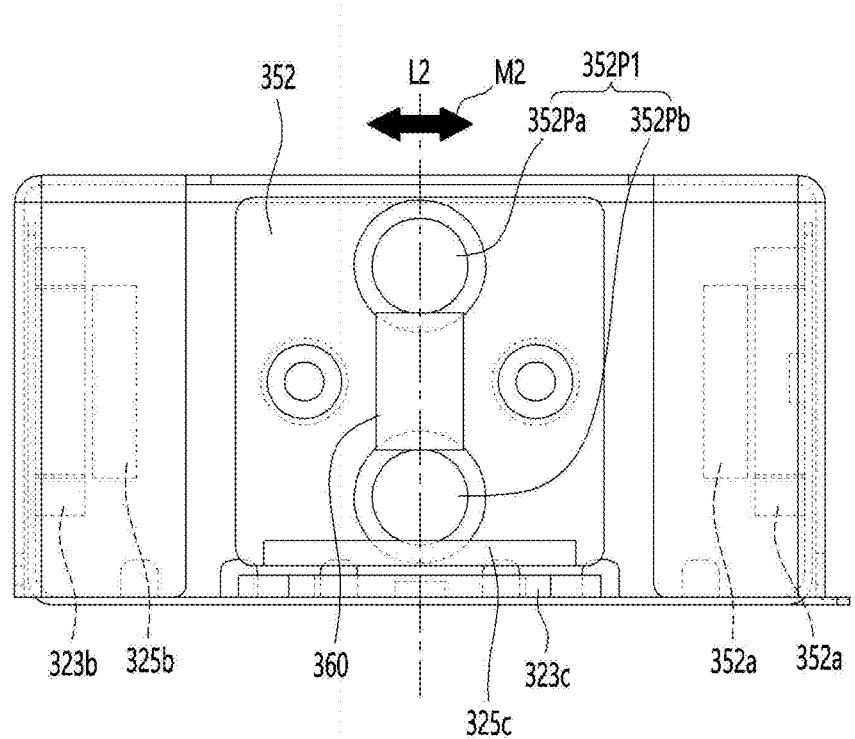

FIGS. 17A and 17B are illustrative views showing an operation of a second camera actuator according to an embodiment.

First, referring first to FIG. 17A, the prism unit 330 may be provided so as to enable rotational movement in a second direction with a virtual first line L1 formed by the first moving protruding portion 351P1 of the first moving plate 351 as a reference axis. In detail, the driving part 320 may rotate the prism unit 330 in a vertical direction.

For example, a repulsive force may be generated between a third-first coil part adjacent to the first moving plate 351 among the third coil part 323c and a third-first magnet adjacent to the first moving plate 351 among the third magnet 323c. In addition, attractive force may be generated between a third-second coil part far from the first moving plate 351 among the third coil part 323c and a third-second magnet far from the first moving plate 351 among the third magnet 325c.

Accordingly, the prism unit 330 may be tilted downward with the first line L1 as a reference axis. That is, the prism unit 330 may be tilted at a predetermined angle in the vertical direction with respect to the first line L1. Accordingly, it possible to control a moving path of light incident on the prism unit 330.

In addition, referring to FIG. 17B, the prism unit 330 may be provided so as to enable rotational movement in a first direction with a virtual second line L2 formed by the second moving protruding portion 352P1 of the second moving plate 352 as a reference axis. In detail, the driving part 320 may rotate the prism unit 330 in a left-right direction.

For example, a repulsive force may be generated between a first-first coil part adjacent to the second moving plate 352 of the first coil part 323a and a first-first magnet adjacent to the second moving plate 352 of the first magnet 325a. In addition, attractive force may be generated between a first-second coil part far from the second moving plate 352 of the first coil part 323a and a first-second magnet far from the second moving plate 352 of the first magnet 325a. In addition, attractive force may be generated between a second-first coil part adjacent to the second moving plate 352 of the second coil part 323b and a second-first magnet adjacent to the second moving plate 352 of the second magnet 325b. Further, a repulsive force may be generated between a second-second coil part far from the second moving plate 352 of the second coil part 323b and a second-second magnet far from the second moving plate 352 of the second magnet 325b.

Accordingly, the prism unit 330 may be tilted in the left-right direction with the second line L2 as the reference axis. That is, the prism unit 330 may be tilted by a predetermined angle in the left-right direction with respect to the second line L2. Accordingly, it possible to control a moving path of light incident on the prism unit 330.

<First Camera Actuator 100>

Hereinafter, a first camera actuator 100 will be described.

Figure 18:
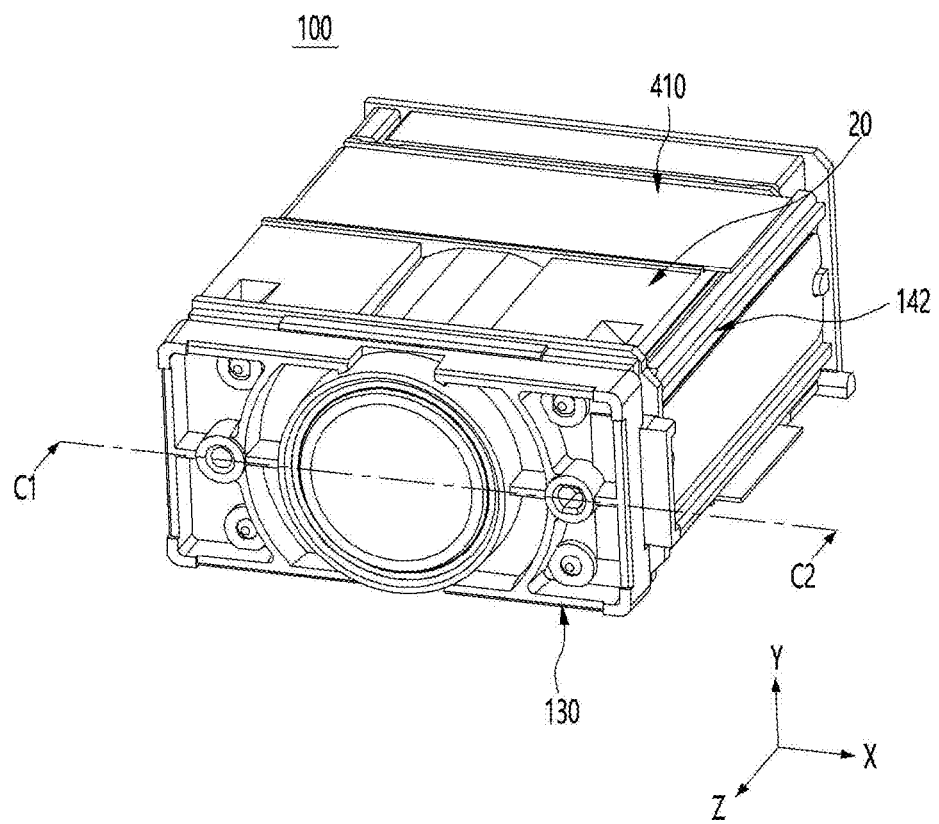
FIG. 18 is a perspective view of a first camera actuator according to an embodiment.
Figure 19:
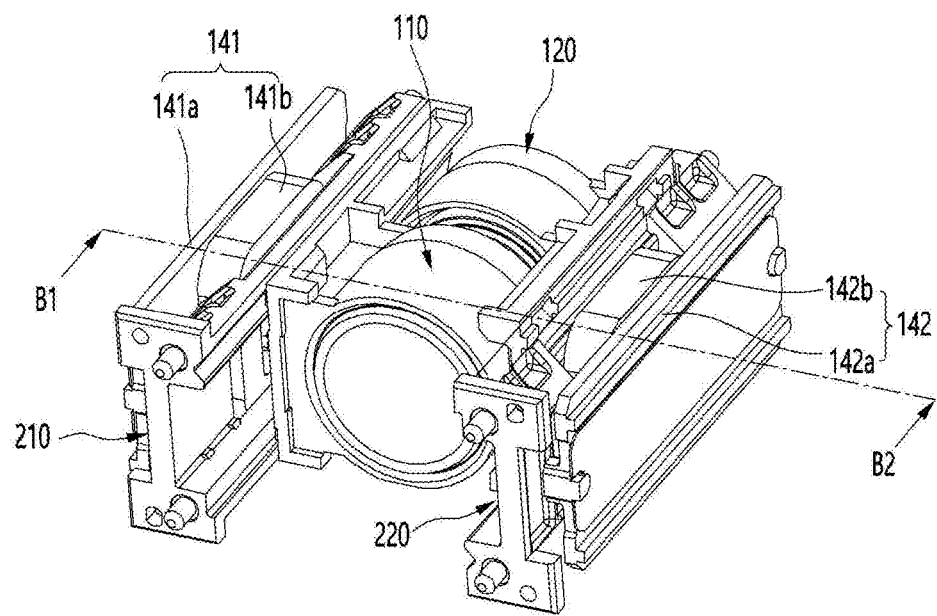
FIG. 19 is a perspective view in which a part of a configuration is omitted in a camera actuator according to the embodiment shown in FIG. 18.
Figure 20:
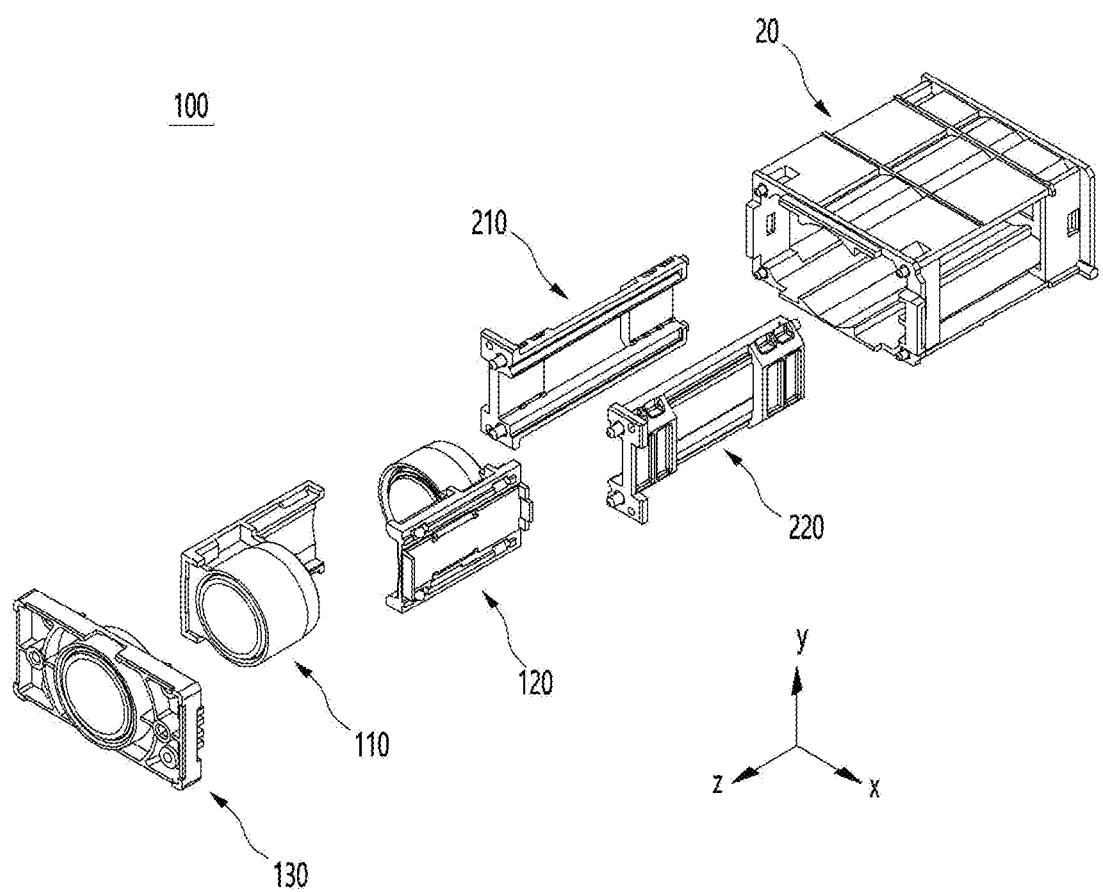
FIG. 20 is an exploded perspective view in which a part of the configuration is omitted in the camera actuator according to the embodiment shown in FIG. 18.

FIG. 18 is a perspective view of a first camera actuator 100 according to an embodiment, FIG. 19 is a perspective view in which a part of a configuration of the camera actuator according to the embodiment shown in FIG. 18 is omitted, and FIG. 20 is an exploded perspective view in which a part of the configuration of the camera actuator according to the embodiment shown in FIG. 11 is omitted.

Referring to FIG. 18, the first camera actuator 100 according to the embodiment may include a base 20, a circuit board 40 disposed outside the base 20, a fourth driving part 142, and a third lens assembly 130.

FIG. 19 is a perspective view in which the base 20 and the circuit board 40 are omitted in FIG. 11, and referring to FIG. 19, a first camera actuator 100 according to an embodiment includes a first guide part 210, a second guide part 220, a first lens assembly 110, a second lens assembly 120, a third driving part 141, and a fourth driving part 142.

The third driving part 141 and the fourth driving part 142 may include a coil or a magnet.

For example, when the third driving part 141 and the fourth driving part 142 include the coil, the third driving part 141 may include a first coil part 141b and a first yoke 141a, and the fourth driving part 142 may include a second coil part 142b and a second yoke 142a.

Or, conversely, the third driving part 141 and the fourth driving part 142 may include the magnet.

In an xyz-axis direction shown in FIG. 20, a z-axis may refer to an optic axis direction or a direction parallel thereto, an xz plane represents the ground, and an x-axis may refer to a direction perpendicular to the z-axis on the ground (xz plane, and a y-axis may refer to a direction perpendicular to the ground.

Referring to FIG. 20, a first camera actuator 100 according to an embodiment may include a base 20, a first guide part 210, a second guide part 220, a first lens assembly 110, a second lens assembly 120, and a third lens assembly 130.

For example, the first camera actuator 100 according to the embodiment may include the base 20, the first guide part 210 disposed on one side of the base 20, the second guide part 220 disposed on the other side of the base 20, the first lens assembly 110 corresponding to the first guide part 210, the second lens assembly 120 corresponding to the second guide part 220, a first ball bearing 117 (see FIG. 15A) disposed between the first lens assembly 110 and the first guide part 210, and a second ball bearing (not shown) disposed between the second guide part 220 and the second lens assembly 120.

In addition, the embodiment may include the third lens assembly 130 disposed in front of the first lens assembly 110 in the optic axis direction.

Hereinafter, specific features of a camera device according to an embodiment will be described with reference to the drawings.

<Guide Part>

Referring to FIG. 19 and FIG. 20, the embodiment may include a first guide part 210 disposed adjacent to the first side wall 21a of the base 20, and a second guide part 220 disposed adjacent to the second side wall 21b of the base 20.

The first guide part 210 may be disposed between the first lens assembly 110 and the first side wall 21a of the base 20.

The second guide part 220 may be disposed between the second lens assembly 120 and the second side wall 21b of the base 20. The first side wall 21a and the second side wall 21b of the base may be disposed to face each other.

According to the embodiment, a lens assembly is driven in a state in which the first guide part 210 and the second guide part 220, which are precisely numerically controlled in the base, are coupled to each other, so that friction resistance is reduced by reducing friction torque, and thus there are technical effects such as improvement of driving force, reduction of power consumption, and improvement of control characteristics during zooming.

Accordingly, according to the embodiment, there is a complex technical effect that image quality or resolution may be improved remarkably by inhibiting occurrence of a phenomenon that a decenter of a lens, tilt of the lens, and a central axis of a lens group and an image sensor are not aligned while minimizing the friction torque during zooming, In the related art, when guide rails are disposed in the base itself, a gradient is generated along an injection direction, and thus there is difficulty in dimensional control, and there was a technical problem that friction torque increases and driving force decreases when injection is not performed normally.

On the other hand, according to the embodiment, the first guide part 210 and the second guide part 220 which are formed separately from the base 20 are applied separately without disposing the guide rails on the base itself, and thus there is a special technical effect that generation of a gradient along the injection direction may be inhibited.

The base 20 may be injected in a Z-axis direction. In the related art, when a rail is integrally formed with the base, there is a problem that a straight line of the rail is distorted due to a gradient generated while the rail is injected in the Z-axis direction.

According to the embodiment, since the first guide part 210 and the second guide part 220 are injected separately from the base 20, it is possible to inhibit generation of a gradient remarkably as compared with the related art, and thus there is a special technical effect that precise injection may be performed and generation of a gradient due to injection may be inhibited.

In the embodiment, the first guide part 210 and the second guide part 220 may be injected on an X-axis, and a length injected may be shorter than the base 20. In this case, when rails 212 and 222 are disposed on the first guide part 210 and the second guide part 220, generation of a gradient during injection may be minimized, and there is a technical effect that possibility that the straight line of the rail is distorted is low.

Figure 21:
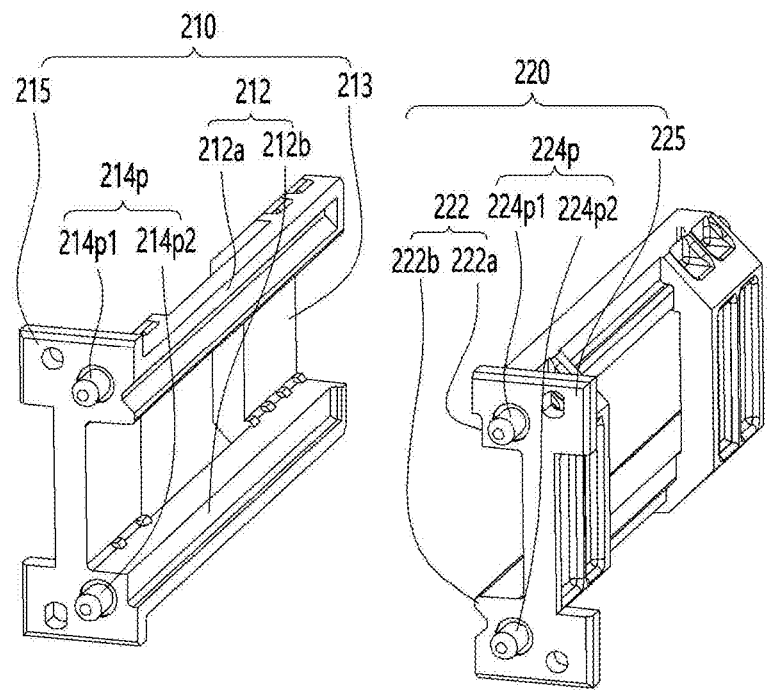
FIG. 21 is a perspective view of a first guide part and a second guide part in the camera actuator according to the embodiment shown in FIG. 20.

FIG. 21 is an enlarged perspective view of a first guide part 210 and a second guide part 220 of a camera actuator according to an embodiment.

Referring to FIG. 21, in the embodiment, the first guide part 210 may include a single or a plurality of first rails 212. In addition, the second guide part 220 may include a single or a plurality of second rails 222.

For example, the first rail 212 of the first guide part 210 may include a first-first rail 212a and a first-second rail 212b. The first guide part 210 may include a first support portion 213 between the first-first rail 212a and the first-second rail 212b.

According to the embodiment, two rails for each lens assembly are provided, and thus there is a technical effect that even though any one of the rails is distorted, the accuracy may be secured by the other one.

In addition, according to the embodiment, the two rails for each lens assembly are provided, and thus there is a technical effect that despite an issue of the frictional force of the ball described later at any one of the rails, the driving force may be secured as the cloud driving proceeds smoothly in the other one.

The first rail 212 may be connected from one surface of the first guide part 210 to the other surface thereof.

A camera actuator according to the embodiment and a camera module including the same solve a problem of lens decenter or tilt generation during zooming, and align a plurality of lens groups well to inhibit a change in an angle of view or occurrence of defocusing, and thus there is a technical effect that image quality or resolution is significantly improved.

For example, according to the embodiment, the first guide part 210 includes the first-first rail 212a and the first-second rail 212a, and the first-first rail 212a and the first-second rail 212a guide the first lens assembly 110, and thus there is a technical effect that accuracy of alignment may be improved.

In addition, according to the embodiment, since the two rails for each lens assembly are provided, it is possible to secure widely a distance between balls described later, and accordingly, there is a technical effect that a driving force may be improved, interference of a magnetic field may be inhibited, and tilt may be inhibited when the lens assembly is stopped or moved.

In addition, the first guide part 210 may include a first guide protruding portion 215 that extends in a side surface direction perpendicular to a direction in which the first rail 212 extends.

A first protrusion 214p may be included on the first guide protruding portion 215. For example, the first protrusion 214p may include a first-first protrusion 214p1 and a first-second protrusion 214p2.

Referring to FIG. 21, in the embodiment, the second guide part 220 may include a single or a plurality of second rails 222.

For example, the second rail 222 of the second guide part 220 may include a second-first rail 222a and a second-second rail 222b. The second guide part 220 may include a second support portion 223 between the second-first rail 222a and the second-second rail 222b.

The second rail 222 may be connected from one surface of the second guide part 210 to the other surface thereof.

In addition, the second guide part 220 may include a second guide protruding portion 225 that extends in a side surface direction perpendicular to a direction in which the second rail 222 extends.

A second protrusion 224p including a second-first protrusion 224p1 and a second-second protrusion 224p2 may be included on the second guide protruding portion 225.

The first-first protrusion 214p1 and first-second protrusion 214p2 of the first guide part 210 and the second-first protrusion 224p1 and second-second protrusion 224p2 of the second guide part 220 may be coupled to a third housing 21 of a third lens assembly 130 described later.

According to the embodiment, the first guide part 210 includes the first-first rail 212a and the first-second rail 212b, and the first-first rail 212a and the first-second rail 212b guide the first lens assembly 110, and thus there is a technical effect that accuracy of alignment may be improved.

In addition, according to the embodiment, the second guide part 220 includes the second-first rail 222a and the second-second rail 222b, and the second-first rail 222a and the second-second rail 222b guide the second lens assembly 120, and thus there is a technical effect that alignment accuracy may be increased.

Further, two rails for each lens assembly are provided, and thus there is a technical effect that even though any one of the rails is distorted, the accuracy may be secured by the other one.

In addition, according to the embodiment, since the two rails for each lens assembly are provided, it is possible to secure widely a distance between balls described later, and accordingly, there is a technical effect that a driving force may be improved, interference of a magnetic field may be inhibited, and tilt may be inhibited when the lens assembly is stopped or moved.

Further, according to the embodiment, the two rails for each lens assembly are provided, and thus there is a technical effect that despite an issue of the frictional force of the ball described later at any one of the rails, the driving force may be secured as the cloud driving proceeds smoothly in the other one.

Furthermore, according to the embodiment, the first guide part 210 and the second guide part 220 which are formed separately from the base 20 are applied separately without disposing the guide rails on the base itself, and thus there is a special technical effect that generation of a gradient along the injection direction may be inhibited.

In the related art, when guide rails are disposed in the base itself, a gradient is generated along an injection direction, and thus there is difficulty in dimensional control, and there was a technical problem that friction torque increases and driving force decreases when injection is not performed normally.

Figure 22A:
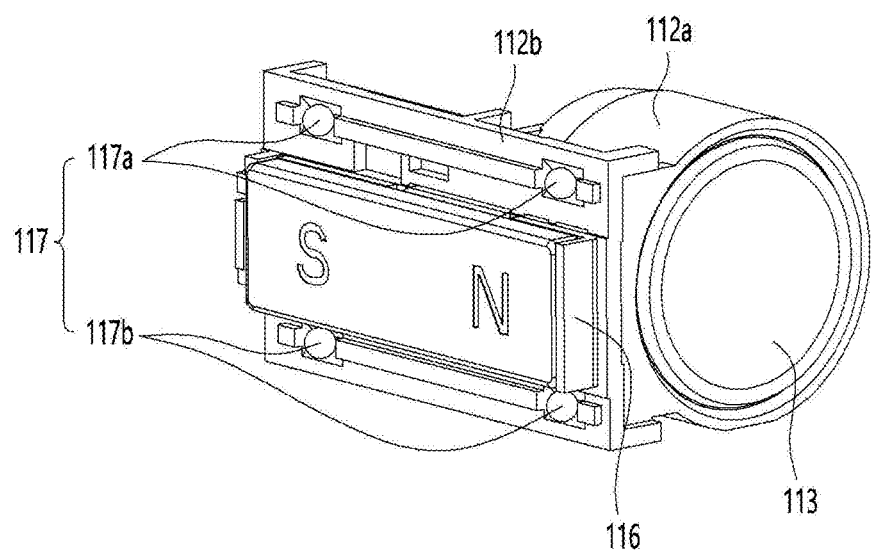
FIG. 22A is a perspective view of a first lens assembly in the camera actuator according to the embodiment shown in FIG. 20.
Figure 22B:
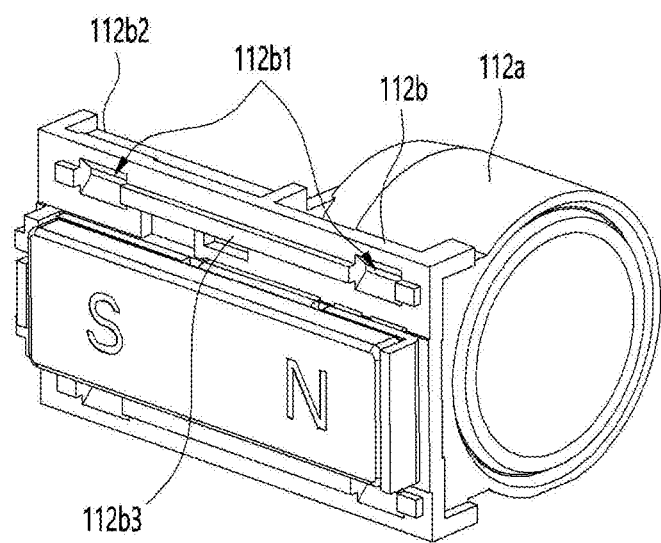
FIG. 22B is a perspective view in which a part of a configuration is removed in the first lens assembly shown in FIG. 22A.

Next, FIG. 22A is a perspective view of a first lens assembly 110 of the camera actuator according to the embodiment shown in FIG. 20, and FIG. 22B is a perspective view in which a part of a configuration of the first lens assembly 110 shown in FIG. 22A is removed.

Referring briefly to FIG. 20, the embodiment may include a first lens assembly 110 moving along the first guide part 210 and a second lens assembly 120 moving along the second guide part 220.

Referring again to FIG. 22A, the first lens assembly 110 may include a first lens barrel 112a on which a first lens 113 is disposed and a first driving part housing 112b on which a first driving part 116 is disposed. The first lens barrel 112a and the first driving part housing 112b may be a first housing, and the first housing may be in a barrel shape or a lens-barrel shape. The first driving part 116 may be a magnet driving part, but the embodiment is not limited thereto, and in some cases, a coil may be disposed therein.

In addition, the second lens assembly 120 may include a second lens barrel (not shown) on which a second lens (not shown) is disposed and a second driving part housing (not shown) on which a second driving part (not shown) is disposed. The second lens barrel (not shown) and the second driving part housing (not shown) may be a second housing, and the second housing may be in a barrel shape or a lens-barrel shape. The second driving part may be a magnet driving part, but the embodiment is not limited thereto, and in some cases, a coil may be disposed therein.

The first driving part 116 may correspond to the two first rails 212, and the second driving part may correspond to the two second rails 222.

In the embodiment, it is possible to drive using a single or a plurality of ball bearings. For example, the embodiment may include a first ball bearing 117 disposed between the first guide part 210 and the first lens assembly 110 and a second ball bearing (not shown) disposed between the second guide part 220 and the second lens assembly 120.

For example, in the embodiment, the first ball bearing 117 may include a single or a plurality of first-first ball bearings 117a disposed above the first driving part housing 112b and a single or a plurality of first-second ball bearings 117b below the first driving part housing 112b.

In the embodiment, the first-first ball bearing 117a of the first ball bearing 117 may move along a first-first rail 212a which is one of the first rails 212, and the first-second ball bearing 117b of the first ball bearings 117 may move along a first-second rail 212b which is another one of the first rails 212.

A camera actuator according to the embodiment and a camera module including the same solve a problem of lens decenter or tilt generation during zooming, and align a plurality of lens groups well to inhibit a change in an angle of view or occurrence of defocusing, and thus there is a technical effect that image quality or resolution is significantly improved.

For example, according to the embodiment, the first guide part includes the first-first rail and the first-second rail, and the first-first rail and the first-second rail guide the first lens assembly 110, and thus there is a technical effect that accuracy of alignment between the second lens assembly 110 and an optic axis may be improved when the first lens assembly 110 moves.

Referring also to FIG. 22B, in an embodiment, the first lens assembly 110 may include a first assembly groove 112b1 on which the first ball bearing 117 is disposed. The second lens assembly 120 may include a second assembly groove (not shown) on which the second ball bearing is disposed.

The first assembly groove 112b1 of the first lens assembly 110 may be in plural. In this case, a distance between two first assembly grooves 112b1 of the plurality of first assembly grooves 112b1 with respect to an optic axis direction may be longer than a thickness of the first lens barrel 112a.

In the embodiment, the first assembly groove 112b1 of the first lens assembly 110 may be in a V-shape. Further, the second assembly groove (not shown) of the second lens assembly 120 may be in a V-shape. The first assembly groove 112b1 of the first lens assembly 110 may be in a U-shape in addition to the V-shape, or a shape that contacts the first ball bearing 117 at two or three points. In addition, the second assembly groove (not shown) of the second lens assembly 120 may be in a U-shape in addition to the V-shape, or a shape that contacts the first ball bearing 117 at two or three points.

Figure 23:
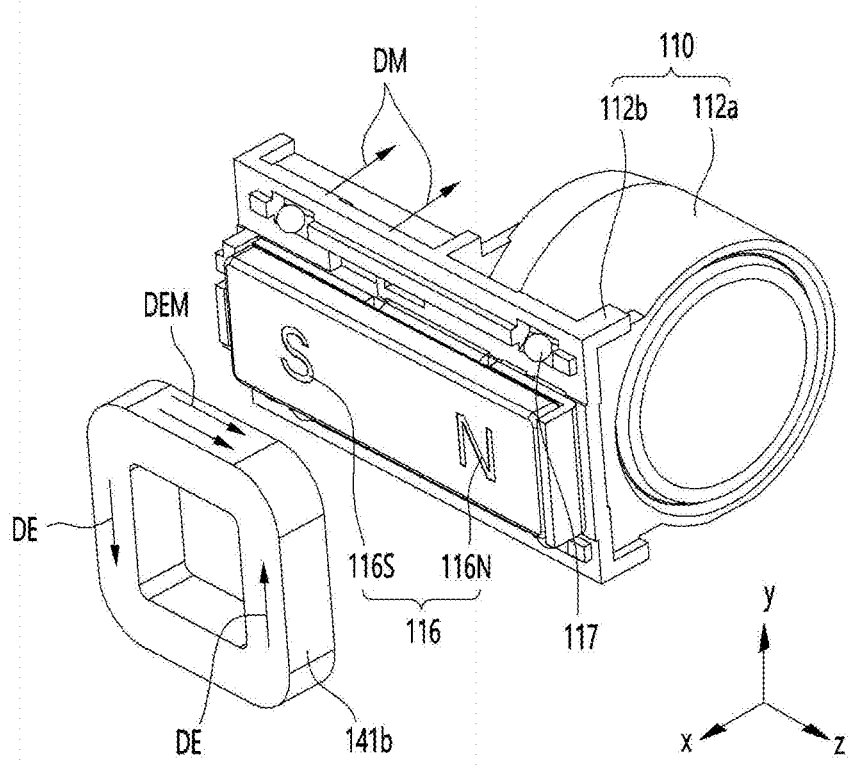
FIG. 23 is a driving example view of a camera actuator according to an embodiment.

Next, FIG. 23 is a driving example view of the camera actuator according to the embodiment.

An interaction in which an electromagnetic force DEM is generated between a first magnet 116 and a first coil part 141b in the camera module according to the embodiment will be described with reference to FIG. 23.

As shown in FIG. 23, a magnetization method of the first magnet 116 of the camera module according to the embodiment may be a vertical magnetization method. For example, in the embodiment, all of an N-pole 116N and an S-pole 116S of the first magnet 116 may be magnetized so as to face the first coil part 141b. Accordingly, the N-pole 116N and the S-pole 116S of the first magnet 116 may be respectively disposed so as to correspond to a region in which current flows in a y-axis direction perpendicular to the ground at the first coil part 141b.

Referring to FIG. 23, in the embodiment, a magnetic force DM is applied in a direction opposite to an x-axis at the N-pole 116N of the first magnet 116, and when a current DE flows in a y-axis direction in a region of the first coil part 141b corresponding to the N-pole 116N, the electromagnetic force DEM acts in a z-axis direction with respect to the Fleming's left-hand rule.

In addition, in the embodiment, the magnetic force DM is applied in the x-axis direction at the S-pole 116S of the first magnet 116, and when the current DE flows in a direction opposite to the y-axis perpendicular to the ground at the first coil part 141b corresponding to the S pole 116S, the electromagnetic force DEM acts in a z-axis direction with respect to the Fleming's left-hand rule.

At this time, since a third driving part 141 including the first coil part 141b is in a fixed state, the first lens assembly 110, which is a mover on which the first magnet 116 is disposed, may be moved back and forth along a rail of the first guide part 210 in a direction parallel to the z-axis direction by the electromagnetic force DEM according to a current direction. The electromagnetic force DEM may be controlled in proportion to the current DE applied to the first coil part 141b.

Likewise, an electromagnetic force DEM is generated between a second magnet (not shown) and the second coil part 142b of the camera module according to the embodiment, and thus the second lens assembly 120 may be moved along a rail of the second guide part 220 horizontally with respect to the optic axis.

As described above, when implementing AF or Zoom in the related art, a plurality of lens assemblies are driven by the electromagnetic force between a magnet and a coil, and in order to obtain the position information of the lens assembly, a hall sensor is disposed inside the winding of the coil. The inside of the winding of the coil in which the hall sensor is disposed may be hollow. The hall sensor may obtain the position information of the lens assembly by sensing a change in magnetic flux of the magnet disposed in the lens assembly. However, when the hall sensor is positioned inside the coil, a distance between the hall sensor and the magnet is determined by a height of the coil.

However, in the related art, thrust is required for the movement of the lens assembly, and in order to secure such thrust, the height of the coil is required to be higher than a predetermined height.

However, when the height of the coil is increased as described above, the distance between the hall sensor and the magnet is increased by the heightened coil. Accordingly, since the magnetic flux of the magnet is blocked, there is a technical contradiction in which the sensitivity of the magnetic flux sensed by the hall sensor disposed inside the coil is lowered. On the contrary, when the height of the coil is reduced, the electromagnetic force between the magnet and the coil is weakened, and the thrust for AF or Zoom driving is deteriorated.

According to the applicant's private internal technology, in order to solve such problems, the optimum point of the sensitivity of the hall sensor and thrust is set by a coil having an appropriate height. In addition, the deteriorated thrust or weakened sensitivity of the hall sensor causes problems in the precision of all camera controls, and a decent or tilt phenomena of the camera module is induced, and thus it may be directly related to the safety or life of a driver who is a user or pedestrian.

One of technical problems of the embodiment is to provide a camera actuator capable of improving simultaneously the sensitivity of the hall sensor while increasing the thrust, and a camera module including the same.

Figure 24:
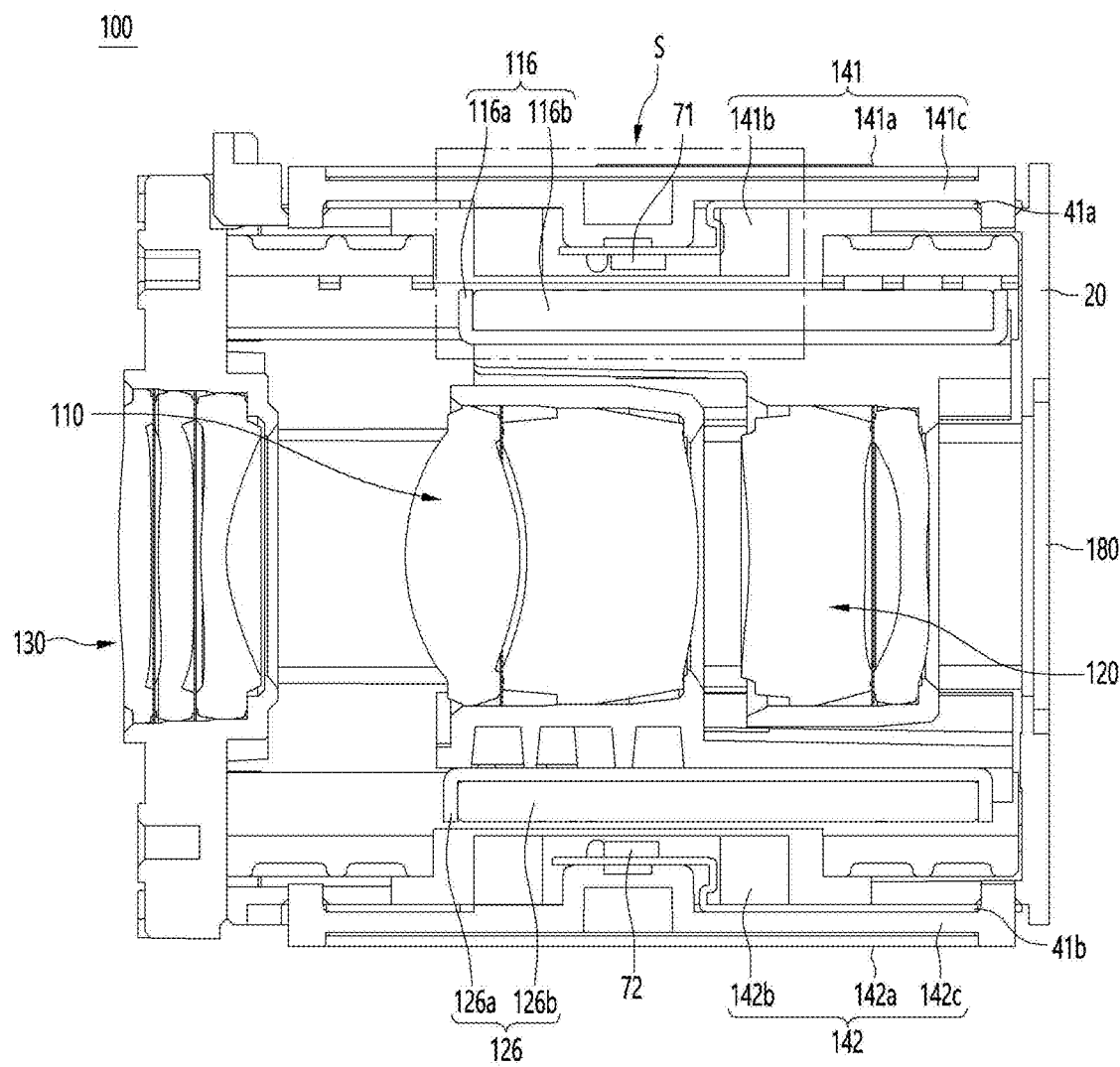
FIG. 24 is a cross-sectional view taken along line C1-C2 in the camera actuator according to the embodiment shown in FIG. 11.

FIG. 24 is a cross-sectional view taken along line C1-C2 in the camera actuator according to the embodiment shown in FIG. 18.

Referring to FIG. 24, the first camera actuator 100 according to the embodiment may include a base 20 and a lens assembly disposed in the base 20. For example, a third lens assembly 130, a first lens assembly 110, and a second lens assembly 120 may be sequentially disposed in the base 20 based on a light incident direction, and an image sensor 180 may be disposed on a rear side of the second lens assembly 120.

As described above, the first camera actuator 100 according to the embodiment may be driven by an electromagnetic force of a predetermined magnet and coil part.

For example, referring to FIG. 24, in the camera actuator according to the embodiment, the first lens assembly 110 may include a first driving part 116 and a third driving part 141, and the second lens assembly 120 may include a second driving part 126 and a fourth driving part 142.

The first driving part 116 and the second driving part 126 may be magnet driving parts, and the third driving part 141 and the fourth driving part 142 may be coil driving parts, but the embodiment is not limited thereto.

Hereinafter, it will be described as a case in which the first driving part 116 and the second driving part 126 are magnet driving parts, respectively, and the third driving part 141 and the fourth driving part 142 are coil driving parts, respectively.

In the camera module according to the embodiment, in the first lens assembly 110, the first driving part 116 may include a first magnet 116b and a first yoke 116a, and the third driving part 141 may include a first coil part 141b and a third yoke 141a. The third driving part 141 may include a first circuit board 41 between the first coil part 141b and the third yoke 141a.

In addition, the embodiment may include a first spacer 141c disposed in the base 20 and a first position detection sensor 71 disposed on the first spacer 141c. The first spacer 141c may be formed of any one or more of polycarbonate (PC), polyethylene terephthalate glycol (PETG), polyethylene (PE) and polypropylene (PP), but the embodiment is not limited thereto.

The first position detection sensor 71 may be a magnetic sensor. For example, the first position detection sensor 71 may be any one of a solid magnetic sensor such as a hall sensor, a coiled magnetic sensor, a resonance magnetic sensor, and the like, but the embodiment is not limited thereto.

In addition, in the camera module according to the embodiment, in the second lens assembly 120, the second driving part 126 may include a second magnet 126b and a second yoke 126a, and the fourth driving part 142 may include a second coil part 142b and a fourth yoke 142a. The fourth driving part 142 may include a second circuit board 42 between the second coil part 142b and the fourth yoke 142a.

In addition, the embodiment may include a second spacer 142c disposed in the base 20 and a second position detection sensor 72 disposed on the second spacer 142c. The second spacer 142c may be formed of any one or more of polycarbonate (PC), polyethylene terephthalate glycol (PETG), polyethylene (PE) and polypropylene (PP), but the embodiment is not limited thereto.

The second position detection sensor 72 may be any one magnetic sensor of a coiled magnetic sensor, a solid magnetic sensor such as a hall sensor, a resonance magnetic sensor, and the like, but the embodiment is not limited thereto.

Hereinafter, technical features of a disposition structure of a position sensor in the embodiment will be described with reference to FIGS. 24 and 25A to 25C.

Figure 25A:
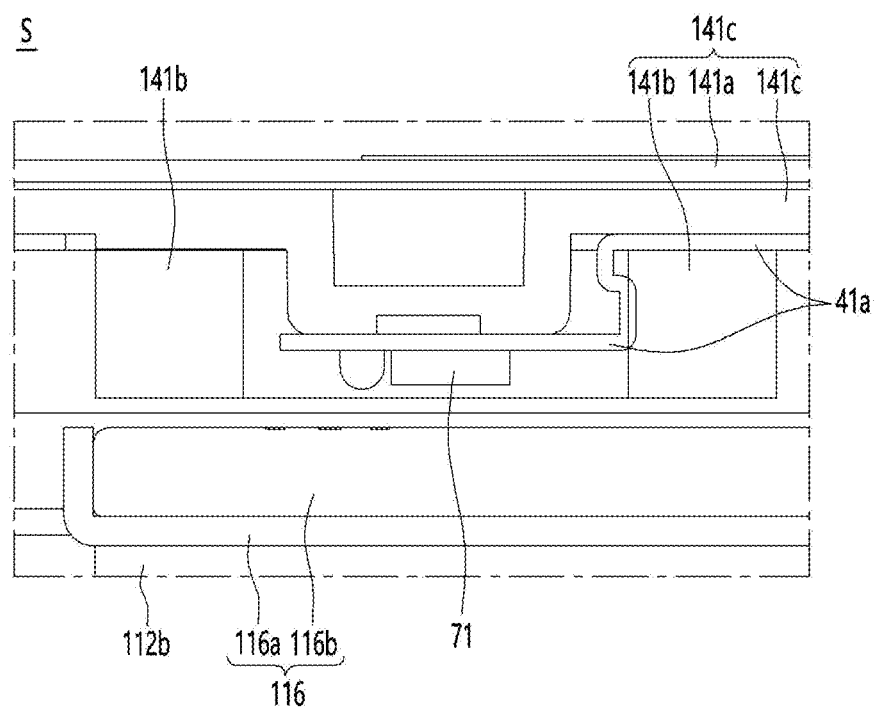
FIG. 25A is an enlarged view of the S region shown in FIG. 24.

FIG. 25A is an enlarged view of the S region shown in FIG. 24, and FIG. 18B is a detailed view of the S region shown in FIG. 18A.

First, referring to FIGS. 24 and 25A, the embodiment may include a base 20, a first lens assembly 110 disposed in the base 20, the third driving part 141 which is a coil driving part disposed in the base 20, a first spacer 141c disposed in the base 20, and a first position detection sensor 71 disposed on the first spacer 141c.

The third driving part 141 may include a first circuit board 41a disposed between the first coil part 141b and the third yoke 141a.

The first coil part 141b and the first position detection sensor 71 may be electrically connected to the first circuit board 41a.

Figure 25B:
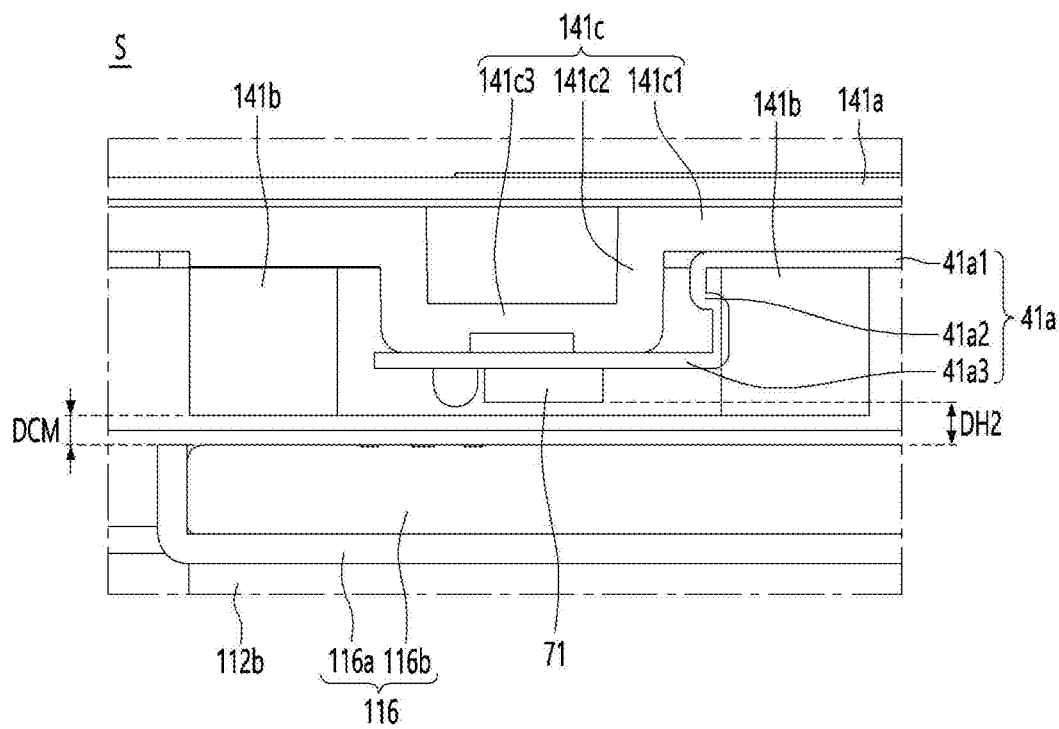
FIG. 25B is a detailed view of the S region shown in FIG. 24.

Next, referring to FIG. 25B, the first spacer 141c may include a first support portion 141c1 and a first protruding portion 141c3 protruding from the first support portion 141c1, the first position detection sensor 71 may be disposed on the first protruding portion 141c3, and the first protruding portion 141c3 may be disposed in the hollow of the first coil part 141b which is the coil driving part.

In this case, the embodiment may include a first connecting portion 141c2 connecting the first protruding portion 141c3 and the first support portion 141c1.

Referring to FIG. 25B, the first circuit board 41a may include a first substrate region 41a1 disposed on the first spacer 141c and a second substrate region 41a3 disposed to be spaced apart from the first substrate region 41a1. The first circuit board 41a may include a second-second substrate region 41a2 connecting the first substrate region 41a1 and the second substrate region 41a3. The first position detection sensor 71 may be disposed on the second substrate region 41a3, and the second substrate region 41a3 may be disposed in the hollow of the first coil part 141b which is the coil driving part.

In addition, referring to FIG. 24, the embodiment may include the base 20, a second lens assembly 120 disposed in the base 20, the fourth driving part 142 which is a coil driving part disposed in the base 20, the second spacer 142c disposed in the base 20, and the second position detection sensor 72 disposed on the second spacer 142c.

In addition, the second spacer 142c may also adopt technical features of the first spacer 141c. For example, referring to FIG. 17, the second spacer 142c may include a second protruding portion (not shown) protruding from a second support portion (not shown), the second position detection sensor 72 may be disposed on the second protruding portion, and the second protruding portion may be disposed in the hollow of the fourth driving part 142 which is the coil driving part.

The second protruding portion may include a second seating portion (not shown), and the second position detection sensor 72 may be disposed on the second seating portion.

In addition, referring to FIG. 24, the second circuit board 41b may include a third substrate region (not shown) disposed on the second spacer 142c and a fourth substrate region disposed to be spaced apart from the third substrate region. The second circuit board 41b may include a fourth-second substrate region connecting the third substrate region and the fourth substrate region.

The second position detection sensor 72 may be disposed on the fourth-second substrate region, and the fourth-second substrate region may be disposed in the hollow of the fourth driving part 142 which is the coil driving part.

Again, Referring to FIG. 25B, the first lens assembly 110 may be driven in the optical axis direction by the electromagnetic force (DEM) between the first magnet 116b of the first driving part 116 and the first coil part 141b of the third driving part 141.

At this time, the electromagnetic force (DEM) is affected by a distance (DCM) between the first magnet 116b and the first coil part 141b.

The magnetic flux of the magnet sensed by the hall sensor is changed according to a separation distance between the hall sensor and the magnet, and thus the performance of position detection of the hall sensor is affected.

Figure 25C:
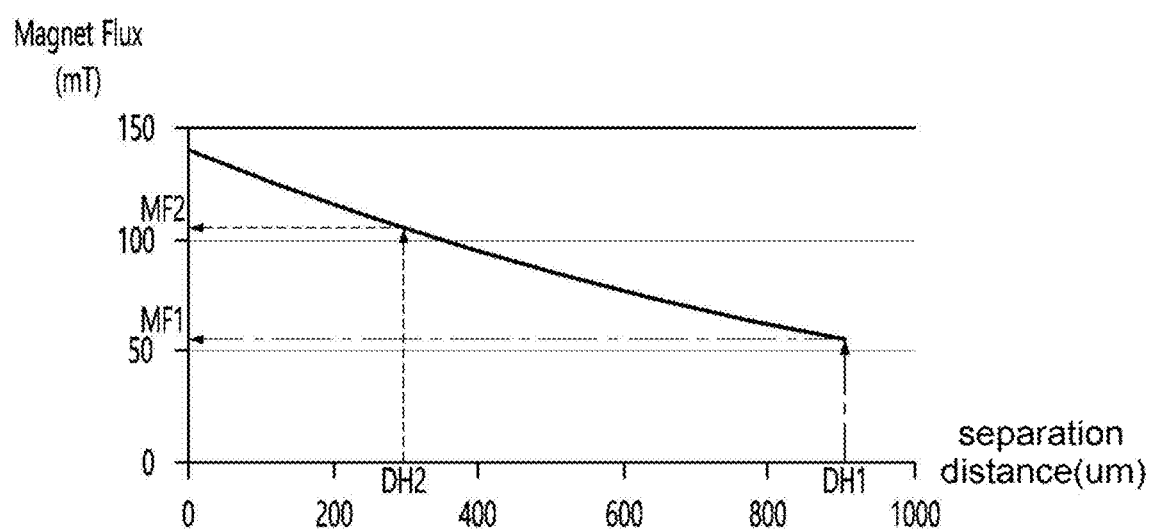
FIG. 25C shows magnetic flux data according to a separation distance between a magnet and a position detection sensor in Example and Comparative Example.

For example, FIG. 25C is magnetic flux data according to the separation distance between the magnet and the first position detection sensor 71 in Example and Comparative Example.

In the conventional internal technology, the height of the coil part should be ensured to secure thrust. In the related art, as the height of the coil part increases according to disposing the hall sensor on the PCB under the coil part, the separation distance between the magnet and the hall sensor increases, and thus there was a technical limitation that a first distance DH1 spaced apart between the magnet and the hall sensor should be secured at least 800 μm or more.

Accordingly, in the conventional internal technology (Comparative Example), the magnetic flux detected by the hall sensor was a level of securing about 50 mT.

In addition, in the conventional internal technology, when the height of the coil increases, the magnetic flux of the magnet, which may be introduced into the hall sensor disposed in the hollow portion of the coil, is partially blocked, so that the sensitivity of the hall sensor is lowered.

On the other hand, according to the embodiment, the first spacer 141c includes a first protruding portion 141c3 protruding from the first support portion 141c1, and the first position detection sensor 71 is disposed on the first protruding portion 141c3, and accordingly, a second distance DH2 between the first magnet 116b and the first position detection sensor 71 is significantly reduced, and thus there is a technical effect that the magnetic flux of the first magnet 116b sensed by the first position detection sensor 71 is significantly improved.

For example, according to the embodiment, as the first position detection sensor 71 is disposed on the first protruding portion 141c3, it is possible to secure the second distance DH2 between the first magnet 116b and the first position detection sensor 71 to 400 um or less, which is more than two times shorter than that of Comparative Example, and accordingly, there is a unique technical effect that the magnetic flux between the first magnet 116b and the first position detection sensor 71 may be secured up to about 150 mT, which is about three times higher than that of Comparative Example.

In addition, according to the embodiment, as the first position detection sensor 71 is disposed on the first protruding portion 141c3, the first position detection sensor 71 is almost exposed to the first magnet 116b even though it is disposed in the hollow of the first coil part 141b, and thus there is a special technical effect that blocking of magnetic flux by the first coil part 141b is significantly reduced.

Accordingly, the camera actuator according to the embodiment and the camera module including the same have a unique technical effect of simultaneously increasing the thrust and the sensitivity of the hall sensor.

Next, one of technical problems of the embodiments is, when implementing AF or Zoom, to provide a camera actuator capable of inhibiting a magnetic field interference between magnets mounted on each lens assembly when a plurality of lens assemblies are driven by an electromagnetic force between a magnet and a coil, and a camera module including the same.

In addition, one of the technical problems of the embodiments is to provide a camera actuator capable of inhibiting detachment of a magnet and a yoke, and a camera module including the same.

Hereinafter, a prevention structure of magnetic field interference of an embodiment will be described with reference to FIGS. 26A to 26C.

Figure 26A:
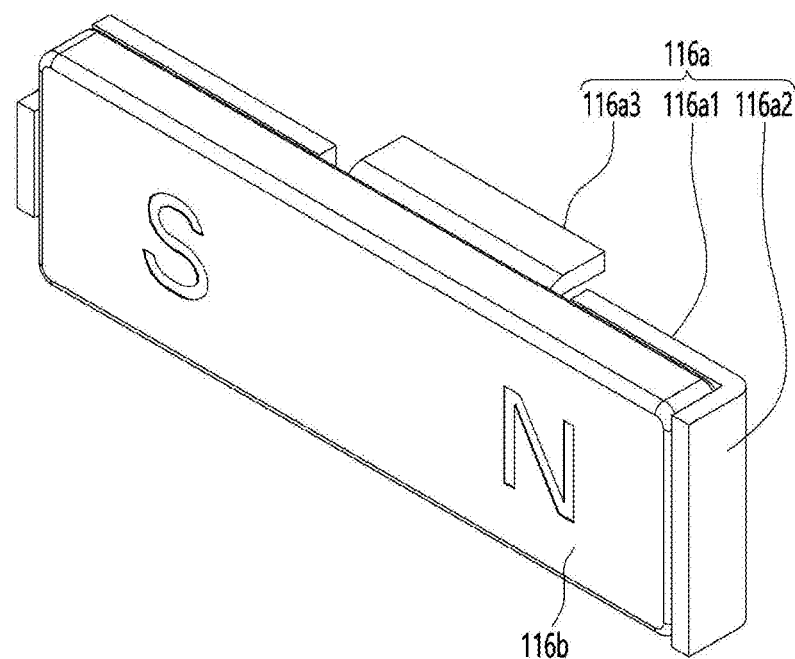
FIG. 26A is a perspective view of a first driving part 116 in a camera module according to an embodiment.

Next, FIG. 26A is a perspective view of a first driving part 116 of a camera module according to an embodiment.

Referring to FIG. 26A, in the embodiment, the first driving part 116 may include a first magnet 116b and a first yoke 116a, and the first yoke 116a may include a first support portion 116a1 and a first side protruding portion 116a2 extending from the first support portion 116a1 toward a side surface of the first magnet 116b.

The first side protruding portion 116a2 may be disposed on both side surfaces of the first magnet 116b.

In addition, the first yoke 116a may include a first fixed protruding portion 116a3 extending in a different direction, for example, in a direction opposite to the first side protruding portion 116a2.

The first fixed protruding portion 116a3 may be disposed at a position about a middle of the first support portion 116a1, but the embodiment is not limited thereto.

Similarly, in the embodiment, the second driving part 126 may include a second magnet 126b and a second yoke 126a, and the second yoke 126a may include a second support portion (not shown) and a second side protruding portion extending from the second support portion toward a side surface of the second magnet 126b (hereinbefore, see a structure of the second yoke 126a in FIG. 24).

The second side protruding portion may be disposed on both side surfaces of the second magnet 126b. In addition, the second yoke 126a may include a second fixed protruding portion (not shown) extending in a different direction, for example, in a direction opposite to the second side protruding portion. The second fixed protruding portion may be disposed at a position about a middle of the second support portion, but the embodiment is not limited thereto.

In the related art, in addition, when implementing AF or Zoom, a plurality of lens assemblies are driven by an electromagnetic force between a magnet and a coil, and there is a problem that a magnetic field interference occurs between magnets mounted in each lens assembly. There is a problem that AF or Zoom driving is not performed normally, and thrust is deteriorated due to such a magnetic field interference between magnets.

In addition, there is a problem that a decent or tilt phenomenon due to a magnetic field interference between magnets is induced.

When an issue in a precision in camera control occurs or thrust is deteriorated due to such a magnetic field interference, or a decent or tilt phenomenon is induced, it may be directly related to the safety or life of a driver who is a user or pedestrian.

Figure 26B:
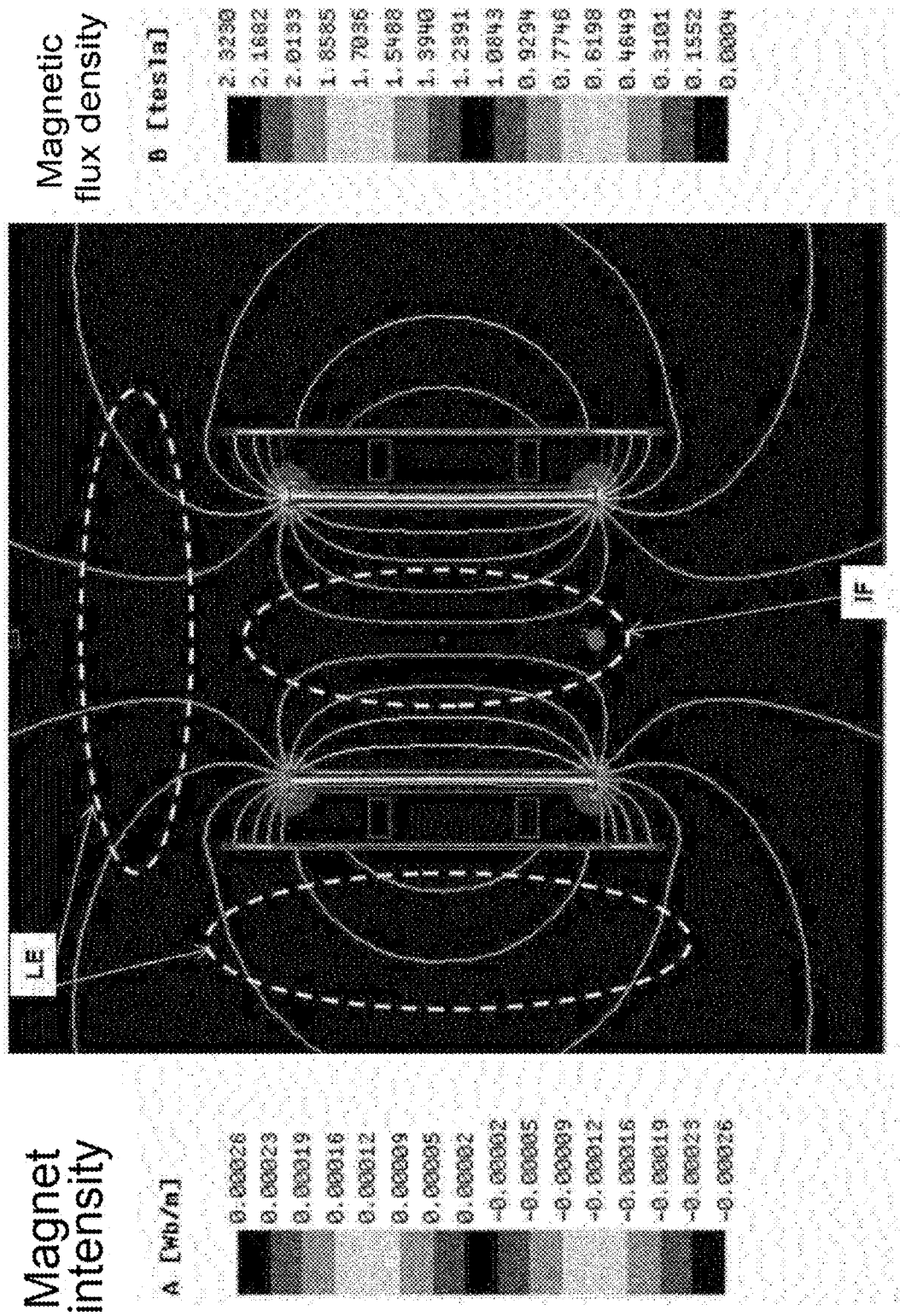
FIG. 26B shows data of a magnetic flux density distribution in Comparative Example.

For example, FIG. 26B shows data of a magnetic flux density distribution in Comparative Example.

Comparative Example of FIG. 26B is a non-disclosed internal technology of an applicant, and has a structure applied so as to perform a shielding function of magnetic flux by disposing a back yoke for a magnet. A shielding performance of the magnetic flux is improved by applying back yoke technology for the magnet, but there are technical problems as follows.

For example, referring to FIG. 26B, it is magnetic flux density data between respective magnets mounted in the first lens assembly and the second lens assembly, and thus there is a problem that magnetic field interference (IF) occurs between the respective magnets, and loss of thrust occurs due to leakage (LE) of the magnetic flux generated in each magnet.

In particular, in case of a high-magnification Zoom Actuator applied recently, there is a problem that not only magnetic field interference occurs between permanent magnets of the first lens assembly and the second lens assembly, which are moving lenses, but also the magnetic field interference (IF) with a magnet of the OIS actuator occurs.

Movement of each group is disturbed due to the magnetic field interference (IF), and as a result, there is a problem that an input current is also increased.

According to the embodiment, a yoke in a magnet driving part of the first lens assembly 110 or the second lens assembly 120 includes a side protruding portion extending to a side surface of the magnet, and thus there is a special technical effect that it is possible to provide a camera actuator capable of inhibiting a magnetic field interference between magnets mounted on each lens assembly when a plurality of lens assemblies are driven by an electromagnetic force between a magnet and a coil when AF or Zoom is implemented, and a camera module including the same.

Figure 26C:
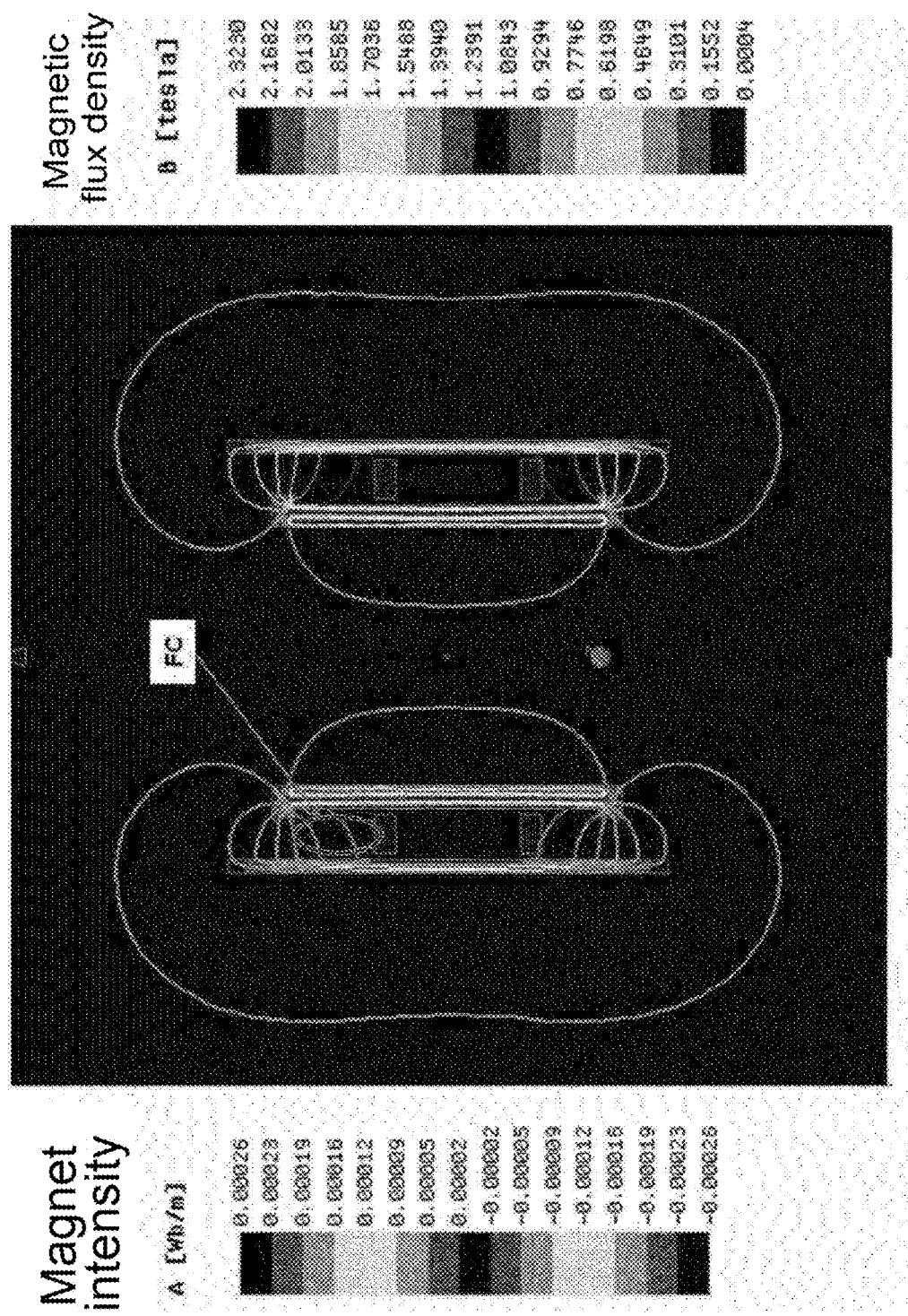
FIG. 26C shows data of a magnetic flux density distribution in Example.

For example, FIG. 26C shows data of a magnetic flux density distribution in Example.

Referring to FIG. 26C, it is magnetic flux density data between respective magnets mounted in the first lens assembly and the second lens assembly, and a yoke in a magnet driving part of the first lens assembly 110 and the second lens assembly 120 includes a side protruding portion extending to a side surface of the magnet, and thus the precision of camera control is improved significantly.

In addition, according to the embodiment, the yoke in the magnet driving part of the first lens assembly 110 or the second lens assembly 120 includes the side protruding portion extending to the side surface of the magnet to inhibit leakage flux generated in the magnet, and the side protruding portion is disposed in a region having a high magnetic flux density so that the magnetic flux is concentrated (FC), and thus there is a technical effect that thrust is significantly improved by increasing a density between a flux line and the coil to increase the Lorentz Force.

Figure 27:
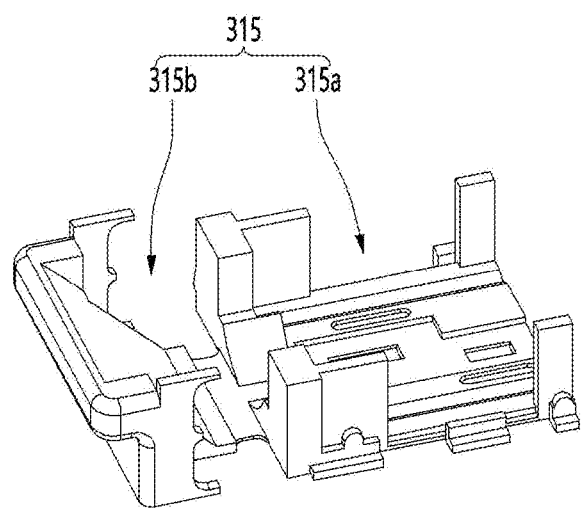
FIG. 27 is an illustrative view of an integrated body of a camera module according to another embodiment.

Next, FIG. 27 is an illustrative view of an integrated body 315 of a camera module according to another embodiment.

A first camera actuator 100 may be disposed in a first body region 315a of the integrated body 315 of the camera module according to another embodiment, and a second camera actuator 300 may be disposed in a second body region 315b.

Figure 28:
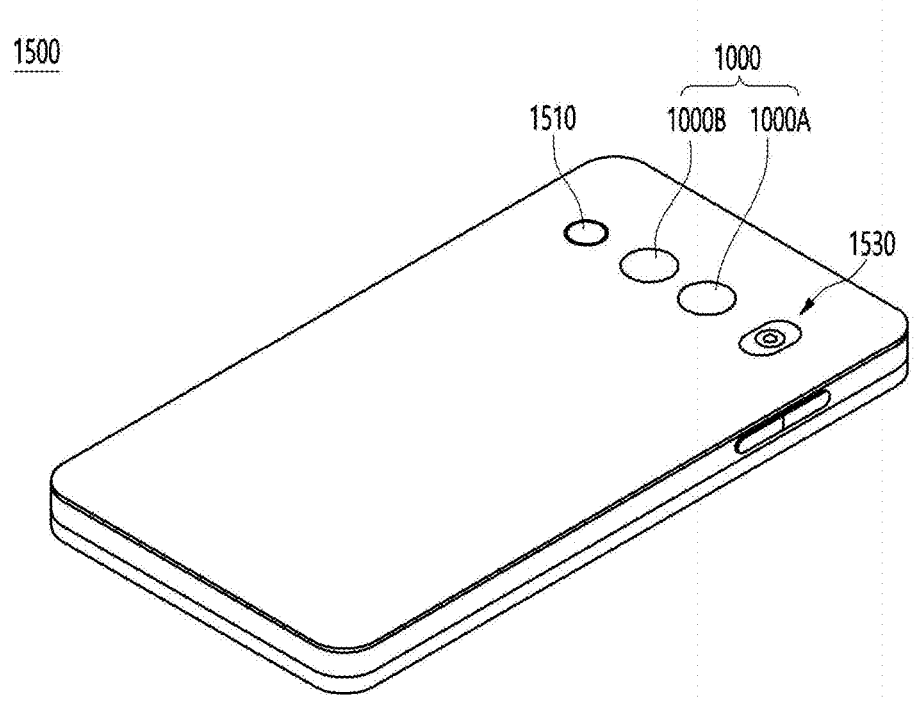
FIG. 28 is a perspective view of a mobile terminal to which a camera module according to an embodiment is applied.

Next, FIG. 28 shows a mobile terminal 1500 to which a camera module according to an embodiment is applied.

As shown in FIG. 28, the mobile terminal 1500 according to the embodiment may include a camera module 1000, a flash module 1530, and an autofocus device 1510 provided on a back surface.

The camera module 1000 may include an image capturing function and an autofocus function. For example, the camera module 1000 may include an autofocus function using an image.

The camera module 1000 processes a still image or a moving image frame obtained by an image sensor in a photographing mode or a video call mode. The processed image frame may be displayed on a predetermined display unit, and may be stored in a memory. A camera (not shown) may be disposed on a front surface of the body of the mobile terminal.

For example, the camera module 1000 may include a first camera module 1000A and a second camera module 1000B, and OIS may be implemented together with an AF or zoom function by the first camera module 1000A.

The flash module 1530 may include a light-emitting device that emits light therein. The flash module 1530 may be operated by a camera operation of a mobile terminal or by user control.

The autofocus device 1510 may include one of packages of a surface emitting laser element as a light-emitting unit.

The autofocus device 1510 may include an autofocus function using a laser. The autofocus device 1510 may be mainly used in a condition in which an autofocus function using an image of the camera module 1000 is deteriorated, for example, in a close environment of 10 m or less or a dark environment. The autofocus device 1510 may include a light-emitting unit including a vertical cavity surface emitting laser (VCSEL) semiconductor device, and a light receiving unit that converts light energy into electric energy such as a photodiode.

Figure 29:
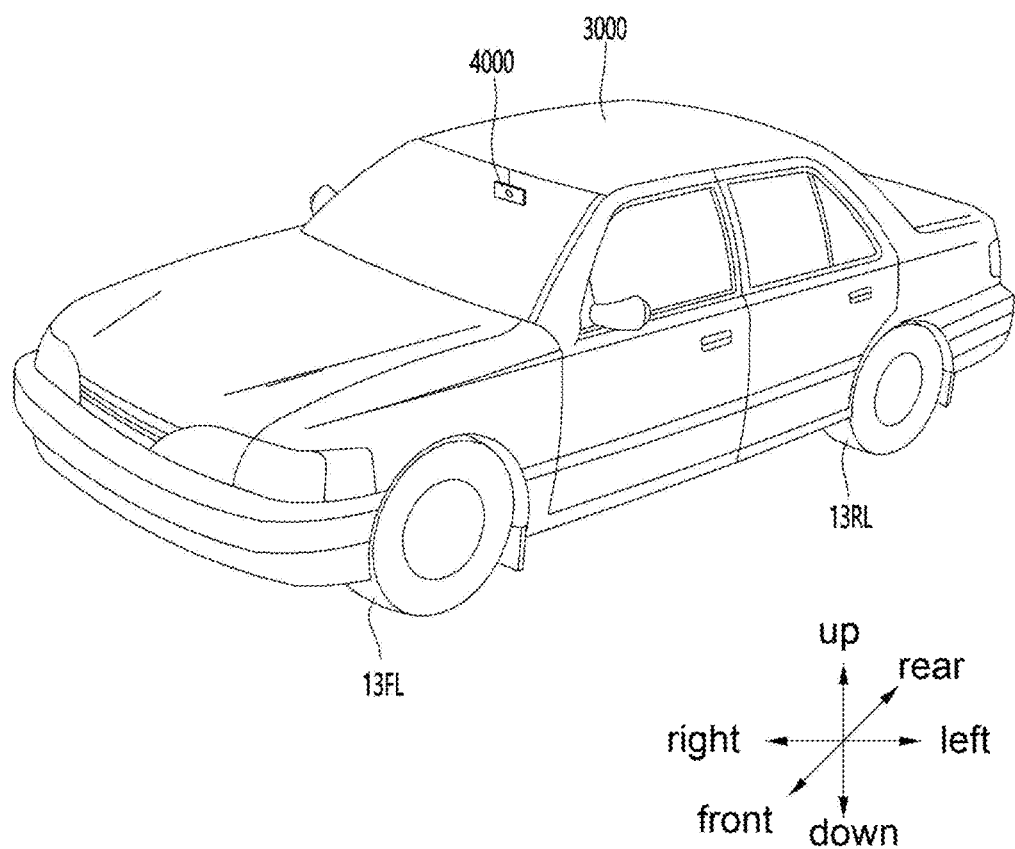
FIG. 29 is a perspective view of a vehicle to which a camera module according to an embodiment is applied.

Next, FIG. 29 is a perspective view of a vehicle 700 to which a camera module according to an embodiment is applied, For example, FIGS. 22A and 22B are an appearance views of a vehicle having a vehicle driving assistance device to which a camera module 1000 according to the embodiment is applied.

Referring to FIG. 29, the vehicle 700 according to the embodiment may include wheels 13FL and 13FR that rotate by a power source, and a predetermined sensor. The sensor may be a camera sensor 2000, but the embodiment is not limited thereto.

The camera 2000 may be a camera sensor to which the camera module 1000 according to the embodiment is applied.

The vehicle 700 according to the embodiment may acquire image information through the camera sensor 2000 that photographs a front image or a surrounding image, and may determine an unidentified situation of a lane by using the image information and generate a virtual lane at the time of unidentification.

For example, the camera sensor 2000 may acquire the front image by photographing a front of the vehicle 700, and a processor (not shown) may acquire the image information by analyzing an object included in the front image.

For example, when an object such as a lane, a neighboring vehicle, a traveling obstacle, and a median strip, a curb, and a street tree corresponding to an indirect road marking is photographed in an image photographed by the camera sensor 2000, the processor detects such an object to include in the image information.

In this case, the processor may acquire distance information with the object detected through the camera sensor 2000 to further complement the image information. The image information may be information about an object captured in the image.

Such a camera sensor 2000 may include an image sensor and an image processing module. The camera sensor 2000 may process a still image or moving image obtained by the image sensor (e.g., CMOS or CCD. The image processing module may process the still image or moving image acquired through the image sensor to extract necessary information, and may transmit the extracted information to the processor.

At this time, the camera sensor 2000 may include a stereo camera so as to improve the measurement accuracy of the object and to secure more information such as a distance between the vehicle 700 and the object, but the embodiment is not limited thereto.

The characteristics, structures and effects described in the embodiments above are included in at least one embodiment but are not limited to one embodiment. Furthermore, the characteristics, structures, effects, and the like illustrated in each of the embodiments may be combined or modified even with respect to other embodiments by those of ordinary skill in the art to which the embodiments pertain. Thus, it would be construed that contents related to such a combination and such a modification are included in the scope of the present invention.

In addition, embodiments are mostly described above, but they are only examples and do not limit the present invention. A person skilled in the art to which the present invention pertain may appreciate that several variations and applications not presented above may be made without departing from the essential characteristic of the embodiments. For example, each component particularly represented in the embodiments may be varied. In addition, it should be construed that differences related to such a variation and such an application are included in the scope of the present invention defined in the following claims.

What is claimed is:

1. A camera actuator comprising:
a housing;
a prism unit disposed in the housing;
a driving part tilting the prism unit; and
a moving plate disposed between the housing and the prism unit;
wherein the prism unit includes:
a prism mover including an accommodating part, and
a prism disposed in the accommodating part of the prism mover,
wherein a pulling magnet that generates attractive force together with the moving plate is disposed on the prism mover,
wherein the prism mover is tilted with respect to a rotation reference axis of the moving plate while being supported by the housing by the attractive force between the moving plate and the pulling magnet, and
wherein the moving plate is composed of a magnetic material.

2. A camera actuator comprising:
a housing;
a prism unit disposed in the housing;
a driving part tilting the prism unit; and
a moving plate disposed between the housing and the prism unit;
wherein the prism unit includes:
a prism mover including an accommodating part, and
a prism disposed in the accommodating part of the prism mover,
wherein a pulling magnet that generates attractive force together with the moving plate is disposed on the prism mover, and
wherein the prism mover is tilted with respect to a rotation reference axis of the moving plate while being supported by the housing by the attractive force between the moving plate and the pulling magnet,
wherein the moving plate includes first and second moving plates,
wherein the second moving plate is disposed fixedly in a recess of the housing, and is composed of the magnetic material in order to generate the attractive force with the pulling magnet, and
wherein the first moving plate is disposed between the prism mover and the second moving plate, and is supported by the housing by the attractive force.

3. The camera actuator of claim 2, wherein a plurality of first moving protruding portions disposed in a first direction are disposed on one surface of the first moving plate facing the prism mover, and
wherein a plurality of second moving protruding portions disposed in a second direction perpendicular to the first direction are disposed on one surface of the second moving plate facing the first moving plate.

4. The camera actuator of claim 3, wherein the prism unit is provided to be rotatable in the second direction with respect to a first virtual line formed by the plurality of first moving protruding portions as a reference axis, and to be rotatable in the first direction with respect to a second virtual line formed by the plurality of second moving protruding portions as a reference axis.

5. The camera actuator of claim 4, wherein the prism mover includes:
a first recess formed on an outer surface facing one surface of the first moving plate and in which the pulling magnet is disposed; and
a plurality of second recesses spaced apart from each other in the first direction with respect to the first recess and in which the plurality of first moving protruding portions are disposed.

6. The camera actuator of claim 3,
wherein the first moving plate includes:
a plurality of first moving recesses formed in the second direction on the other surface facing one surface of the second moving plate and into which the plurality of second moving protruding portions are inserted.

7. The camera actuator of claim 3, wherein the first moving plate includes a plurality of first auxiliary protruding portions spaced apart from each other in the second direction on the one surface of the first moving plate, and
wherein the second moving plate includes a plurality of second auxiliary protruding portions spaced apart from each other in the first direction on the one surface of the second moving plate.

8. The camera actuator of claim 7, wherein a rotation range of the prism unit in the second direction is limited by the plurality of first auxiliary protruding portions; and
wherein a rotation range of the prism unit in the first direction is limited by the plurality of second auxiliary protruding portions.

9. The camera actuator of claim 8, wherein the plurality of first moving protruding portions and the plurality of first auxiliary protruding portions are disposed on the one surface of the first moving plate in a cross shape with reference to a first region, and
wherein the plurality of second moving protruding portions and the plurality of second auxiliary protruding portions are disposed on the one surface of the second moving plate in a cross shape with reference to a second region, and
wherein the first and second regions are overlapped with the pulling magnet in a third direction.

10. The camera actuator of claim 2, wherein the first moving plate or the second moving plate is composed of a magnetic material.

11. A camera actuator comprising:
a housing;
a prism unit disposed in the housing;
a driving part tilting the prism unit;
a first pivot plate disposed on a side wall of the housing; and
a second pivot plate disposed between the first pivot plate and the prism unit,
wherein the prism unit includes a pulling magnet, and the prism unit is tilted with respect to a rotation reference axis of the first pivot plate or the second pivot plate while being supported by the housing by attractive force between the pulling magnet and the first pivot plate, and
wherein the first pivot plate is composed of a magnetic material that generates attractive force together with the pulling magnet.

12. The camera actuator of claim 11, wherein the second pivot plate is composed of a magnetic material or a non-magnetic material.

13. The camera actuator of claim 11, wherein the first pivot plate includes a plurality of first pivot protruding portions, and the second pivot plate includes a plurality of second pivot protruding portions.

14. The camera actuator of claim 13, wherein the plurality of first pivot protruding portions are disposed to be spaced apart in a first direction on one surface of the first pivot plate, and
wherein the plurality of second pivot protruding portions are disposed to be spaced apart in a second direction orthogonal to the first direction on one surface of the second pivot plate.

15. The camera actuator of claim 14, wherein the plurality of first pivot protruding portions protrude toward the prism unit on one surface of the first pivot plate, and
wherein the plurality of second pivot protruding portions protrude toward the prism unit on one surface of the second pivot plate.

16. The camera actuator of claim 13, wherein the prism unit includes a first recess in which the pulling magnet is accommodated; and a plurality of second recesses in which the plurality of second pivot protruding portions are accommodated.

17. The camera actuator of claim 16, wherein the first recess is disposed in a central region between the plurality of second recesses.

18. A camera module comprising:
an optical sensor; and
first and second camera actuators for providing light to the optical sensor,
wherein the second camera actuator changes a path of light incident from the outside to provide light to pass through the first camera actuator,
wherein the light passing through the first camera actuator is provided to the optical sensor,
wherein the second camera actuator comprises:
a housing;
a prism unit disposed in the housing;
a driving part tilting the prism unit;
a first pivot plate disposed on a side wall of the housing; and
a second pivot plate disposed between the first pivot plate and the prism unit,
wherein the prism unit includes a pulling magnet, and the prism unit is tilted with respect to a rotation reference axis of the first pivot plate or the second pivot plate while being supported by the housing by attractive force between the pulling magnet and the first pivot plate, and
wherein the first pivot plate is composed of a magnetic material that generates attractive force together with the pulling magnet.

19. The camera module of claim 18, wherein the first camera actuator includes:
a base;
a rail guide part coupled to the base;
a first lens assembly coupled to and fixed to the base; and
second and third lens assemblies disposed in the base and that are movable along the rail guide part.

* * * * *